(12) United States Patent
Fujikawa

(10) Patent No.: US 12,306,488 B2
(45) Date of Patent: May 20, 2025

(54) LIQUID CRYSTAL DEVICE, ELECTRONIC DEVICE, AND DIAGNOSTIC SYSTEM FOR MEASURING STATE OF LIQUID CRYSTAL PANEL

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/496,898

(22) Filed: Oct. 29, 2023

(65) Prior Publication Data
US 2024/0142811 A1 May 2, 2024

(30) Foreign Application Priority Data
Oct. 31, 2022 (JP) .................... 2022-174165

(51) Int. Cl.
G02F 1/133 (2006.01)
G02F 1/1343 (2006.01)
G02F 1/1345 (2006.01)

(52) U.S. Cl.
CPC .... *G02F 1/13306* (2013.01); *G02F 1/134309* (2013.01); *G02F 1/1345* (2013.01); *G02F 1/13452* (2013.01); *G02F 1/13454* (2013.01); *G02F 2203/69* (2013.01)

(58) Field of Classification Search
CPC .......................... G02F 1/13306; G02F 1/13454
See application file for complete search history.

(56) References Cited

U.S. PATENT DOCUMENTS

2009/0267614 A1* 10/2009 Inoue .................... G02F 1/1309
445/3
2011/0115779 A1* 5/2011 Fujikawa ............. G09G 3/3614
345/212

FOREIGN PATENT DOCUMENTS

| JP | H04215048 | 8/1992 |
| JP | H09243979 | 9/1997 |
| JP | 2010152061 | 7/2010 |
| WO | 2008090786 | 7/2008 |

\* cited by examiner

*Primary Examiner* — Lauren Nguyen
(74) *Attorney, Agent, or Firm* — JCIPRNET

(57) ABSTRACT

A liquid crystal device includes: a first electrode; a second electrode; a liquid crystal layer; and a measurement circuit configured to supply a potential to the first electrode and the second electrode and measure a first electrode potential, wherein the measurement circuit supplies a potential to the first electrode and the second electrode so that a potential difference between the first electrode and the second electrode becomes a first potential difference during a first period, supplies a potential to the first electrode and the second electrode so that the potential difference becomes a second potential difference having a polarity different from that of the first potential difference during a second period after the first period, and stops supplying the potential to the first electrode and supplies the same potential as during the second period to the second electrode during a third period after the second period.

18 Claims, 22 Drawing Sheets

LIQUID CRYSTAL DEVICE, ELECTRONIC DEVICE, AND DIAGNOSTIC SYSTEM FOR MEASURING STATE OF LIQUID CRYSTAL PANEL

The present application is based on, and claims priority from JP Application Serial Number 2022-174165, filed Oct. 31, 2022, the disclosure of which is hereby incorporated by reference herein in its entirety.

BACKGROUND

1. Technical Field

The present disclosure relates to a liquid crystal device, an electronic device, and a diagnostic system.

2. Related Art

The liquid crystal used in liquid crystal devices deteriorates due to long-term application of a DC voltage component. In addition, when a liquid crystal device is used as a light valve of a projector, the liquid crystal also deteriorates due to a chemical action caused by incidence of high-intensity light and heat. The deterioration of liquid crystal is, for example, a phenomenon in which the number of mobile ions including anions and cations increase in the liquid crystal and thus insulation of the liquid crystal decreases. The decrease in insulation appears, for example, as a decrease in voltage holding ratio of the liquid crystal and is visually recognized as a display defect such as stains or unevenness in a liquid crystal panel. JP-A-4-215048 discloses a method for accelerating and evaluating such a deterioration phenomenon in liquid crystal. In this method, a pair of electrodes for deterioration evaluation is provided outside a display region of a liquid crystal panel to perform an accelerated test on the liquid crystal panel for 100 hours, then a voltage of 5 V is applied between the electrodes for deterioration evaluation for 50 μs, and after that, a voltage holding ratio after 16.7 ms is measured to perform evaluation of deterioration of the liquid crystal.

According to the present applicant's research, it has been found that, for example, when an accelerated test with incidence of high-intensity light is performed using a liquid crystal panel, there are a stage in which the number of mobile ions in the liquid crystal increases relatively moderately and a stage in which the number of mobile ions in the liquid crystal increases rapidly thereafter. Also, when light other than visible light, for example, UV light is incident on the liquid crystal panel, a chemical action is intensified by the high energy of the UV light, and deterioration of the liquid crystal progresses rapidly.

In addition, when an amount of mobile ions in the liquid crystal becomes significant, occurrence of problems such as deterioration of display quality of the liquid crystal panel cannot be avoided, and thus from the viewpoint of preventive maintenance, there has been a demand to be able to ascertain that a liquid crystal panel is near the end of its life before the liquid crystal panel reaches the end of its life.

However, the method disclosed in JP-A-4-215048 has a problem of making preventive maintenance difficult to perform. Specifically, according to the present applicant's verification results, in the method disclosed in JP-A-4-215048, it is difficult to observe a state in which the number of mobile ions gradually increases in the liquid crystal at a stage in which the mobile ions increase relatively gently.

SUMMARY

A liquid crystal device according to one aspect of the present disclosure includes: a first electrode; a second electrode; a liquid crystal layer disposed between the first electrode and the second electrode; and a measurement circuit configured to supply a potential to each of the first electrode and the second electrode and measure a first electrode potential, which is a potential of the first electrode, wherein the measurement circuit supplies a potential to each of the first electrode and the second electrode so that a potential difference between the first electrode and the second electrode becomes a first potential difference during a first period, supplies a potential to each of the first electrode and the second electrode so that the potential difference becomes a second potential difference having a polarity different from that of the first potential difference during a second period after the first period, and stops supplying the potential to the first electrode and supplies the same potential as that during the second period to the second electrode during a third period after the second period.

An electronic device according to one aspect of the present disclosure includes the liquid crystal device according to the above-described aspect.

A diagnostic system according to one aspect of the present disclosure includes: a liquid crystal panel including a first electrode, a second electrode, and a liquid crystal layer disposed between the first electrode and the second electrode; and a diagnostic device including a measurement circuit configured to supply a potential to each of the first electrode and the second electrode and measure a first electrode potential, which is a potential of the first electrode, wherein the measurement circuit supplies a potential to each of the first electrode and the second electrode so that a potential difference between the first electrode and the second electrode becomes a first potential difference during a first period, supplies a potential to each of the first electrode and the second electrode so that the potential difference becomes a second potential difference having a polarity different from that of the first potential difference during a second period after the first period, and stops supplying the potential to the first electrode and supplies the same potential as that during the second period to the second electrode during a third period after the second period.

DESCRIPTION OF EMBODIMENTS

Embodiments of the present disclosure will be described below with reference to the drawings. Here, in each of the figures below, the sizes of the respective members may be different from the actual sizes in order to make each member recognizable. In addition, in each figure below, if necessary, XYZ axes are used as coordinate axes orthogonal to each other, and in each figure, directions indicated by each arrow along the axes are + directions, and directions opposite to the + directions are − directions.

Also, a +X direction may be referred to as rightward or a right side, and a −X direction may be referred to as leftward or a left side. A +Z direction may also be referred to as upward and a −Z direction may also be referred to as downward, and viewing in the +Z direction is referred to as a plan view or planar. Further, in the following description, for example, with respect to a substrate, the description "on a substrate" is used to describe any of when an element is disposed on the substrate in contact therewith, when an element is disposed on the substrate with another structure therebetween, and when one part thereof is disposed on the substrate in contact therewith and another part thereof is disposed via another structure.

1. First Embodiment 1.1. Outline of Configuration of Liquid Crystal Panel 100

Figure 1:
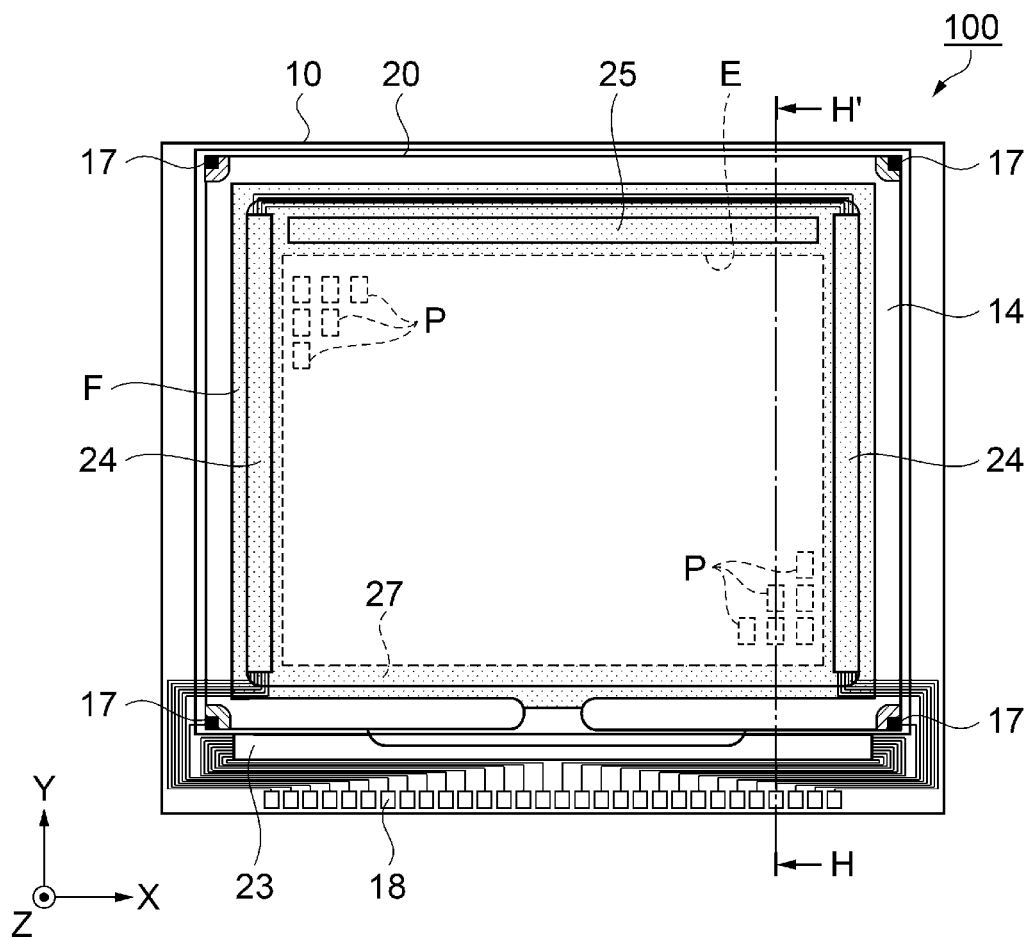
FIG. 1 is a plan view showing a schematic configuration of a liquid crystal panel used in a liquid crystal device according to a first embodiment.

FIG. 1 is a plan view showing a schematic configuration of a liquid crystal panel 100 used in a liquid crystal device 1000 of a first embodiment. In addition, for example, the liquid crystal panel 100 according to this embodiment is an active drive liquid crystal panel provided with a thin film transistor (TFT) 11 as a pixel switching element for each pixel P. The liquid crystal panel 100 forms the liquid crystal device 1000 in combination with a measurement circuit 200, which will be described later, and can be appropriately used as a light modulation device in a projection display device or the like serving as an electronic device.

The liquid crystal panel 100 includes an element substrate 10 and a counter substrate 20. Also, all of the configuration indicated by solid lines inside an outline of the counter substrate 20 is a configuration disposed between the counter substrate 20 and the element substrate 10.

A seal material 14 is provided in a frame shape along an outer edge of the counter substrate 20. A parting portion 27 indicated by halftone dots is made of a light-shielding film and is disposed inside the sealing material 14 along an outer edge of a display region E to surround the display region E. The seal material 14 is an adhesive made of photocurable resin, thermosetting resin, or the like, and contains a gap material such as glass fibers or glass beads for setting a gap between the element substrate 10 and the counter substrate 20 to a predetermined size.

In the display region E, pixels P are disposed in a matrix shape. Peripheral circuits such as a scanning line driving circuit 24 and a precharge circuit 25 are disposed in a peripheral region F between the display region E and the sealing material 14. In addition, a data line driving circuit 23 and a plurality of external coupling terminals 18 are disposed on a portion of the element substrate 10 outside the sealing material 14, which protrudes from the counter substrate 20 to a lower side of the figure in a −Y direction.

Corresponding to four corners of the counter substrate 20, inter-substrate conducting portions 17 are disposed to establish electrical conduction between the element substrate 10 and the counter substrate 20.

Figure 2:
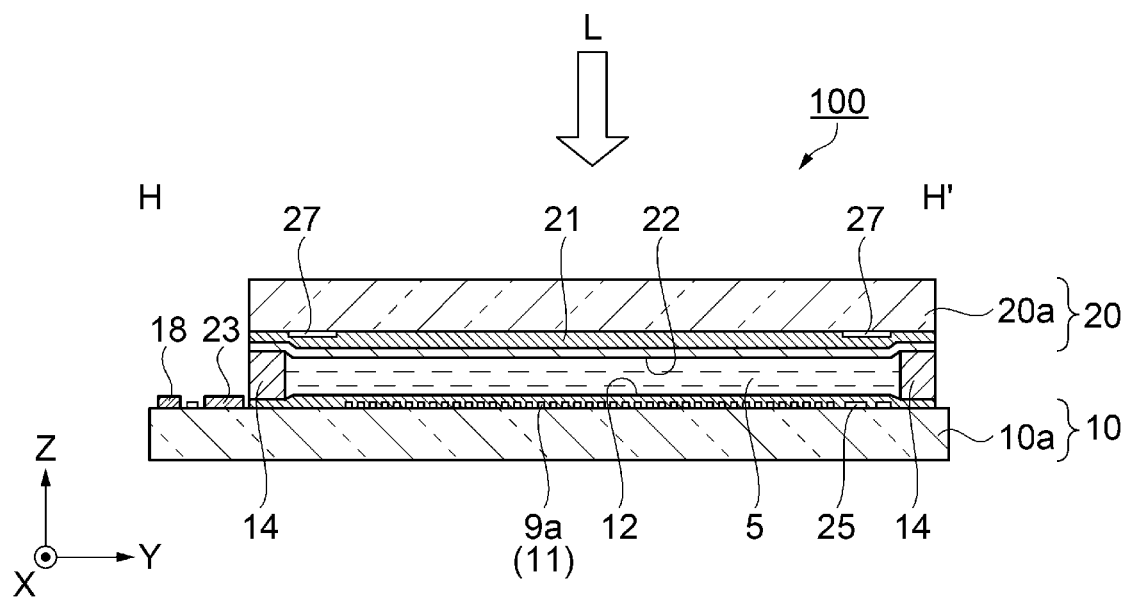
FIG. 2 is a cross-sectional view taken along line H-H' of FIG. 1.

FIG. 2 is a cross-sectional view showing a schematic configuration of the liquid crystal panel 100 taken along line H-H' in FIG. 1. The element substrate 10 and the counter substrate 20 are disposed via the sealing material 14, and a liquid crystal layer 5 is disposed between the element substrate 10 and the counter substrate 20.

The element substrate 10 includes, between a substrate 10a thereof and the liquid crystal layer 5, light-transmitting pixel electrodes 9a provided for each pixel P, TFTs 11 serving as pixel switching elements disposed to correspond to the pixel electrodes 9a, and a first alignment film 12 disposed to cover the pixel electrodes 9a.

The counter substrate 20 includes, between a substrate 20a thereof and the liquid crystal layer 5, the parting portion 27, a common electrode 21, and a second alignment film 22 disposed to cover the common electrode 21.

The parting portion 27 is provided at a position where it overlaps the scanning line driving circuit 24 in a plan view. The parting portion 27 blocks light L from a laser light source (not shown) incident from the counter substrate 20 side such that it is not incident on the peripheral circuits including the scanning line driving circuit 24, thereby achieving a function of preventing malfunction of the peripheral circuits due to the light L.

The pixel electrodes 9a and the common electrode 21 are made of a transparent conductive material such as indium tin oxide (ITO), for example. Each of the substrate 10a and the substrate 20a is a substrate having translucency and for example, a glass substrate or a silica substrate is used therefor. The first alignment film 12 and the second alignment film 22 are made of an inorganic material such as silicon oxide. The liquid crystal layer 5 is configured of, for example, liquid crystal having negative dielectric anisotropy.

1.2. Outline of Configuration of Liquid Crystal Device 1000

Figure 3:
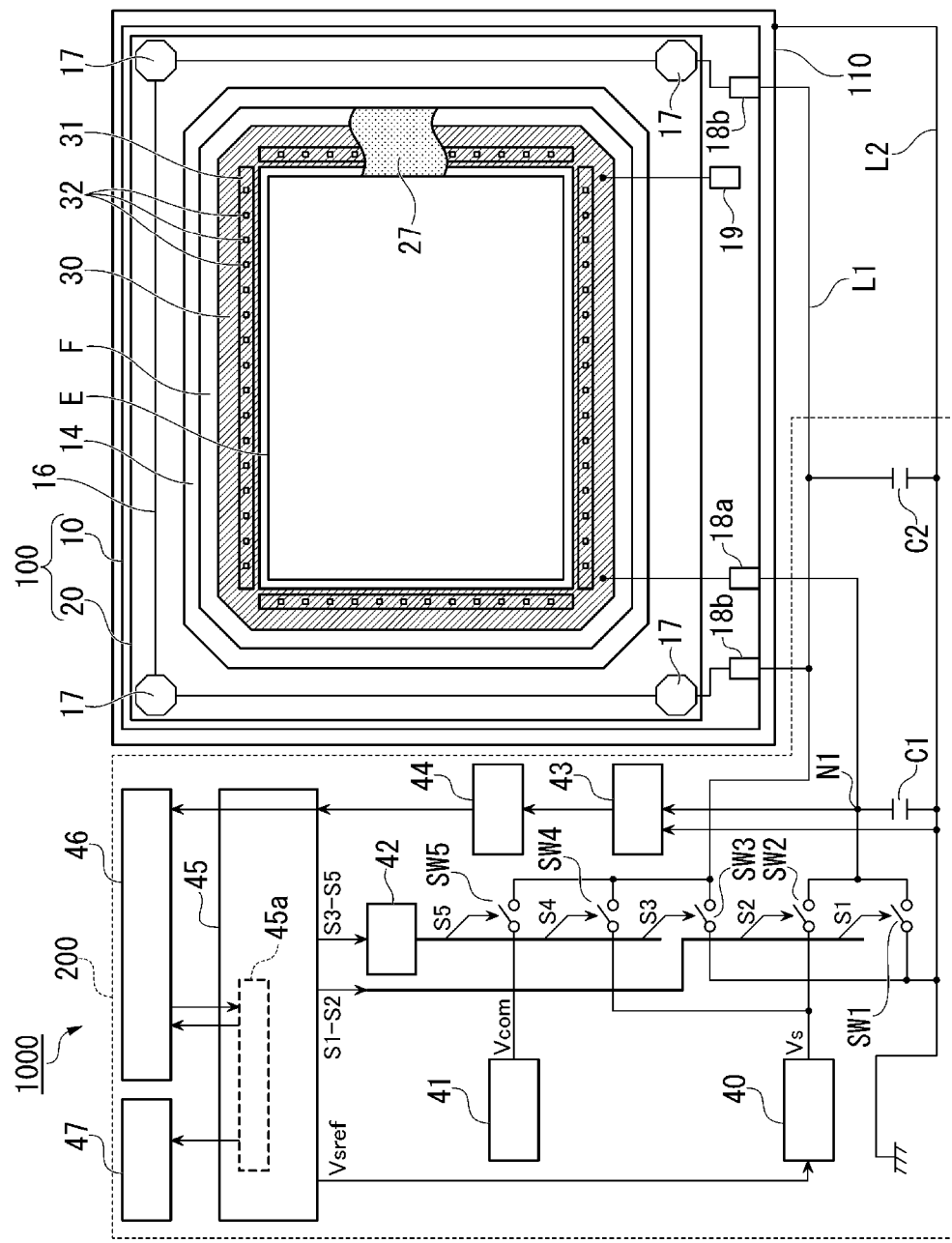
FIG. 3 is an explanatory diagram showing a schematic configuration of the liquid crystal device of the first embodiment.

FIG. 3 is an explanatory diagram showing a schematic configuration of the liquid crystal device 1000. The liquid crystal device 1000 includes the liquid crystal panel 100 and the measurement circuit 200. Although not shown in FIGS. 1 and 2, the liquid crystal panel 100 includes a detection electrode 30 disposed in the peripheral region F between the sealing material 14 and the display region E. The detection electrode 30 is one of electrodes provided on the element substrate 10 and is made of a transparent conductive material such as ITO, for example, like the pixel electrodes 9a. The detection electrode 30 is disposed immediately below the parting portion 27 to surround the display region E, for example. Also, only a part of the parting portion 27 is shown for the sake of explanation. In addition, illustration of the sealing material 14 is simplified assuming that it is applied in a substantially frame shape.

The detection electrode 30 may be formed in a so-called solid film pattern or may be formed by coupling a plurality of pixel electrodes 9a. When the detection electrode 30 is configured of an ITO film, a lower wiring layer 31 having aluminum as a main component disposed under the ITO film may be added as an auxiliary wiring in order to improve potential responsiveness of the detection electrode 30. The detection electrode 30 is electrically coupled to the lower wiring layer 31 via a plurality of contact holes 32.

The detection electrode 30 is electrically coupled to a first electrode coupling terminal 18a, which is one of a plurality of external coupling terminals 18. The detection electrode 30 is electrically coupled to the measurement circuit 200 via the first electrode coupling terminal 18a. Also, the detection electrode 30 is electrically coupled to a continuity check terminal 19. The continuity check terminal 19 is disposed in a region between the external coupling terminals 18 and the counter substrate 20 on a surface of the element substrate 10. Electrical coupling between the first electrode coupling terminal 18a and the detection electrode 30 can be inspected by measuring electrical resistance between the first electrode coupling terminal 18a and the continuity check terminal 19.

The inter-substrate conducting portions 17 are disposed to correspond to the four corners of the counter substrate 20 and are electrically coupled to each other via a common potential line 16. The common potential line 16 is electrically coupled to, for example, second electrode coupling terminals 18b located at left and right ends among the plurality of external coupling terminals 18. That is, the common electrode 21 of the counter substrate 20 is electrically coupled to the second electrode coupling terminals 18b via the common potential line 16 and the inter-substrate conducting portions 17. The common electrode 21 is electrically coupled to the measurement circuit 200 via the second electrode coupling terminals 18b.

As understood from the configuration described above, in the peripheral region F of the liquid crystal panel 100, the liquid crystal layer 5 is disposed between the detection electrode 30 and the common electrode 21. In addition, the liquid crystal panel 100 includes the pixel electrodes 9a provided in the display region E, and the detection electrode 30 is provided outside the display region E. In this embodiment, the detection electrode 30 corresponds to a first electrode, and the common electrode 21 corresponds to a second electrode.

The measurement circuit 200 supplies a potential to each of the detection electrode 30 and the common electrode 21 and measures a detection electrode potential Vd, which is a potential of the detection electrode 30. The measurement circuit 200 includes a measurement potential generation circuit 40, a common potential generation circuit 41, a level shifter 42, an amplifier circuit 43, an A/D converter 44, a central control circuit 45, a measured value storage circuit 46, a display information generation circuit 47, a first switch SW1, a second switch SW2, a third switch SW3, a fourth switch SW4, a fifth switch SW5, a first capacitor C1, a second capacitor C2, a common electrode line L1, a ground potential line L2, and a first node N1.

The common electrode line L1 is electrically coupled to the second electrode coupling terminals 18b of the liquid crystal panel 100. That is, the common electrode line L1 is electrically coupled to the common electrode 21 via the second electrode coupling terminals 18b. In this embodiment, the common electrode line L1 corresponds to a second electrode line.

The ground potential line L2 is a wiring to which a ground potential is applied. The ground potential line L2 is electrically coupled to a ground of a digital circuit system in the liquid crystal device 1000 at one point. With such a configuration, it is possible to achieve an effect of inhibiting measurement noise caused by the digital circuit system at the time of measurement, which will be described later. The ground potential line L2 is electrically coupled to the common electrode line L1 via the second capacitor C2. That is, the second capacitor C2 provides electrical coupling between the common electrode line L1 and the ground potential line L2. For example, the second capacitor C2 has a capacitance value of 0.1 µF or more. The potential of the common electrode 21 is stabilized by the second capacitor C2. Accordingly, at the time of measurement, which will be described later, measurement noise received by the detection electrode 30 having a coupling capacitance mainly due to the liquid crystal layer 5 between the detection electrode 30 and the common electrode 21 is inhibited. In addition, in the liquid crystal device 1000, the liquid crystal panel 100 is held by a holder 110 made of a conductor, and the ground potential line L2 is electrically coupled to the holder 110. By electrically coupling the ground potential line L2 to the holder 110, an effect of inhibiting the measurement noise received by the detection electrode 30 at the time of measurement, which will be described later, is achieved.

The first node N1 in the measurement circuit 200 is electrically coupled to the first electrode coupling terminal 18a of the liquid crystal panel 100. That is, the first node N1 is electrically coupled to the detection electrode 30 via the first electrode coupling terminal 18a. The first node N1 is electrically coupled to the ground potential line L2 via the first switch SW1. The first node N1 is electrically coupled to an output terminal of the measurement potential generation circuit 40 via the second switch SW2. The first node N1 is electrically coupled to the ground potential line L2 via the first capacitor C1. That is, the first capacitor C1 provides electrical coupling between the first node N1 and the ground potential line L2. For example, the first capacitor C1 has a capacitance value of about 1 nF to 10 nF. The first capacitor C1 inhibits the measurement noise received by the detection electrode 30 at the time of measurement, which will be described later. In addition, detection sensitivity to an increase in mobile ions can be adjusted by the capacitance value of the first capacitor C1.

A state of the first switch SW1 is controlled by a first control signal S1 output from the central control circuit 45.

For example, as the first control signal S1, a logic signal having an amplitude of 5 V is output from the central control circuit 45, and when the logic is "H," the first switch SW1 is turned on. A state of the second switch SW2 is controlled by a second control signal S2 output from the central control circuit 45. For example, as the second control signal S2, a logic signal having an amplitude of 5 V is output from the central control circuit 45, and when the logic is "H," the second switch SW2 is turned on. That is, the first switch SW1 and the second switch SW2 are controlled to be on by a first voltage (5V).

The common electrode line L1 is electrically coupled to the ground potential line L2 via the third switch SW3. The common electrode line L1 is electrically coupled to the output terminal of the measurement potential generation circuit 40 via the fourth switch SW4. The common electrode line L1 is electrically coupled to an output terminal of the common potential generation circuit 41 via the fifth switch SW5.

A state of the third switch SW3 is controlled by a third control signal S3 output from the central control circuit 45 via the level shifter 42. For example, as the third control signal S3, a logic signal having an amplitude of 5 V is output from the central control circuit 45, but this logic signal is converted into a logic signal having an amplitude of 15 V by the level shifter 42. That is, the third control signal S3 having an amplitude of 15 V is output from the level shifter 42, and when the logic is "H," the third switch SW3 is turned on.

A state of the fourth switch SW4 is controlled by a fourth control signal S4 output from the central control circuit 45 via the level shifter 42. For example, as the fourth control signal S4, a logic signal having an amplitude of 5 V is output from the central control circuit 45, but this logic signal is converted into a logic signal having an amplitude of 15 V by the level shifter 42. That is, the fourth control signal S4 having an amplitude of 15 V is output from the level shifter 42, and when the logic is "H," the fourth switch SW4 is turned on.

A state of the fifth switch SW5 is controlled by a fifth control signal S5 output from the central control circuit 45 via the level shifter 42. For example, as the fifth control signal S5, a logic signal having an amplitude of 5 V is output from the central control circuit 45, but this logic signal is converted into a logic signal having an amplitude of 15 V by the level shifter 42. That is, the fifth control signal S5 having an amplitude of 15 V is output from the level shifter 42, and when the logic is "H," the fifth switch SW5 is turned on.

As described above, the third switch SW3, the fourth switch SW4, and the fifth switch SW5 are controlled to be on by a second voltage (15 V) higher than the first voltage (5 V).

The measurement potential generation circuit 40 outputs a measurement potential Vs corresponding to a reference voltage Vsref output from the central control circuit 45. For example, the measurement potential generation circuit 40 outputs the measurement potential Vs having the same polarity and absolute value as the reference voltage Vsref. That is, the measurement potential Vs output from the measurement potential generation circuit 40 is variably controlled by the central control circuit 45. Such a measurement potential generation circuit 40 can be realized by, for example, a voltage follower to which the reference voltage Vsref is input.

The common potential generation circuit 41 outputs a predetermined common potential Vcom. For example, the common potential Vcom is 5 V during normal driving of the liquid crystal panel 100.

The amplifier circuit 43 amplifies a potential of the first node N1 electrically coupled to the detection electrode 30. In the following description, the potential of the first node N1 may be referred to as a first node potential. The amplifier circuit 43 outputs the amplified first node potential to the A/D converter 44. The A/D converter 44 converts the first node potential amplified by the amplifier circuit 43 into a digital value. The A/D converter 44 outputs the digital value of the first node potential to the central control circuit 45 as a measured value of the detection electrode potential Vd. In this way, in this embodiment, the amplifier circuit 43 and the A/D converter 44 correspond to a potential measurement circuit that measures the potential of the first node N1 as a detection electrode potential Vd and outputs the measured value of the detection electrode potential Vd to the central control circuit 45.

For example, the amplifier circuit 43 is a non-inverting amplifier circuit using an operational amplifier. A ground terminal of the amplifier circuit 43 is electrically coupled to the ground potential line L2 to which the holder 110, the first capacitor C1, and the second capacitor C2 are electrically coupled. In this way, by electrically coupling the ground terminal of the amplifier circuit 43 to the ground potential line L2, it is possible to inhibit superimposition of noise components accompanying operations of the digital circuit system forming the measurement circuit 200 on the measured value of the detection electrode potential Vd.

Also, as understood from the configuration of the above-described amplifier circuit 43, the measured value of the detection electrode potential Vd obtained from the A/D converter 44 is a value corresponding to a potential difference between the first node potential, that is, the potential of the detection electrode 30, and the ground potential.

The central control circuit 45 controls each circuit included in the measurement circuit 200 at the time of measuring a state of deterioration of the liquid crystal layer 5. Specifically, the central control circuit 45 outputs the reference voltage Vsref to the measurement potential generation circuit 40. The central control circuit 45 outputs the first control signal S1 to the first switch SW1 and outputs the second control signal S2 to the second switch SW2. The central control circuit 45 outputs the third control signal S3 to the fifth control signal S5 to the third switch SW3 to the fifth switch SW5 via the level shifter 42. In this way, the central control circuit 45 according to this embodiment corresponds to a control circuit that outputs the reference voltage Vsref to the measurement potential generation circuit 40 and controls the first switch SW1 to the fifth switch SW5.

The central control circuit 45 stores the measured value of the detection electrode potential Vd output from the A/D converter 44 in the measured value storage circuit 46. The measured value storage circuit 46 stores the measured value of the detection electrode potential Vd under the control of the central control circuit 45. The central control circuit 45 includes a determination circuit 45a. The determination circuit 45a determines the state of deterioration of the liquid crystal layer 5 based on the measured value stored in the measured value storage circuit 46. The display information generation circuit 47 generates display information of the state of deterioration of the liquid crystal layer 5 based on the measured value and the determination results.

Also, each circuit forming the measurement circuit 200 may be configured such that a part or all of functions realized by each circuit are realized by, for example, a control program of the central control circuit 45. In addition, the measurement circuit 200 may be one integrated circuit (IC) or may be divided into a plurality of ICs.

Although not shown, the liquid crystal device 1000 may include a panel control circuit that controls the liquid crystal panel 100 in addition to the above-described measurement circuit 200. The panel control circuit is a circuit that normally drives the liquid crystal panel 100. In other words, the panel control circuit is a circuit that causes the liquid crystal panel 100 to operate as a light modulation device. The panel control circuit outputs a timing signal, an image signal, a control signal, and the like to the data line driving circuit 23, the scanning line driving circuit 24, and the precharge circuit 25 via other external coupling terminals 18 except the first electrode coupling terminal 18a and the second electrode coupling terminals 18b among the external coupling terminals 18 of the liquid crystal panel 100.

The data line driving circuit 23, the scanning line driving circuit 24, and the precharge circuit 25 are controlled by the panel control circuit, and thus a scanning signal for switching the TFT 11 of each pixel P to the on state is supplied to each scanning line (not shown), and a potential applied to the pixel electrode 9a of each pixel P is supplied to each data line (not shown). As a result, a light transmittance of each pixel P becomes a value determined by a potential difference between the pixel electrode 9a and the common electrode 21. In this way, a state in which the light transmittance of each pixel P is controlled by the panel control circuit and thus the liquid crystal panel 100 operates as a light modulation device to display an image is referred to as during the normal driving of the liquid crystal panel 100. In addition, in each pixel P, AC driving is performed during the normal driving in which an image is displayed, and a polarity of a voltage applied to the liquid crystal layer 5 of each pixel P is inverted for each one frame period in which update of a transmittance state of the pixel P included in the display region E is completed.

Also, during the normal driving of the liquid crystal panel 100, the central control circuit 45 of the measurement circuit 200 controls the first switch SW1 to the fourth switch SW4 to be turned off and controls the fifth switch SW5 to be turned on. Thus, during the normal driving of the liquid crystal panel 100, the common potential Vcom output from the common potential generation circuit 41 of the measurement circuit 200 is supplied to the common electrode 21 of the liquid crystal panel 100.

In the liquid crystal device 1000, the measurement circuit 200 and the panel control circuit may be disposed on the same substrate, or the measurement circuit 200 and the panel control circuit may be disposed on a plurality of different substrates. For example, the substrate on which the measurement circuit 200 and the panel control circuit are disposed is a rigid board or a flexible printed circuit (FPC) board.

1.3. Outline of Method for Measuring Physical Properties of Liquid Crystal Layer 5

Figure 4:
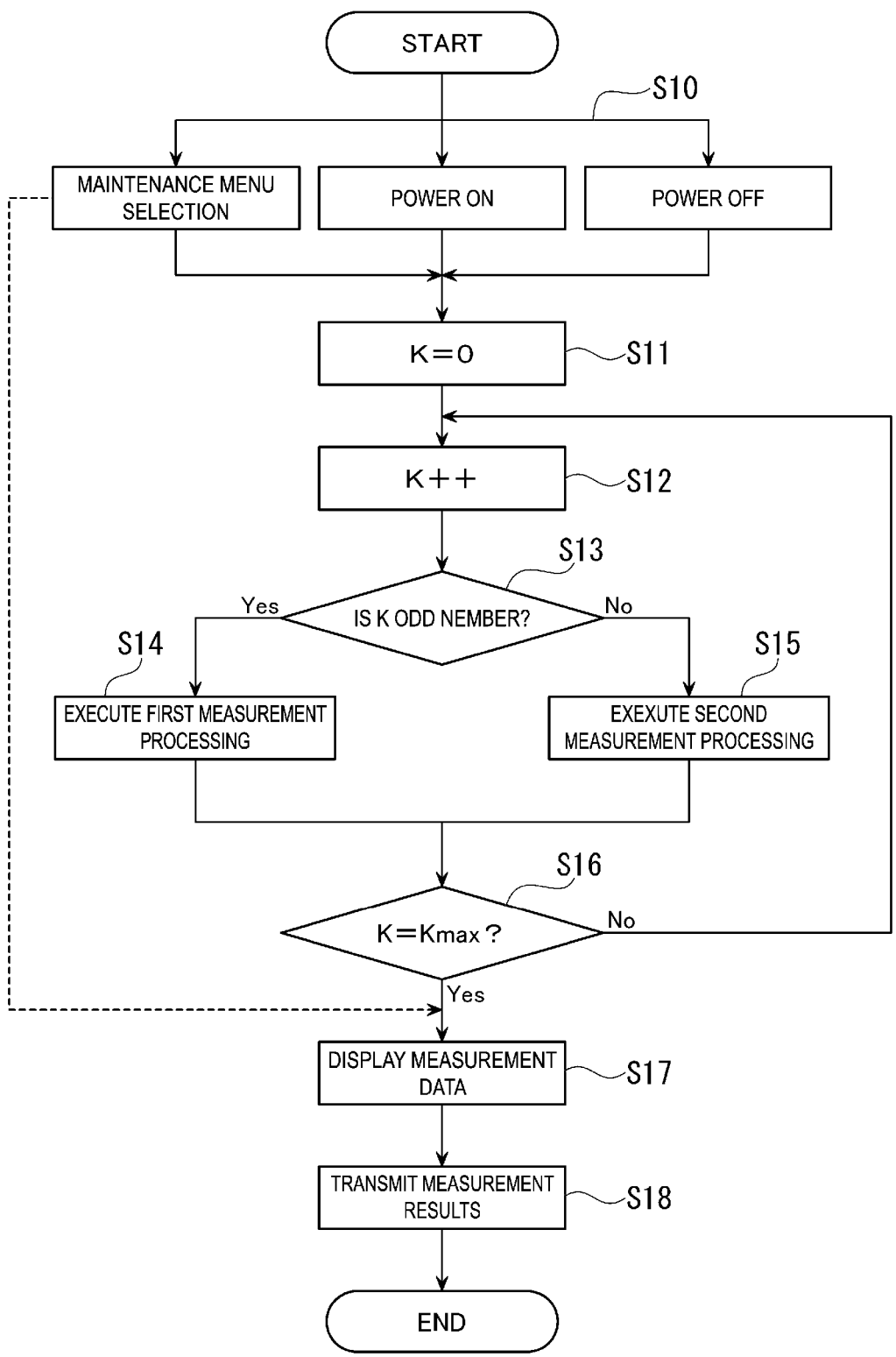
FIG. 4 is a schematic flowchart showing a method for measuring physical properties of a liquid crystal layer.

FIG. 4 is a schematic flowchart showing a method for measuring physical properties of the liquid crystal layer 5 of the liquid crystal panel 100. A method for measuring physical properties of the liquid crystal layer 5 will be described below with reference to FIG. 4.

As shown in FIG. 4, in step S10, when a predetermined event occurs, the liquid crystal device 1000 shifts from a normal driving mode in which the normal driving is performed to a measurement mode in which measurement of physical properties of the liquid crystal layer 5 is performed and starts measuring the physical properties of the liquid crystal layer 5. Here, the predetermined event includes power-on and power-off of a projection display device using the liquid crystal device 1000, a measurement instruction from a maintenance menu selection in a projection display device using the liquid crystal device 1000, and the like, and occurrence of these events causes a measurement start command to be sent from the projection display device. When the central control circuit 45 of the measurement circuit 200 receives the measurement start command from the projection display device, it starts measuring the physical properties of the liquid crystal layer 5.

Also, step S10 shows a concept of a measurement mode transition event. In practice, for example, an instruction from the maintenance menu selection is an interrupt processing instruction, and power of the projection display device using the liquid crystal device 1000 is turned on. In addition, the measurement mode transition event does not force all of the exemplified "maintenance menu selection," "power-on," and "power-off." Further, in the present disclosure, measurement of the physical properties of the liquid crystal layer 5 is performed, for example, while a light source of the projection display device is off. Alternatively, it is performed with a configuration in which light from the light source is shielded by a mechanical light shielding mechanism. At the time of measuring the physical properties of the liquid crystal layer 5, if the light source of the projection display device is in a non-lighting state, no problem occurs in display of the projection display device.

When the measurement start command is received, the central control circuit 45 first resets a count value K indicating the number of times of execution of measurement processing, which will be described later, to "0" (step S11). Subsequently, the central control circuit 45 adds "1" to the count value K (step S12). Subsequently, the central control circuit 45 determines whether or not the count value K is an odd number (step S13).

When the count value K is an odd number (step S13: Yes), the central control circuit 45 executes first measurement processing (step S14). On the other hand, when the count value K is an even number (step S13: No), the central control circuit 45 executes second measurement processing (step S15). Specific contents of the first measurement processing and the second measurement processing will be described later.

After executing the first measurement processing or the second measurement processing, the central control circuit 45 determines whether or not the count value K is equal to an upper limit value Kmax (step S16). When the count value K is not equal to the upper limit value Kmax (step S16: No), the central control circuit 45 returns to step S12. On the other hand, when the count value K is equal to the upper limit value Kmax (step S16: Yes), the central control circuit 45 proceeds to step S17, which will be described later. Also, the upper limit value Kmax is set in advance in the control program of the measurement circuit 200. Alternatively, a numerical value may be set by an input means (not shown). The input means is, for example, an input key included in the measurement circuit 200, a PC coupled to the projection display device using the liquid crystal device 1000 in a wired or wireless manner, or the like. If the upper limit value Kmax is set to 2 or more, it is possible to calculate an average value of a plurality of measurement results of the first measurement processing or the second measurement processing and obtain data with good reproducibility. In a detailed measurement example, which will be described later, the upper limit value Kmax=20, and an average value of ten first measurement processing is calculated.

As understood from the description of the processing from step S11 to step S16, the central control circuit 45 alternately executes the first measurement processing and the second measurement processing until the count value K becomes equal to the upper limit value Kmax. For example, when the upper limit value Kmax is "10," each of the first measurement processing and the second measurement processing is executed five times. Hereinafter, the first measurement processing and the second measurement processing will be described in detail with reference to FIGS. 5 and 6.

Figure 5:
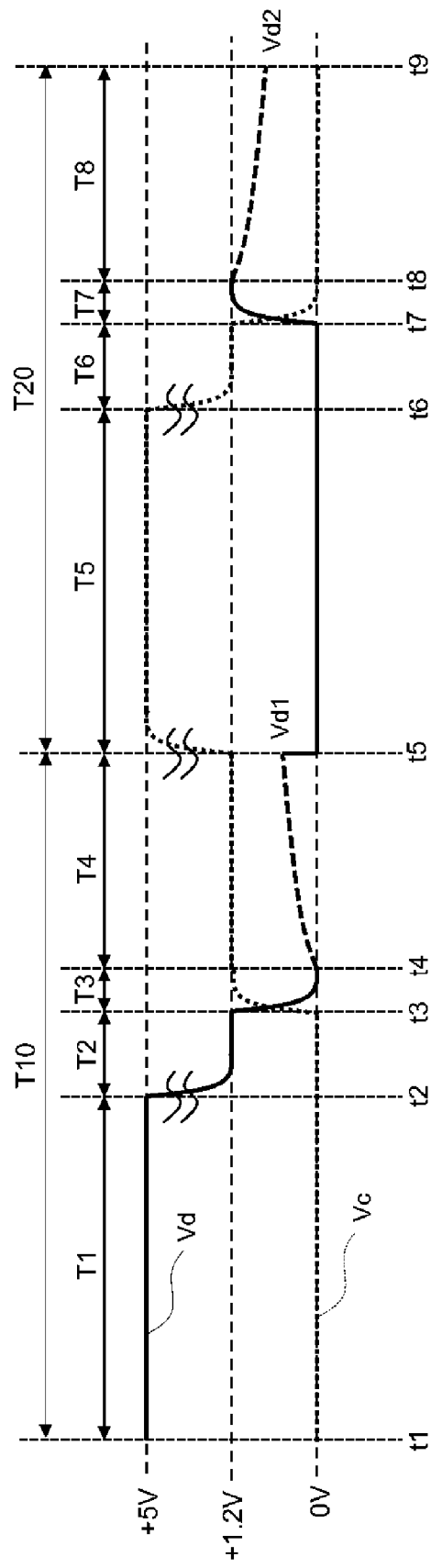
FIG. 5 is a diagram showing a change over time in potential of each of a detection electrode and a common electrode according to the first embodiment.

FIG. 5 is a diagram showing a change over time in potential of the detection electrode 30 and the common electrode 21 at the time of execution of the first measurement processing and the second measurement processing. In FIG. 5, the horizontal axis is time, and the vertical axis is voltage. In FIG. 5, for convenience of explanation, display of the potential of each electrode is different from actual one. For example, a value of 1.2 V on the vertical axis is plotted at approximately half the 5 V. In FIG. 5, the detection electrode potential Vd, which is the potential of the detection electrode 30, is indicated by a solid line with some exceptions, and a common electrode potential Vc, which is the potential of the common electrode 21, is indicated by a dotted line.

Figure 6:
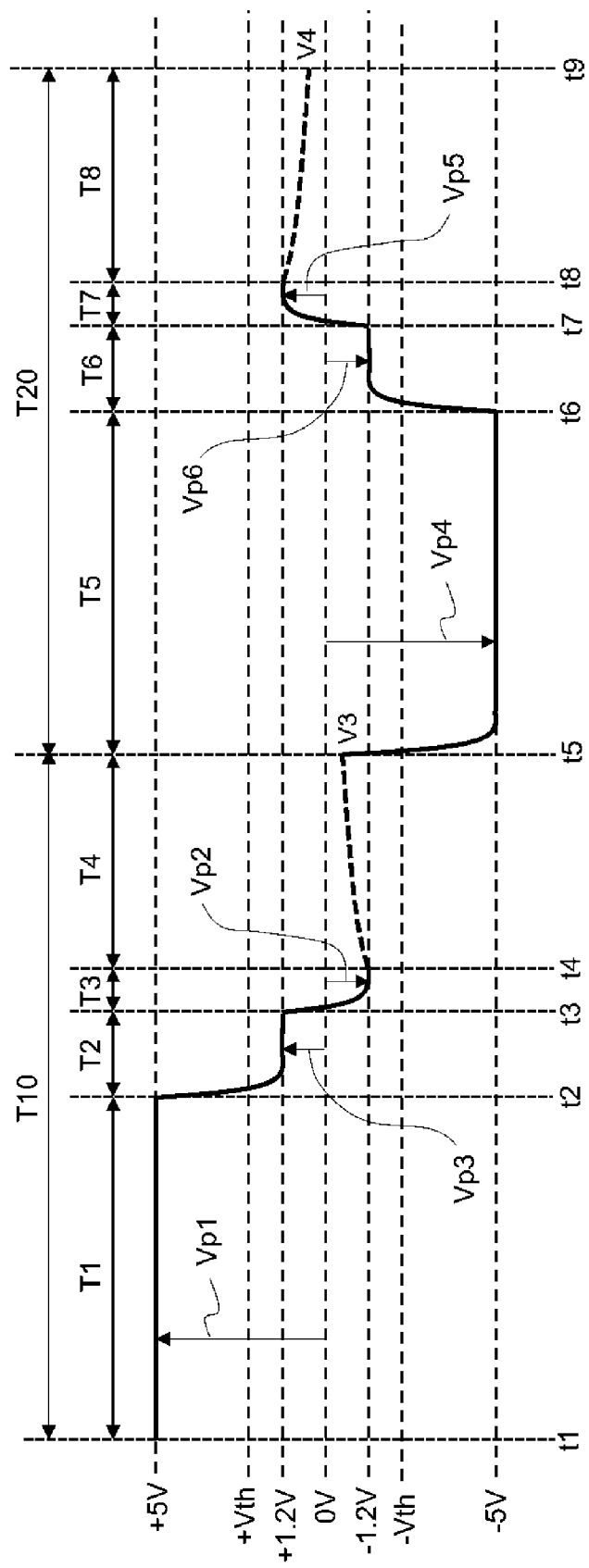
FIG. 6 is a diagram showing a change over time in potential difference between the detection electrode and the common electrode at the time of executing a first measurement processing and a second measurement processing according to the first embodiment.

FIG. 6 is a diagram showing a change over time in potential difference between the detection electrode 30 and the common electrode 21 at the time of execution of the first measurement processing and the second measurement processing. In FIG. 6, the horizontal axis is time, and the vertical axis is a voltage of the detection electrode 30 when the common electrode 21 is used as a reference. In other words, it is a voltage applied to the liquid crystal layer 5 in the detection electrode 30. In FIG. 6, a polarity of a potential difference when the detection electrode potential Vd is higher than the common electrode potential Vc is defined as a positive polarity.

In FIGS. 5 and 6, the first measurement processing is executed during a period T10 from time t1 to time t5. In the following description, the period T10 during which the first measurement processing is executed may be referred to as a first measurement period T10. The first measurement period T10 includes a first reverse sweep period T1, a first relaxation period T2, a first charging period T3, and a first discharging period T4. The first reverse sweep period T1 is a period from time t1 to time t2. The first relaxation period T2 is a period from time t2 to time t3. The first charging period T3 is a period from time t3 to time t4. The first discharging period T4 is a period from time t4 to time t5.

In the first reverse sweep period T1, the measurement circuit 200 supplies a potential to each of the detection electrode 30 and the common electrode 21 so that the potential difference between the detection electrode 30 and the common electrode 21 becomes a first potential difference Vp1.

Specifically, in the first reverse sweep period T1, the central control circuit 45 outputs, for example, the reference voltage Vsref of +5 V to the measurement potential generation circuit 40. Thus, the measurement potential Vs of +5 V is output from the measurement potential generation circuit 40. Also, in the first reverse sweep period T1, the central control circuit 45 controls the second switch SW2 and the third switch SW3 to be turned on and controls the first switch SW1, the fourth switch SW4, and the fifth switch SW5 to be turned off.

In the first reverse sweep period T1, the central control circuit 45 controls the first switch SW1 to the fifth switch SW5 as described above, whereby the output terminal of the measurement potential generation circuit 40 is electrically coupled to the detection electrode 30, and the ground potential line L2 is electrically coupled to the common electrode 21. Thus, in the first reverse sweep period T1, the measurement potential Vs of +5 V is supplied to the detection electrode 30, and the ground potential, that is, 0 V is supplied to the common electrode 21. As a result, as shown in FIG. 5, in the first reverse sweep period T1, the detection electrode potential Vd becomes +5 V and the common electrode potential Vc becomes 0 V. Also, as shown in FIG. 6, in the first reverse sweep period T1, the potential difference between the detection electrode 30 and the common electrode 21 becomes the first potential difference Vp1, that is, +5 V.

In this way, in the first reverse sweep period T1, the measurement circuit 200 supplies the measurement potential Vs of +5 V to the detection electrode 30 and supplies the ground potential to the common electrode 21 so that the potential difference between the detection electrode 30 and the common electrode 21 becomes the first potential difference Vp1 of +5 V. In this embodiment, the first reverse sweep period T1 corresponds to a first period.

In the first relaxation period T2 between the first reverse sweep period T1 and the first charging period T3, the measurement circuit 200 supplies a potential to each of the detection electrode 30 and the common electrode 21 so that the potential difference between the detection electrode 30 and the common electrode 21 becomes a third potential difference Vp3 having the same polarity as the first potential difference Vp1 and having an absolute value smaller than the absolute value of the first potential difference Vp1.

Specifically, in the first relaxation period T2, the central control circuit 45 outputs, for example, the reference voltage Vsref of +1.2 V to the measurement potential generation circuit 40. Thus, the measurement potential Vs of +1.2 V is output from the measurement potential generation circuit 40. Also, in the first relaxation period T2, the central control circuit 45 controls the second switch SW2 and the third switch SW3 to be turned on and controls the first switch SW1, the fourth switch SW4, and the fifth switch SW5 to be turned on.

In the first relaxation period T2, the central control circuit 45 controls the first switch SW1 to the fifth switch SW5 as described above, whereby the output terminal of the measurement potential generation circuit 40 is electrically coupled to the detection electrode 30, and the ground potential line L2 is electrically coupled to the common electrode 21. Thus, in the first relaxation period T2, the measurement potential Vs of +1.2 V is supplied to the detection electrode 30, and the ground potential is supplied to the common electrode 21. As a result, as shown in FIG. 5, in the first relaxation period T2, the detection electrode potential Vd becomes +1.2 V, and the common electrode potential Vc becomes 0 V. Also, as shown in FIG. 6, in the first relaxation period T2, the potential difference between the detection electrode 30 and the common electrode 21 becomes the third potential difference Vp3, that is, +1.2 V.

In this way, in the first relaxation period T2, the measurement circuit 200 supplies the measurement potential Vs of +1.2 V to the detection electrode 30 and supplies the ground potential to the common electrode 21 so that the potential difference between the detection electrode 30 and the common electrode 21 becomes the third potential difference Vp3 (+1.2 V) having the same polarity as the first potential difference Vp1 and having the absolute value smaller than the absolute value of the first potential difference Vp1. In this embodiment, the first relaxation period T2 corresponds to a fourth period.

In the first charging period T3 after the first reverse sweep period T1 and after the first relaxation period T2, the measurement circuit 200 supplies a potential to each of the detection electrode 30 and the common electrode 21 so that the potential difference between the detection electrode 30 and the common electrode 21 becomes a second potential difference Vp2 having a polarity different from that of the first potential difference Vp1.

Specifically, in the first charging period T3, the central control circuit 45 outputs, for example, the reference voltage Vsref of +1.2 V to the measurement potential generation circuit 40. Thus, the measurement potential Vs of +1.2 V is output from the measurement potential generation circuit 40. Also, in the first charging period T3, the central control circuit 45 controls the first switch SW1 and the fourth switch SW4 to be turned on and controls the second switch SW2, the third switch SW3, and the fifth switch SW5 to be turned off.

In the first charging period T3, the central control circuit 45 controls the first switch SW1 to the fifth switch SW5 as described above, whereby the output terminal of the measurement potential generation circuit 40 is electrically coupled to the common electrode 21 and the ground potential line L2 is electrically coupled to the detection electrode 30. Thus, in the first charging period T3, the ground potential is supplied to the detection electrode 30, and the measurement potential Vs of +1.2 V is supplied to the common electrode 21. As a result, as shown in FIG. 5, in the first charging period T3, the detection electrode potential Vd becomes +0 V, and the common electrode potential Vc becomes +1.2 V. Also, as shown in FIG. 6, in the first charging period T3, the potential difference between the detection electrode 30 and the common electrode 21 becomes the second potential difference Vp2, that is, −1.2 V.

In this way, in the first charging period T3, the measurement circuit 200 supplies the measurement potential Vs of +1.2 V to the common electrode 21 and supplies the ground potential to the detection electrode 30 so that the potential difference between the detection electrode 30 and the common electrode 21 becomes the second potential difference Vp2 (−1.2 V) having a polarity different from that of the first potential difference Vp1. In this embodiment, the first charging period T3 corresponds to a second period.

In the first discharging period T4 after the first charging period T3, the measurement circuit 200 stops supplying the potential to the detection electrode 30 and supplies the same potential as that during the first charging period T3 to the common electrode 21 to measure the detection electrode potential Vd at least once, for example, at the end of the first discharging period T4.

Specifically, in the first discharging period T4, the central control circuit 45 outputs, for example, the reference voltage Vsref of +1.2 V to the measurement potential generation circuit 40. Thus, the measurement potential Vs of +1.2 V is output from the measurement potential generation circuit 40. Also, in the first discharging period T4, the central control circuit 45 controls the fourth switch SW4 to be turned on and controls the first switch SW1, the second switch SW2, the third switch SW3, and the fifth switch SW5 to be turned off.

In the first discharging period T4, the central control circuit 45 controls the first switch SW1 to the fifth switch SW5 as described above, whereby the output terminal of the measurement potential generation circuit 40 is electrically coupled to the common electrode 21 and the ground potential line L2 is electrically decoupled from the detection electrode 30. Thus, in the first discharging period T4, the measurement potential Vs of +1.2 V is continuously supplied to the common electrode 21, but supply of the potential to the detection electrode 30 is stopped, and thus the liquid crystal layer 5 discharges electric charges charged during the first charging period T3. As a result, as shown in FIG. 5, in the first discharging period T4, the detection electrode potential Vd1 gradually changes from the ground potential 0 V toward the potential (+1.2 V) applied to the common electrode 21 and reaches the potential Vd1 at time t5. The value of the detection electrode potential Vd1 depends on an amount of mobile ions contained in the liquid crystal layer 5. Accordingly, as will be described later, the state of deterioration of the liquid crystal layer 5 can be determined by measuring the detection electrode potential Vd1 at the end of the first discharging period T4.

Also, as shown in FIG. 6, the detection electrode potential Vd1 at the end of the first discharging period T4 corresponds to a potential difference V3 with the common electrode 21 as a reference.

For example, the central control circuit 45 measures the detection electrode potential Vd1 at time t5 when the first discharging period T4 ends. Specifically, the detection electrode potential Vd1 is amplified by the amplifier circuit 43, and an output of the amplifier circuit 43 is input to the A/D converter 44. The central control circuit 45 acquires a digital value output from the A/D converter 44 at time t5 as the measured value of the detection electrode potential Vd1. The central control circuit 45 causes the measured value storage circuit 46 to store the measured value of the detection electrode potential Vd1 obtained at time t5.

In this way, in the first discharging period T4, the measurement circuit 200 stops supplying the potential to the detection electrode 30, supplies the measurement potential Vs of +1.2 V, which is the same as that in the first charging period T3, to the common electrode 21, and measures the detection electrode potential Vd1 at least once, for example, at time t5 when the first discharging period T4 ends. In this embodiment, the first discharging period T4 corresponds to a third period.

The first measurement processing has been described above.

The first reverse sweep period T1 is preferably longer than one frame period in the display region E. For example, when one frame period is about 16 ms, the first reverse sweep period T1 is equal to or longer than 20 ms. Also, in the above description, the case in which the first potential difference Vp1 in the first reverse sweep period T1 is +5 V has been exemplified, but the absolute value of the first potential difference Vp1 is preferably equal to or greater than the maximum applied voltage of the liquid crystal layer 5 of the pixels P in normal driving. In other words, the absolute value of the first potential difference Vp1 is preferably equal to or greater than the maximum applied voltage of the liquid crystal layer 5 in the display region E. The reason why the length of the first reverse sweep period T1 and the absolute value of the first potential difference Vp1 are set as described above will be described later.

The first charging period T3 is preferably shorter than one frame period in the display region E. For example, when one frame period is about 16 ms, the first charging period T3 is 5 ms. In the above description, the case in which the absolute value of the second potential difference Vp2 in the first charging period T3 is 1.2 V has been exemplified, but the absolute value of the second potential difference Vp2 is preferably greater than 0 V and smaller than a threshold voltage Vth of the liquid crystal layer 5. For example, in a vertical alignment (VA) liquid crystal panel 100, when a gap is about 2.6 μm, the threshold voltage Vth of the liquid crystal layer 5 is about 2.1 V. Also, the threshold voltage Vth of the liquid crystal layer 5 is a driving voltage at which a transmittance or brightness of the liquid crystal layer 5 becomes about 10% at its maximum gradation ratio, and more preferably a voltage immediately before the liquid crystal molecules start to move or a voltage immediately before an alignment state of the liquid crystal molecules starts to change. In this embodiment, since the liquid crystal panel 100 is a normally black type, and thus the threshold voltage Vth of the liquid crystal layer 5 is defined as described above. In the case of a normally white type liquid crystal panel 100, for example, the threshold voltage Vth of the liquid crystal layer 5 can be defined as a driving voltage at which the transmittance or brightness of the liquid crystal layer 5 is about 90% at its maximum gradation ratio. The reason why the length of the first charging period T3 and the absolute value of the second potential difference Vp2 are set as described above will be described later.

Further, in the above description, the case in which the absolute value of the third potential difference Vp3 in the first relaxation period T2 is 1.2 V, which is the same as the absolute value of the second potential difference Vp2, has been exemplified, but the absolute value of the third potential difference Vp3 is preferably greater than 0 V and smaller than the threshold voltage Vth of the liquid crystal layer 5. The reason why the absolute value of the third potential difference Vp3 is set as described above will be described later. Also, the absolute value of the third potential difference Vp3 does not necessarily have to be the same as the absolute value of the second potential difference Vp2. In addition, the potential difference may change gradually with time, for example, in the process of changing the potential difference from the first potential difference Vp1 to the third potential difference Vp3.

Next, the second measurement processing will be described.

In FIGS. 5 and 6, the second measurement processing is executed during a period T20 from time t5 to time t9. In the following description, the period T20 during which the second measurement processing is executed may be referred to as a second measurement period T20. The second measurement period T20 includes a second reverse sweep period T5, a second relaxation period T6, a second charging period T7, and a second discharging period T8. The second reverse sweep period T5 is a period from time t5 to time t6. The second relaxation period T6 is a period from time t6 to time t7. The second charging period T7 is a period from time t7 to time t8. The second discharging period T8 is a period from time t8 to time t9.

In the second reverse sweep period 15 after the first discharging period T4, the measurement circuit 200 supplies a potential to each of the detection electrode 30 and the common electrode 21 so that the potential difference between the detection electrode 30 and the common electrode 21 becomes a fourth potential difference Vp4 having a polarity different from that of the first potential difference Vp1 and having the same absolute value as that of the first potential difference Vp1.

Specifically, in the second reverse sweep period T5, the central control circuit 45 outputs, for example, the reference voltage Vsref of +5 V to the measurement potential generation circuit 40. Thus, the measurement potential Vs of +5 V is output from the measurement potential generation circuit 40. Further, in the second reverse sweep period T2, the central control circuit 45 controls the first switch SW1 and the fourth switch SW4 to be turned on and controls the second switch SW2, the third switch SW3, and the fifth switch SW5 to be turned off.

In the second reverse sweep period T5, the central control circuit 45 controls the first switch SW1 to the fifth switch SW5 as described above, whereby the output terminal of the measurement potential generation circuit 40 is electrically coupled to the common electrode 21 and the ground potential line L2 is electrically coupled to the detection electrode 30. Thus, in the second reverse sweep period T5, the measurement potential Vs of +5 V is supplied to the common electrode 21, and the ground potential is supplied to the detection electrode 30. As a result, as shown in FIG. 5, in the second reverse sweep period T5, the detection electrode potential Vd becomes 0 V and the common electrode potential Vc becomes +5 V. Further, as shown in FIG. 6, in the second reverse sweep period T5, the potential difference between the detection electrode 30 and the common electrode 21 is the fourth potential difference Vp4, that is, −5 V.

In this way, in the second reverse sweep period T5, the measurement circuit 200 supplies the measurement potential Vs of +5 V to the common electrode 21 and supplies the ground potential to the detection electrode 30 so that the potential difference between the detection electrode 30 and the common electrode 21 becomes the fourth potential difference Vp4 (−5 V) having a polarity different from that of the first potential difference Vp1 and having the same absolute value as that of the first potential difference Vp1. In this embodiment, the second reverse sweep period T5 corresponds to a fifth period.

In the second relaxation period T6 between the second reverse sweep period T5 and the second charging period T7, the measurement circuit 200 supplies a potential to each of the detection electrode 30 and the common electrode 21 so that the potential difference between the detection electrode 30 and the common electrode 21 becomes a sixth potential difference Vp6 having the same polarity as the fourth potential difference Vp4 and having an absolute value smaller than that of the fourth potential difference Vp4.

Specifically, in the second relaxation period T6, the central control circuit 45 outputs, for example, the reference voltage Vsref of +1.2 V to the measurement potential generation circuit 40. Thus, the measurement potential Vs of +1.2 V is output from the measurement potential generation circuit 40. In addition, in the second relaxation period T6, the central control circuit 45 controls the first switch SW1 and the fourth switch SW4 to be turned on and controls the second switch SW2, the third switch SW3, and the fifth switch SW5 to be turned off.

In the second relaxation period T6, the central control circuit 45 controls the first switch SW1 to the fifth switch SW5 as described above, whereby the output terminal of the measurement potential generation circuit 40 is electrically coupled to the common electrode 21, and the ground potential line L2 is electrically coupled to the detection electrode 30. Thus, in the second relaxation period T6, the measurement potential Vs of +1.2 V is supplied to the common electrode 21, and the ground potential is supplied to the detection electrode 30. As a result, as shown in FIG. 5, in the second relaxation period T6, the detection electrode potential Vd becomes 0 V, and the common electrode potential Vc becomes +1.2 V. Also, as shown in FIG. 6, in the second relaxation period T6, the potential difference between the detection electrode 30 and the common electrode 21 is the sixth potential difference Vp6, that is, −1.2 V.

In this way, in the second relaxation period T6, the measurement circuit 200 supplies the measurement potential Vs of +1.2 V to the common electrode 21 and supplies the ground potential to the detection electrode 30 so that the potential difference between the detection electrode 30 and the common electrode 21 becomes the sixth potential difference Vp6 (−1.2 V) having the same polarity as the fourth potential difference Vp4 and having an absolute value smaller than the fourth potential difference Vp4. In this embodiment, the second relaxation period T6 corresponds to an eighth period.

In the second charging period T7 after the second reverse sweep period T5 and after the second relaxation period T6, the measurement circuit 200 supplies a potential to each of the detection electrode 30 and the common electrode 21 so that the potential difference between the detection electrode 30 and the common electrode 21 becomes a fifth potential difference Vp5 having a polarity different from that of the fourth potential difference Vp4.

Specifically, in the second charging period T7, the central control circuit 45 outputs, for example, the reference voltage Vsref of +1.2 V to the measurement potential generation circuit 40. Thus, the measurement potential Vs of +1.2 V is output from the measurement potential generation circuit 40. Also, in the second charging period T7, the central control circuit 45 controls the second switch SW2 and the third switch SW3 to be turned on, and controls the first switch SW1, the fourth switch SW4, and the fifth switch SW5 to be turned off.

In the second charging period T7, the central control circuit 45 controls the first switch SW1 to the fifth switch SW5 as described above, whereby the output terminal of the measurement potential generation circuit 40 is electrically coupled to the detection electrode 30, and the ground potential line L2 is electrically coupled to the common electrode 21. Thus, in the second charging period T7, the ground potential is supplied to the common electrode 21, and the measurement potential Vs of +1.2 V is supplied to the detection electrode 30. As a result, as shown in FIG. 5, in the second charging period T7, the detection electrode potential Vd becomes +1.2 V, and the common electrode potential Vc becomes 0 V. Also, as shown in FIG. 6, in the second charging period T7, the potential difference between the detection electrode 30 and the common electrode 21 is the fifth potential difference Vp5, that is, +1.2 V.

In this way, in the second charging period T7, the measurement circuit 200 supplies the measurement potential Vs of +1.2 V to the detection electrode 30 and supplies the ground potential to the common electrode 21 so that the potential difference between the detection electrode 30 and the common electrode 21 becomes the fifth potential difference Vp5 (+1.2 V) having a polarity different from that of the fourth potential difference Vp4. In this embodiment, the second charging period T7 corresponds to a sixth period.

In the second discharging period T8 after the second charging period T7, the measurement circuit 200 stops supplying the potential to the detection electrode 30 and supplies the same potential as that in the second charging period T7 to the common electrode 21 to measure the detection electrode potential Vd at least once, for example, at the end of the second discharging period T8.

Specifically, in the second discharging period T8, the central control circuit 45 outputs, for example, the reference voltage Vsref of +1.2 V to the measurement potential generation circuit 40. Thus, the measurement potential Vs of +1.2 V is output from the measurement potential generation circuit 40. In addition, in the second discharging period T8, the central control circuit 45 controls the third switch SW3 to be turned on and controls the first switch SW1, the second switch SW2, the fourth switch SW4, and the fifth switch SW5 to be turned off.

In the second discharging period T8, the central control circuit 45 controls the first switch SW1 to the fifth switch SW5 as described above, whereby the output terminal of the measurement potential generation circuit 40 is electrically decoupled from the detection electrode 30 and the ground potential line L2 is electrically coupled to the common electrode 21. Thus, in the second discharging period T8, the ground potential continues to be supplied to the common electrode 21, but supply of the potential to the detection electrode 30 is stopped, and thus the liquid crystal layer 5 discharges electric charges charged in the second charging period T7. As a result, as shown in FIG. 5, in the second discharging period T8, the detection electrode potential Vd gradually changes from +1.2 V toward the potential (0 V) applied to the common electrode 21 and reaches a potential Vd2 at time t9. A value of the potential Vd2 depends on the amount of mobile ions contained in the liquid crystal layer 5. Accordingly, as will be described later, the state of deterioration of the liquid crystal layer 5 can be determined by measuring the detection electrode potential Vd2 at the end of the second discharging period T8.

Also, as shown in FIG. 6, the detection electrode potential Vd2 at the end of the second discharging period T8 corresponds to a potential difference V4 with the common electrode 21 as a reference.

For example, the central control circuit 45 measures the detection electrode potential Vd2 at time t9 when the second discharging period T8 ends. Specifically, the detection electrode potential Vd2 is amplified by the amplifier circuit 43, and the output of the amplifier circuit 43 is input to the A/D converter 44. Also, in view of a driving power supply voltage (for example, 5 V) of the measurement circuit 20, it is difficult to greatly amplify the voltage. For example, when +1.1 V is obtained for Vd2, which is 0.1 V lower than +1.2 V, a settable amplification factor is limited to about 4 times. On the other hand, when +0.1 V is obtained for Vd1, which is increased by 0.1 V from 0 V, a possible amplification factor can be increased to 20 times or more. Accordingly, it is preferable to use the detection electrode potential Vd1 obtained by the first measurement processing for determining deterioration of the liquid crystal layer 5 from the viewpoint of detection sensitivity. The central control circuit 45 acquires a digital value output from the A/D converter 44 at time t9 as the measured value of the detection electrode potential Vd2. The central control circuit 45 causes the measured value storage circuit 46 to store the measured value of the detection electrode potential Vd2 obtained at time t9.

In this way, in the second discharging period T8, the measurement circuit 200 stops supplying the potential to the detection electrode 30, supplies the same ground potential as that in the second charging period T7 to the common electrode 21, and measures the detection electrode potential Vd2 at least once, for example, at time t9 when the second discharging period T8 ends. In this embodiment, the second discharging period T8 corresponds to a seventh period. Also, in the description, the detection electrode potential Vd (Vd1 or Vd2) is measured in each of the first measurement processing and the second measurement processing, but the measurement may be performed in at least one of them.

The second measurement processing has been described above.

The second reverse sweep period 15 is preferably longer than one frame period in the display region E. For example, when one frame period is about 16 ms, the second reverse sweep period 15 is equal to or longer than 20 ms. Also, in the above description, the case in which the fourth potential difference Vp4 in the second reverse sweep period 15 is −5 V has been exemplified, but the absolute value of the fourth potential difference Vp4 is preferably equal to or greater than the maximum applied voltage of the liquid crystal layer 5 of the pixels P in normal driving. In other words, the absolute value of the fourth potential difference Vp4 is preferably equal to or greater than the maximum applied voltage of the liquid crystal layer 5 in the display region E. The reason why the length of the second reverse sweep period T5 and the absolute value of the fourth potential difference Vp4 are set as described above will be described later.

The second charging period T7 is preferably shorter than one frame period in the display region E. For example, when one frame period is about 16 ms, the second charging period T7 is 5 ms. Also, in the above description, the case in which the absolute value of the fifth potential difference Vp5 in the second charging period T7 is 1.2 V has been exemplified, but the absolute value of the fifth potential difference Vp5 is preferably greater than 0 V and smaller than the threshold voltage Vth of the liquid crystal layer 5. The reason why the length of the second charging period T7 and the absolute value of the fifth potential difference Vp5 are set as described above will be described later.

Further, in the above description, the case in which the absolute value of the sixth potential difference Vp6 in the second relaxation period T6 is 1.2 V, which is the same as the absolute value of the fifth potential difference Vp5, has been exemplified, but the absolute value of the sixth potential difference Vp6 is preferably greater than 0 V and less than the threshold voltage Vth of the liquid crystal layer 5 as described above. The reason why the absolute value of the sixth potential difference Vp6 is set as described above will be described later. Also, the absolute value of the sixth potential difference Vp6 does not necessarily have to be the same as the absolute value of the fifth potential difference Vp5. In addition, the potential difference may change gradually with time, for example, in the process of changing from the fourth potential difference Vp4 to the sixth potential difference Vp6.

As understood from FIG. 6, the liquid crystal layer 5 in a region of the detection electrode 30 is AC-driven by alternately repeating the first measurement processing and the second measurement processing as described above. Thus, it is possible to inhibit deterioration of the liquid crystal layer 5 due to application of a DC voltage to the liquid crystal layer 5 at the time of measuring the physical properties of the liquid crystal layer 5.

Returning to FIG. 4, the description will be continued below.

As already described above, the central control circuit 45 alternately executes the first measurement processing and the second measurement processing until the count value K becomes equal to the upper limit value Kmax. Then, when the count value K is equal to the upper limit value Kmax (step S16: Yes), the central control circuit 45 proceeds to step S17, which will be described later. When all the measurement processes are completed, for example, the central control circuit 45 controls the fifth switch SW5 to be turned on and controls the third switch SW3 and the fourth switch SW4 to be turned off. As a result, the common potential Vcom is applied to the common electrode 21. Further, the central control circuit 45 outputs the common potential Vcom as the reference voltage Vsref. In addition, the second switch SW2 is controlled to be on, and the first switch SW1 is controlled to be turned off. As a result, the common potential Vcom is applied to the first node N1, that is, the detection electrode 30.

In step S17, the display information generation circuit 47 creates display data indicating a state of deterioration of the liquid crystal layer 5 based on the measured values of the detection electrode potentials Vd1 and Vd2 stored in the measured value storage circuit 46. Then, during the normal driving of the liquid crystal panel 100, the central control circuit 45 displays the display data generated by the display information generation circuit 47 in the display region E of the liquid crystal panel 100 via the panel control circuit. Also, display of the state of deterioration of the liquid crystal layer 5 may be performed only when a user needs to be notified, such as when the liquid crystal panel 100 approaches the end of its life and the measured values of the detection electrode potentials Vd1 and Vd2 reach a preset threshold Vd_th.

In addition, the display indicating the state of deterioration of the liquid crystal layer 5 may be performed by a projection display device using the liquid crystal device 1000, which will be described later. For example, when the projection display device is a three panel type projection display device including three liquid crystal devices 1000 corresponding to RGB, the projection display device may be configured to integrally display states of deterioration of the liquid crystal panels 100 of the three liquid crystal devices 1000 instead of individually displaying the state of deterioration of the liquid crystal layer 5 by the liquid crystal devices 1000.

In step S18, the central control circuit 45 transmits data regarding the measurement results to the projection display device using the liquid crystal device 1000. Based on the data indicating the state of deterioration of the liquid crystal layer 5, the projection display device performs necessary processing such as notifying processing using a notifying means such as an audio device or a warning lamp. Also, step S18 may be omitted depending on a specification of the projection display device using the liquid crystal device 1000.

The measurement results of the state of deterioration of the liquid crystal layer 5 can also be displayed from a maintenance menu of the projection display device using the liquid crystal device 1000. The maintenance menu is implemented, for example, as a part of a setting menu in the projection display device. In step S10, when the central control circuit 45 receives a measurement result display instruction command from the projection display device using the liquid crystal device 1000, it proceeds to step S17 and displays the measurement results in the display region E of the liquid crystal panel 100.

1.4. Outline of Relationship Between Usage Time and Discharging Characteristics of Liquid Crystal Panel 100

Figure 7:
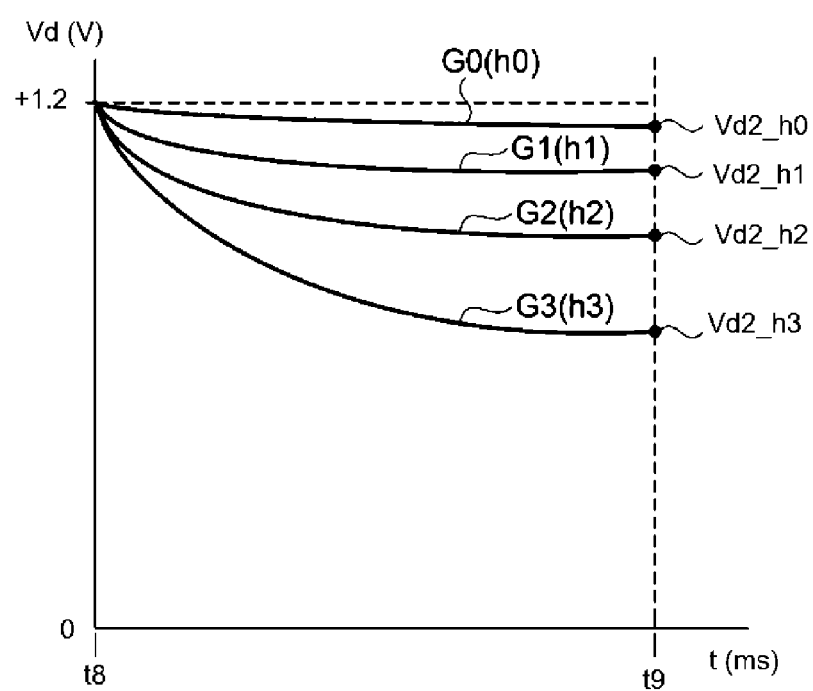
FIG. 7 is a diagram showing a relationship between a usage time and discharging characteristics.

FIG. 7 is a graph showing a relationship between a usage time and discharging characteristics of the liquid crystal panel 100. The usage time is, for example, a cumulative usage time. In a projection display device, for example, it corresponds to a cumulative lighting time. Since an enormous amount of time is required to verify the cumulative usage time (lighting time) via experiments, it will be explained with data obtained when a continuous acceleration test is performed with the incident light intensity and temperature higher than actual usage conditions. Specifically, the discharging characteristics are, for example, changes over time of the detection electrode potential Vd in the second discharging period T8 shown in FIG. 5. The vertical axis in FIG. 7 represents the detection electrode potential Vd in the second discharging period T8. The horizontal axis in FIG. 7 represents time in the second discharging period T8. In FIG. 7, time t8 corresponds to time t8 shown in FIG. 5, that is, a start time of the second discharging period T8. Also, in FIG. 7, time t9 corresponds to time t9 shown in FIG. 5, that is, an end time of the second discharging period T8. For example, time t9 is a time after 150 ms from time t8.

In FIG. 7, a discharging curve G0 indicates a discharging curve at the start of using the liquid crystal panel 100, that is, at a usage time h0 when the usage time is 0, and a discharging curve G3 indicates a discharging curve at a usage time h3 immediately before the liquid crystal panel 100 reaches the end of its life. A discharging curve G1 indicates a discharging curve at a time when a usage time h1 has elapsed from the start of using the liquid crystal panel 100, and a discharging curve G2 indicates a discharging curve at a time when a usage time h2 has elapsed from the start of using the liquid crystal panel 100. Here, a relationship between the usage times is h0<h1<h2<h3.

In each discharging curve, the detection electrode potential Vd at time t8 is close to +1.2 V, but the detection electrode potential Vd at time t9, that is, the detection electrode potential Vd2 differs. That is, under the continuous acceleration test, the detection electrode potential Vd2 decreases with progress of the test.

In this way, when the usage time of the liquid crystal panel 100 increases, the detection electrode potential Vd2 at time t9 decreases. This is because the mobile ions in the liquid crystal layer 5 increase due to a chemical reaction caused by incidence of high-intensity light along with the usage time of the liquid crystal panel 100, and the discharging curve changes. In addition, in this embodiment, the determination circuit 45a determines the state of deterioration of the liquid crystal layer 5 based on the measured value of the detection electrode potential Vd2 stored in the measured value storage circuit 46.

Figure 8:
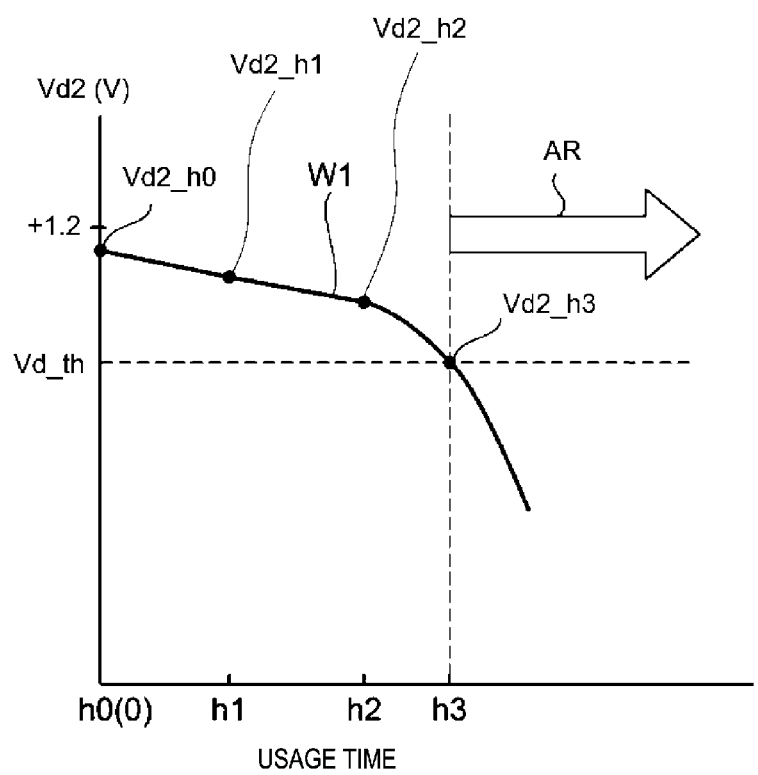
FIG. 8 is a diagram showing a relationship between the usage time and a measured value.

FIG. 8 is a graph showing a relationship between the usage time of the liquid crystal panel 100 and the detection electrode potential Vd2 at time t9. The vertical axis represents the detection electrode potential Vd2 at time t9, and the horizontal axis represents the usage time of the liquid crystal panel 100.

As shown in FIG. 8, a transition line W1 of the detection electrode potential Vd2 at time t9 changes in accordance with lengths of the usage times h0, h1, h2, and h3 of the liquid crystal panel 100. Typically, a value indicated by the transition line W1 gradually decreases as the usage time increases. That is, the detection electrode potential Vd2 gradually decreases in the order of Vd2_h0, Vd2_h1, Vd2_h2, and Vd2_h3 Then, a rate of decrease in the value indicated by the transition line W1 decreases rapidly increases around a point passing the usage time h3, and when the usage time h3 has been passed, the amount of mobile ions in the liquid crystal layer 5 rapidly increases and the liquid crystal panel 100 reaches the end of its life. In this way, the transition line W1 changes nonlinearly with respect to the usage time of the liquid crystal panel 100. In addition, as for display quality as well, it has been confirmed that, after the time indicated by arrow AR beyond the usage time h3, occurrence of stains and unevenness on the display screen becomes noticeable, and along with this, a decrease in brightness also occurs, and thus the display quality is lowered.

In this embodiment, a value at which the detection electrode potential Vd2 at time t9 is reduced to 70% of the detection electrode potential Vd at time t8 is set as the threshold Vd_th. Then, when the measured value of the detection electrode potential Vd2 falls below the threshold Vd_th, a control program for the central control circuit 45 is programmed in the determination circuit 45a to notify the user or an administrator that the liquid crystal panel 100 is nearing the end of its life. Alternatively, as will be described later, a control program is provided for the central control circuit 45 that can confirm the relationship between the usage time of the liquid crystal panel 100 up to now and the detection electrode potential Vd2.

Also, the measured value of the detection electrode potential Vd2 to be compared with the threshold Vd_th may be an average value of a plurality of measured values. In addition, the threshold Vd_th may be changed in accordance with a situation in which the liquid crystal panel 100 is used. For example, when higher display quality is required or when maintenance of the liquid crystal panel 100 takes time, the threshold Vd_th may be set to the detection electrode potential Vd2_h2 corresponding to the usage time h2 so that notification can be made early.

Also, the determination circuit 45a may determine the state of deterioration of the liquid crystal panel 100 based on the measured value of the detection electrode potential Vd1 obtained at the end of the first discharging period T4. In this case, the thresholds Vd_th to be compared with the measured value of the detection electrode potential Vd1 may be set to a value different from the threshold Vd_th to be compared with the measured value of the detection electrode potential Vd2.

1.5. Operations and Effects of First Reverse Sweep Period T1 and Second Reverse Sweep Period T5

As described above, in this embodiment, the first reverse sweep period T1 is inserted at the beginning of the first measurement period T10, and the second reverse sweep period T5 is inserted at the beginning of the second measurement period T20. Thus, the mobile ions contained in the liquid crystal layer 5 can be effectively initially disposed in either the common electrode 21 or the detection electrode 30 immediately after the start of the first measurement period T10 and immediately after the start of the second measurement period T20. By adjusting an initial arrangement of the mobile ions in this manner, measurement reproducibility is easily obtained. Since the influence of an internal electric field due to the mobile ions is also reflected in the measured value, an increase in the mobile ions is likely to appear as a change in the measured value.

Each of the first reverse sweep period T1 and the second reverse sweep period T5 is preferably longer than one frame period. For example, each of the first reverse sweep period T1 and the second reverse sweep period T5 is equal to or longer than 20 ms. Thus, among the mobile ions contained in the liquid crystal layer 5, mobile ions having low mobility can also be effectively initially disposed. The mobile ions having low mobility are less likely to move in the liquid crystal layer 5. For that reason, when the first reverse sweep period T1 and the second reverse sweep period T5 are normal frame periods, it is difficult to control the initial arrangement of mobile ions having low mobility within the normal frame periods. Even if the measured value is obtained while the initial arrangement of mobile ions having low mobility cannot be controlled, sufficient measurement reproducibility may not be obtained.

Figure 9:
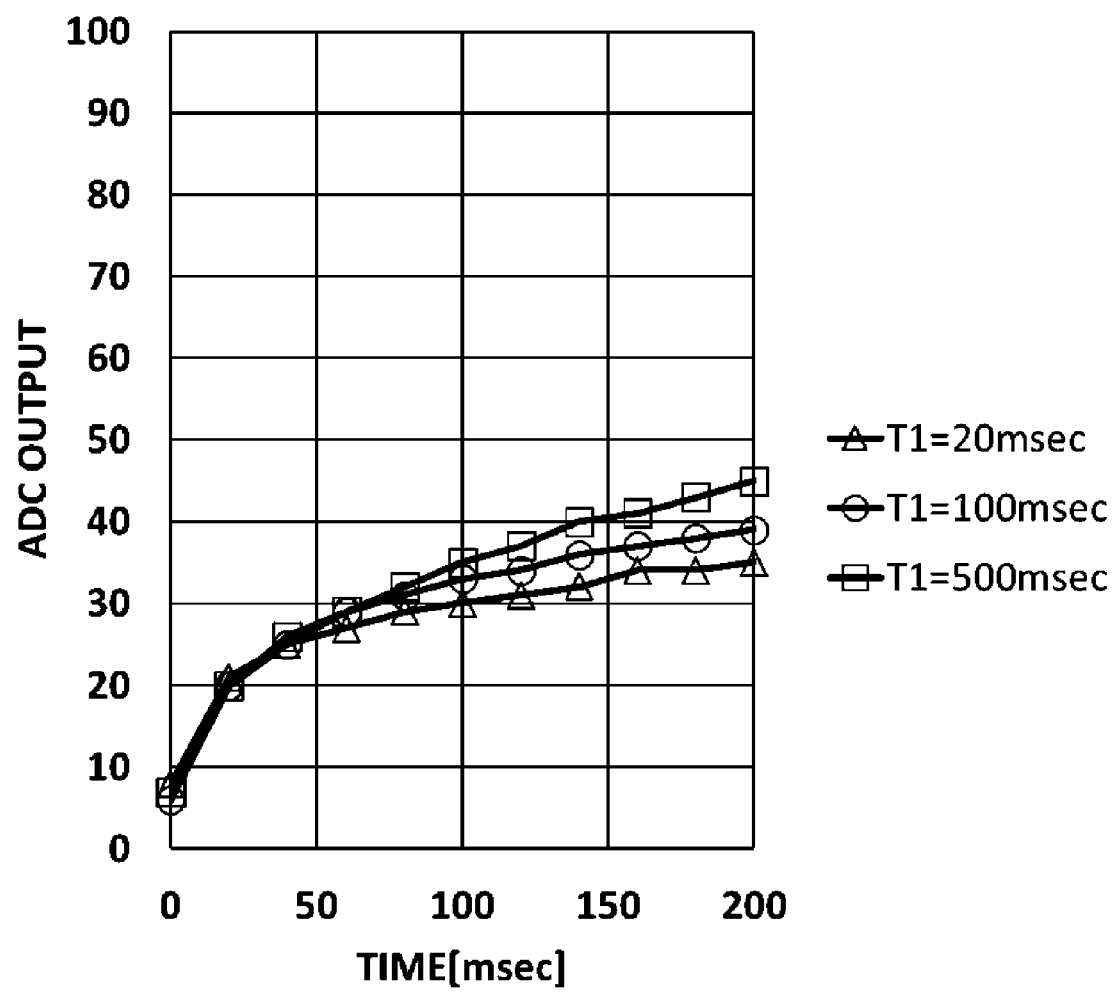
FIG. 9 is a diagram showing an effect of a reverse sweep period.

FIG. 9 is a diagram showing effects of the first reverse sweep period T1 and the second reverse sweep period 15. FIG. 9 shows measurement results of the detection electrode potential Vd during the first discharging period T4 for each of a case in which the first reverse sweep period T1 is 20 ms, a case in which the first reverse sweep period T1 is 100 ms, and the case in which the first reverse sweep period T1 is 500 ms. More specifically, the results shown in FIG. 9 are results obtained by amplifying and measuring the detection electrode potential Vd during the first discharging period T4 by 11 times for each of the above three cases at the very initial stage of a deterioration test of the liquid crystal panel 100.

In FIG. 9, the horizontal axis represents time from the start of discharging in the first discharging period T4, and the vertical axis represents the measured value of the detection electrode potential Vd in the first discharging period T4. The first discharging period T4 is 200 ms. In FIG. 9, the vertical axis represents the measured value of the detection electrode potential Vd as a digital value output from the A/D converter 44. In this measurement, a 10-bit specification A/D converter is used for the A/D converter 52, and a measured value 1023 corresponds to about 2.5 V.

As shown in FIG. 9, the longer the first reverse sweep period T1 is, the larger the measured value at the end of the first discharging period T4 is. The reason for this may be results from that the first reverse sweep period T1 is inserted at the beginning of the first measurement period T10, and thus in particular, the mobile ions having low mobility are effectively initially disposed on one of the common electrode 21 and the detection electrode 30. These results suggest that, by lengthening the first reverse sweep period T1 and the second reverse sweep period T5, progress of deterioration of the liquid crystal layer 5 can be tracked with higher sensitivity from the beginning of usage of the liquid crystal panel 100 In addition, although FIG. 9 illustrates the difference at the very initial stage of the continuous acceleration test, the effect of the first reverse sweep period T1 can be confirmed also in the measurement at the end of the test. The discharging characteristics clearly changed between the case in which the first reverse sweep period T1 was 20 ms and the case in which the first reverse sweep period T1 was 100 ms. Specifically, when the first reverse sweep period T1 was set to 100 ms, the measured value of the detection electrode potential Vd was clearly higher than when the first reverse sweep period T1 was set to 20 ms.

Figure 10:
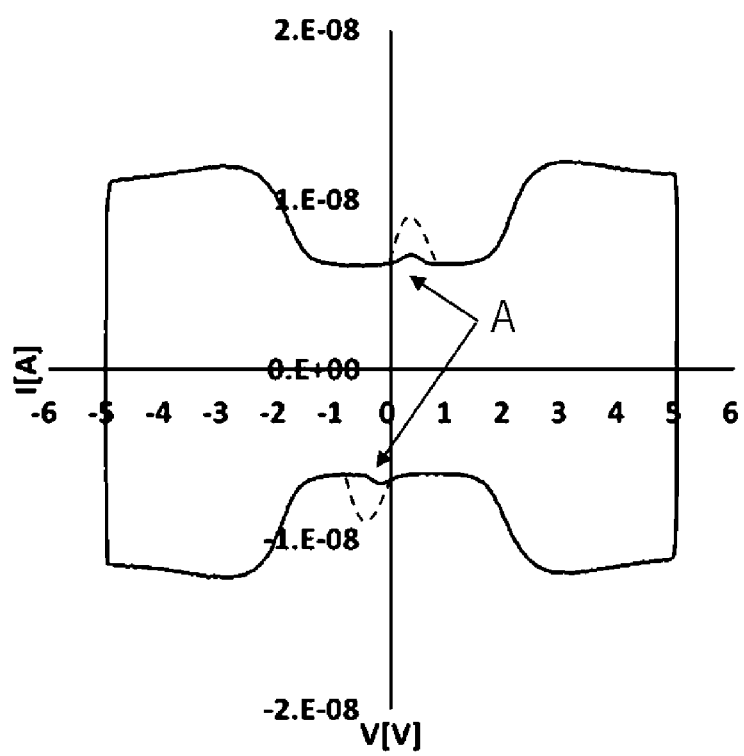
FIG. 10 is a diagram of electrical characteristics of the liquid crystal layer.

FIG. 10 is a diagram of electrical characteristics of the liquid crystal layer 5. The horizontal axis represents a voltage applied to the liquid crystal layer 5, and the vertical axis represents a current. The electrical characteristics can be obtained, for example, by measuring the current when a triangular wave voltage of ±5 V of 0.1 Hz is applied to the liquid crystal layer 5. This method is a measurement method commonly referred to as cyclic voltammetry. As indicated by reference sign A in FIG. 10, the current due to the mobile ions typically appears as an incremental current with respect to a charging current of the liquid crystal layer 5 and exhibits a peak current at a relatively small voltage. As the deterioration of the liquid crystal layer 5 progresses, this peak current appears as a large peak as indicated by a broken line, for example. In the above-described method, presence of mobile ions can be quantitatively evaluated using a dedicated precision measuring instrument, but it is not realistic in terms of cost to implement such a function in a projection display device using the liquid crystal device 1000. However, according to the configuration of the present application, the state of deterioration of the liquid crystal layer 5 can be quantified with a relatively simple circuit configuration.

A voltage applied to the liquid crystal layer 5 during the first reverse sweep period T1 and the second reverse sweep period 15 is preferably equal to or higher than the maximum applied voltage during the normal driving of the liquid crystal panel 100. In other words, the absolute value of the first potential difference Vp1 in the first reverse sweep period T1 and the absolute value of the fourth potential difference Vp4 in the second reverse sweep period T5 are preferably equal to or greater than the maximum applied voltage during the normal driving of the liquid crystal panel 100. Thus, the measurement can be performed while the influence of a display state of the liquid crystal panel 100 before the measurement is inhibited. The detection electrode 30 is provided along the outer edge of the display region E and observes the mobile ions diffusing from the display region E along a surface of the substrate. Incidentally, in each pixel P, movement of the mobile ions may be limited by a driving voltage. That is, whether the mobile ions exist on the common electrode 21 side or the detection electrode 30 side depends on the driving voltage of the pixel P and is uncontrolled. However, in the first reverse sweep period T1 and the second reverse sweep period T5, if the voltage applied to the liquid crystal layer 5 in the detection electrode 21 is set to be equal to or higher than the maximum applied voltage applied to the liquid crystal layer 5 during the normal driving in each pixel P, mobile ions that cannot be moved by normal driving can be controlled and initially disposed. Further, if the first reverse sweep period T1 and the second reverse sweep period 15 are set to be longer than one frame, moving distances of the mobile ions become longer than that during normal driving, which is effective for the initial arrangement. The voltage applied to the liquid crystal layer 5 in the first reverse sweep period T1 and the second reverse sweep period T5 may be equal to or higher than the threshold voltage Vth of the liquid crystal layer 5.

Figure 11:
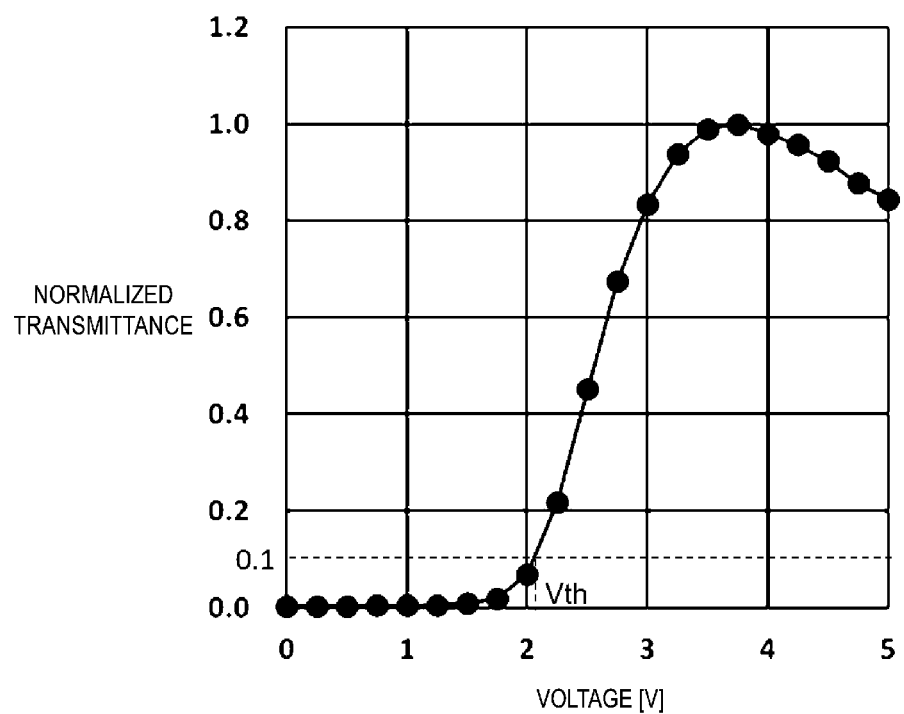
FIG. 11 is a diagram showing a relationship between a normalized transmittance of the liquid crystal layer and a voltage.

FIG. 11 is a graph showing a relationship between a normalized transmittance of the liquid crystal layer 5 and an applied voltage. Characteristics of the transmittance vary depending on a gap of the liquid crystal layer 5 and the liquid crystal material, but for example, when the liquid crystal panel 100 is a normally black type VA liquid crystal panel and the gap of the liquid crystal layer 5 is about 2.6 μm, the transmittance of the liquid crystal layer 5 becomes maximum when a voltage slightly lower than the 4 V is applied, as shown in FIG. 11. Accordingly, in the pixel P in a holding state during the normal driving of the liquid crystal panel 100, the maximum applied voltage of the liquid crystal layer 5 is set to a value slightly lower than 4 V. In this case, it is unknown whether mobile ions that move at a voltage of about 4 V applied to the liquid crystal layer 5, for example, during one frame period during the normal driving of the liquid crystal panel 100, in other words, during a polarity holding period of the pixel P are located on the common electrode 21 or the detection electrode 30. However, in the first reverse sweep period T1 and the second reverse sweep period T5, by applying a voltage of +5 V, which is equal to or higher than the maximum applied voltage during the normal driving of the liquid crystal panel 100, to the liquid crystal layer 5 for a period longer than one frame period, even the mobile ions that move at about 4 V can be effectively initially disposed on either the common electrode 21 or the detection electrode 30. Also, the maximum applied voltage can be determined by observing the potential supplied to the data line. For example, when the common electrode 21 is driven for display with a fixed potential, the maximum applied voltage is approximately half an amplitude of a data line supply potential when the liquid crystal panel 100 is displayed at the maximum gradation. In another example, when the potential of the common electrode 21 is inverted in accordance with the display polarity, the maximum applied voltage is approximately close to the amplitude of the data line supply potential when the liquid crystal panel 100 is set to the maximum gradation display.

In addition, from FIG. 9, it is possible to pick up measured values on which the effects of the first reverse sweep period T1 and the second reverse sweep period 15 are not much reflected. Specifically, as shown in FIG. 9, in a period from a start time of the first discharging period T4 to around 50 ms, there is almost no difference between the measured values obtained in each of the three cases. That is, in the first discharging period T4, there are two stages of a first stage from the start time of the first discharging period T4 to around 50 ms, and a second stage from around 50 ms to an end time of the first discharging period T4. It can be considered that the measured value in the first stage reflects behaviors of mobile ions having relatively high mobility, and the measured value in the second stage reflects behaviors of mobile ions having relatively low mobility.

Accordingly, when the mobile ions having relatively high mobility are focused, the measured value in the first stage may be adopted. On the other hand, when the mobile ions having relatively low mobility are focused, a difference between measured values obtained at two different times in the second stage may be adopted. For example, it is a difference between a measured value obtained 50 ms after the start time of the first discharging period T4 and a measured value obtained at the end time of the first discharging period T4. Accordingly, the measured value may not be a measured value at the end of the first discharging period T4 or the second discharging period T8.

1.6. Effects of First Relaxation Period T2 and Second Relaxation Period T6

As described above, in this embodiment, the first relaxation period T2 is inserted between the first reverse sweep period T1 and the first charging period T3 in the first measurement period T10, and the second relaxation period T6 is inserted between the second reverse sweep period T5 and the second charging period T7 in the second measurement period T20. Thus, the influence of the dielectric anisotropy of the liquid crystal layer 5 can be avoided, and the measurement can be performed without moving the accumulated mobile ions.

As described above, for example, the threshold voltage Vth of the liquid crystal layer 5 is about 2.1 V. That is, if the voltage applied to the liquid crystal layer 5 during the first relaxation period T2 and the second relaxation period T6 is smaller than the threshold voltage Vth, the measurement can be performed while inhibiting the influence of the dielectric anisotropy of the liquid crystal layer 5. In other words, if the absolute value of the third potential difference Vp3 during the first relaxation period T2 and the absolute value of the sixth potential difference Vp6 during the second relaxation period T6 are greater than 0 V and smaller than the threshold voltage Vth, the measurement can be performed while inhibiting the influence of the dielectric anisotropy of the liquid crystal layer 5. In other words, during the first charging period T3 and the second charging period T7, it is possible to inhibit movement of the mobile ions having high mobility. Also, when the liquid crystal layer 5 is charged and discharged at a low voltage, the mobile ions having high mobility can be efficiently captured and measured. In addition, since the first charging period T3 and the second charging period T7 can be lengthened, it is possible to increase a degree of freedom in designing the measurement circuit 200. This point will be described later.

As described above, in this embodiment, when the period transitions from the first reverse sweep period T1 to the first relaxation period T2, the voltage applied to the liquid crystal layer 5 is switched from +5 V to +1.2 V without changing the polarity. In addition, when the period transitions from the second reverse sweep period 15 to the second relaxation period T6, the voltage applied to the liquid crystal layer 5 is switched from −5 V to −1.2 V without changing the polarity. For that reason, lengths of the first relaxation period T2 and the second relaxation period T6 are set in consideration of a response time of the liquid crystal layer 5. In consideration of the response time of the liquid crystal layer 5, the first relaxation period T2 and the second relaxation period T6 are preferably set to be longer than one frame period. For example, the first relaxation period T2 and the second relaxation period T6 are 20 ms, 50 ms, or the like. In the case of a liquid crystal material having a quick response, the value may be set to be shorter than the 20 ms.

1.7. Effects of First Charging Period T3 and Second Charging Period T7

Basically, the first charging period T3 and the second charging period T7 are preferably as short as possible. The reason for this is that, when the first charging period T3 and the second charging period T7 are shortened, the action of the mobile ions having high mobility is easily captured as a change in the measured value. For example, the first charging period T3 and the second charging period T7 are preferably shorter than one frame period during the normal driving of the liquid crystal panel 100.

In this embodiment, the potential supplied to each of the common electrode 21 and the detection electrode 30 is controlled by the measurement circuit 200. The second capacitor C2 electrically coupled to the common electrode 21 has a relatively large capacitance value. In addition, the third switch SW3 and the fourth switch SW4 are electrically coupled to the common electrode line L1. When on-resistances of the third switch SW3 and the fourth switch SW4 are large, it is difficult to shorten the first charging period T3 and the second charging period T7. For example, commercially available switch ICs have an on-resistance of about 1 kΩ when driven at 5 V. For example, when the capacitance value of the second capacitor C2 is 0.2 µF, 5 τ is 1 ms. When lengths of the first charging period T3 and the second charging period T7 are set to about 5 τ and the amplifier circuit 43 that amplifies the detection electrode potential Vd by about 10 times is used, this time constant τ is large enough to affect the measured value.

On the other hand, in the first discharging period T4 and the second discharging period T8, it is required to set off-resistances of the first switch SW1 and the second switch SW2 electrically coupled to the detection electrode 30 to sufficiently large values. When the off-resistances of the first switch SW1 and the second switch SW2 are small, holding of the potential of the first node N1, that is, the detection electrode potential Vd is affected. In addition, when the off-resistances of the first switch SW1 and the second switch SW2 vary greatly, it may affect the measured value.

Thus, in this embodiment, in order to reduce the on-resistances of the third switch SW3 and the fourth switch SW4, a configuration in which a relatively large second voltage of, for example, 15 V is applied to the third switch SW3 and the fourth switch SW4 is adopted. On the other hand, in this embodiment, in order to increase the off-resistances of the first switch SW1 and the second switch SW2, a configuration in which a relatively small first voltage of, for example, 5 V is applied to the first switch SW1 and the second switch SW2 is adopted. Also, driving the first switch SW1 and the second switch SW2 with the first voltage of 5 V means that the on-resistance of each switch increases. However, since the first capacitor C1 electrically coupled to a node of the detection electrode 30 has the capacitance value smaller than that of the second capacitors C2 electrically coupled to a node of the common electrode 21, it can be handled without problems in terms of time constant.

Also, in this embodiment, in consideration of responsiveness of the common electrode 21 during the normal driving of the liquid crystal panel 100, a configuration in which the fifth switch SW5 is also supplied with a relatively large second voltage of 15 V is adopted. For example, commercially available switch ICs can be used for the first switch SW1 to the fifth switch SW5. That is, a driving voltage of 5 V or 15 V is applied to the switch ICs used as the first switch SW1 to the fifth switch SW5. In this case, a power supply voltage of 5 V or 15 V is supplied to each of the switch ICs.

Figure 12:
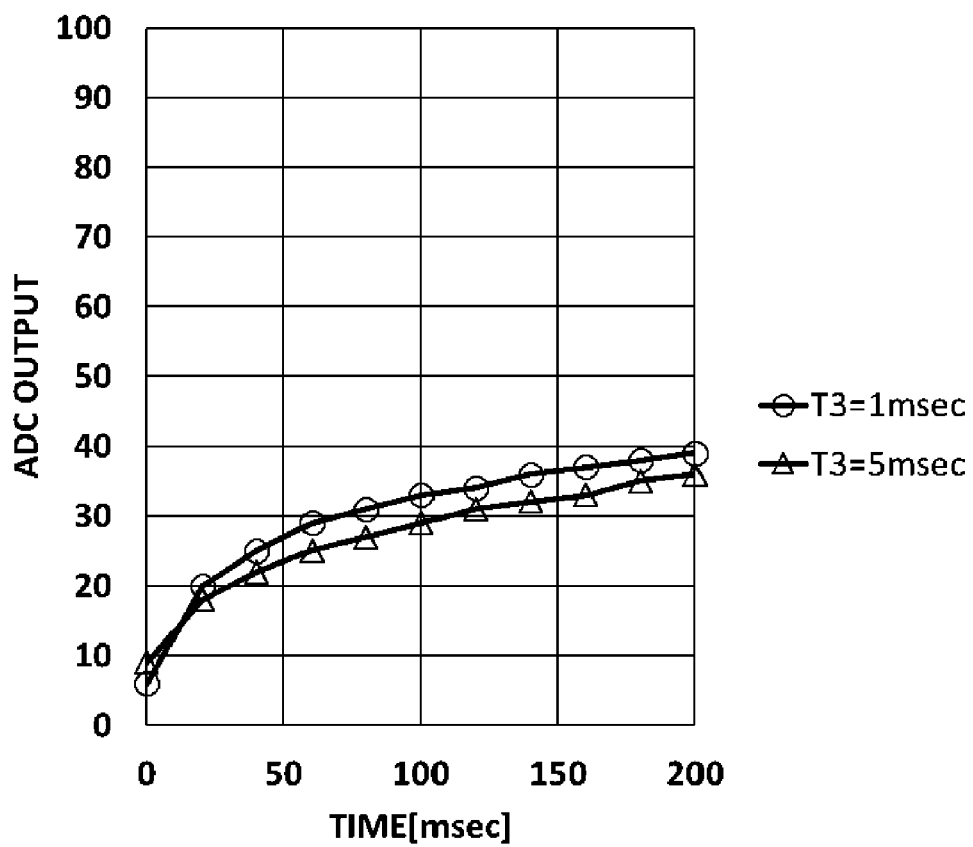
FIG. 12 is a diagram showing an effect of a charging period.

FIG. 12 is a diagram showing effects of the first charging period T3 and the second charging period T7. FIG. 12 shows measurement results of the detection electrode potential Vd during the first discharging period T4 for each of a case in which the first charging period T3 is 1 ms and a case in which the first charging period T3 is 5 ms. More specifically, the results obtained by amplifying by 11 times and measuring the detection electrode potential Vd during the first discharging period T4 for each of the two cases at the very initial stage of the deterioration test of the liquid crystal panel 100 are shown.

In FIG. 12, the horizontal axis represents time from the start of discharging during the first discharging period T4, and the vertical axis represents the measured value of the detection electrode potential Vd during the first discharging period T4. As an example, the first discharging period T4 is 200 ms. Also, in FIG. 12, the vertical axis represents the measured value of the detection electrode potential Vd as a digital value output from the A/D converter 44. In this measurement, a 10-bit specification A/D converter is used for the A/D converter 52, and the measured value 1023 corresponds to about 2.5 V.

As shown in FIG. 12, the shorter the first charging period T3 is, the larger the measured value at the end of the first discharging period T4 is. The reason for this is considered to be results from that, by shortening the first charging period T3, the movement of the mobile ions during the first charging period T3 is inhibited, and thus the action of the mobile ions having high mobility is efficiently reflected. These results suggest that, by shortening the first charging period T3 and the second charging period T7, the progress of deterioration of the liquid crystal layer 5 can be tracked with higher sensitivity from the beginning of usage of the liquid crystal panel 100.

Also, when the results shown in FIG. 12 are observed in detail, the measured value obtained in each of the two cases appear to move approximately parallel to each other 50 ms after the start time of the first discharging period T4. That is, as described above, such a difference between the measured values is considered to be caused by the action of the mobile ions having relatively high mobility. In this way, the lengths of the first reverse sweep period T1 and the second reverse sweep period 15 and the effects of the first charging period T3 and the second charging period T7 on the measured value are different from each other.

1.8. Tracking of Progress of Deterioration of Liquid Crystal Layer 5

Figure 13:
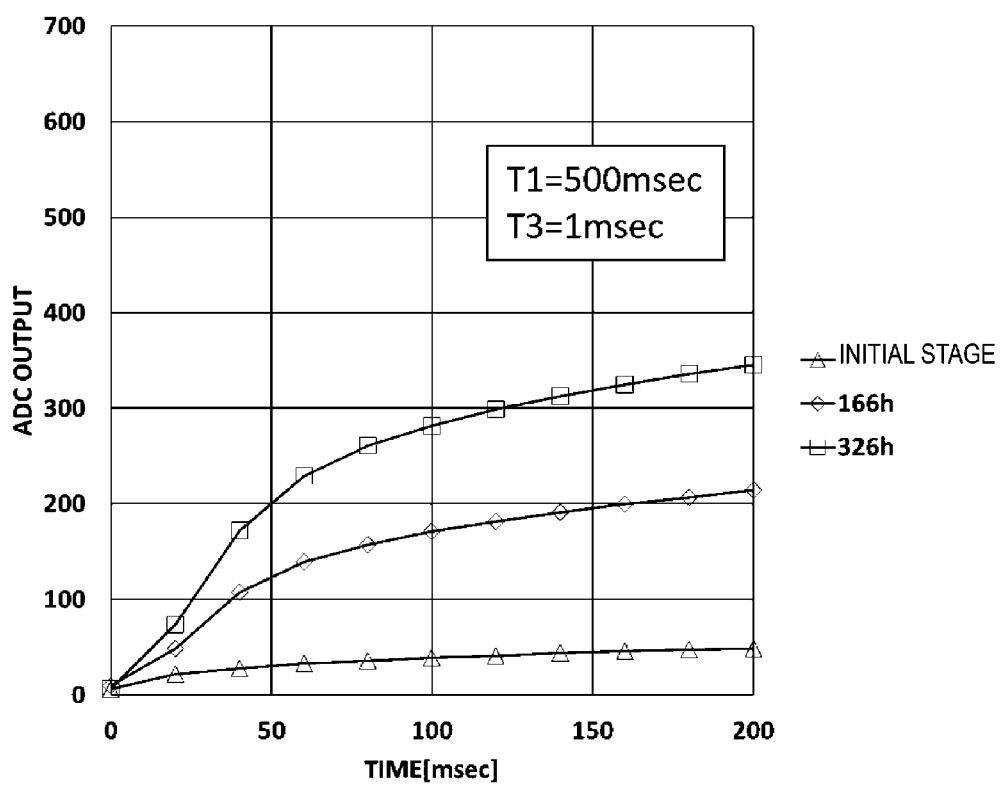
FIG. 13 is a first diagram showing tracking results of progress of deterioration of a liquid crystal layer.
Figure 14:
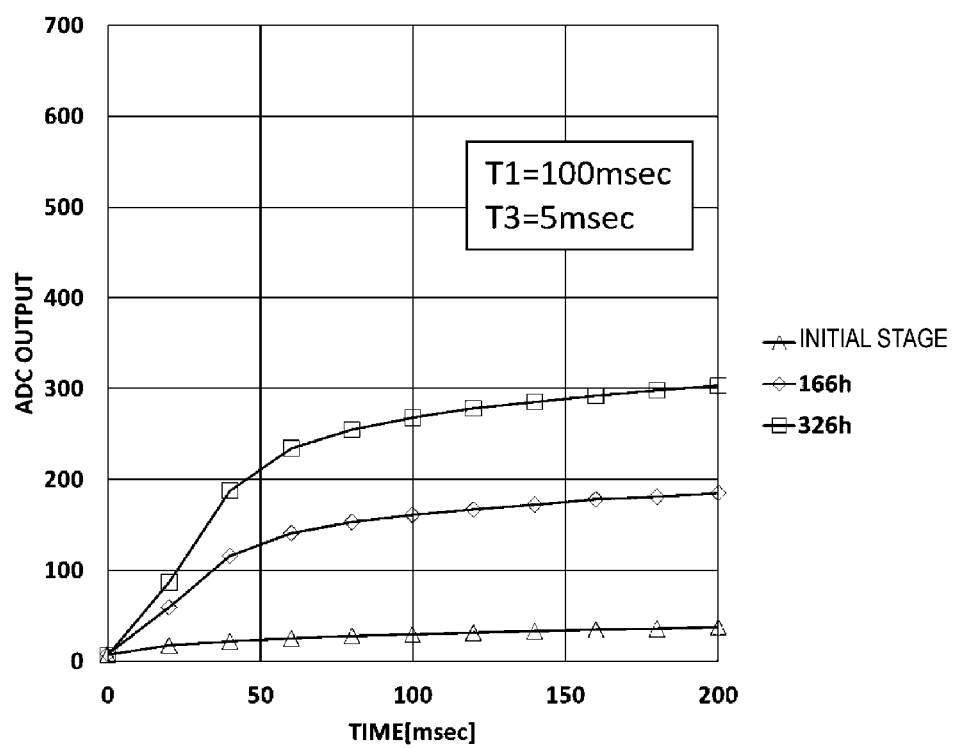
FIG. 14 is a second diagram showing tracking results of progress of deterioration of the liquid crystal layer.

FIG. 13 is a first diagram showing tracking results of the progress of deterioration of the liquid crystal layer 5. FIG. 14 is a second diagram showing tracking results of the progress of deterioration of the liquid crystal layer 5. Specifically, a continuous acceleration test was performed in which the display region E was irradiated with blue light of 12 W/Cm$^2$ for a predetermined time while the liquid crystal panel 100 was cooled to a condition of about 65° C. FIGS. 13 and 14 show measurement results of the detection electrode potential Vd during the first discharging period T4 for each of a case in which an irradiation time is 0 hours (initial), a case in which the irradiation time is 166 hours, and a case in which the irradiation time is 326 hours. Also, the results shown in FIG. 13 are measurement results of the detection electrode potential Vd during the first discharge period T4 under the condition that the first reverse sweep period T1 is set to 500 ms and the first charging period T3 is set to 1 ms. The results shown in FIG. 14 are measurement results of the detection electrode potential Vd during the first discharge period T4 under the condition that the first reverse sweep period T1 is set to 100 ms and the first charging period T3 is set to 5 ms.

In FIGS. 13 and 14, the horizontal axis represents time from the start of discharging during the first discharging period T4, and the vertical axis represents the measured value of the detection electrode potential Vd during the first discharging period T4. The first discharging period T4 is 200 ms. In addition, in FIGS. 13 and 14, the vertical axis represents the measured value of the detection electrode potential Vd as a digital value output from the A/D converter 44. In this measurement, a 10-bit A/D specification converter is used for the A/D converter 52, and the measured value 1023 corresponds to about 2.5 V.

As shown in FIGS. 13 and 14, according to this embodiment, it can be seen that the progress of deterioration of the liquid crystal layer 5 can be tracked with higher sensitivity from the start of irradiation of the liquid crystal panel 100 with blue light, that is, from an initial stage of usage of the liquid crystal panel 100. In addition, in the liquid crystal panel 100 used in experiments, power supply wiring and the like of the peripheral circuit and the like are also disposed to reflect actual products, and thus the experimental results shown in FIGS. 13 and 14 are experimental results in which the influence of a parasitic capacitance of the detection electrode 30 is taken into consideration. Accordingly, from the experimental results shown in FIGS. 13 and 14, it can be said that the liquid crystal device 1000 of this embodiment has sufficient practicability so that the progress of deterioration of the liquid crystal layer 5 can be detected as a change in voltage value.

1.9. Verification of Measurement Reproducibility

Figure 15:
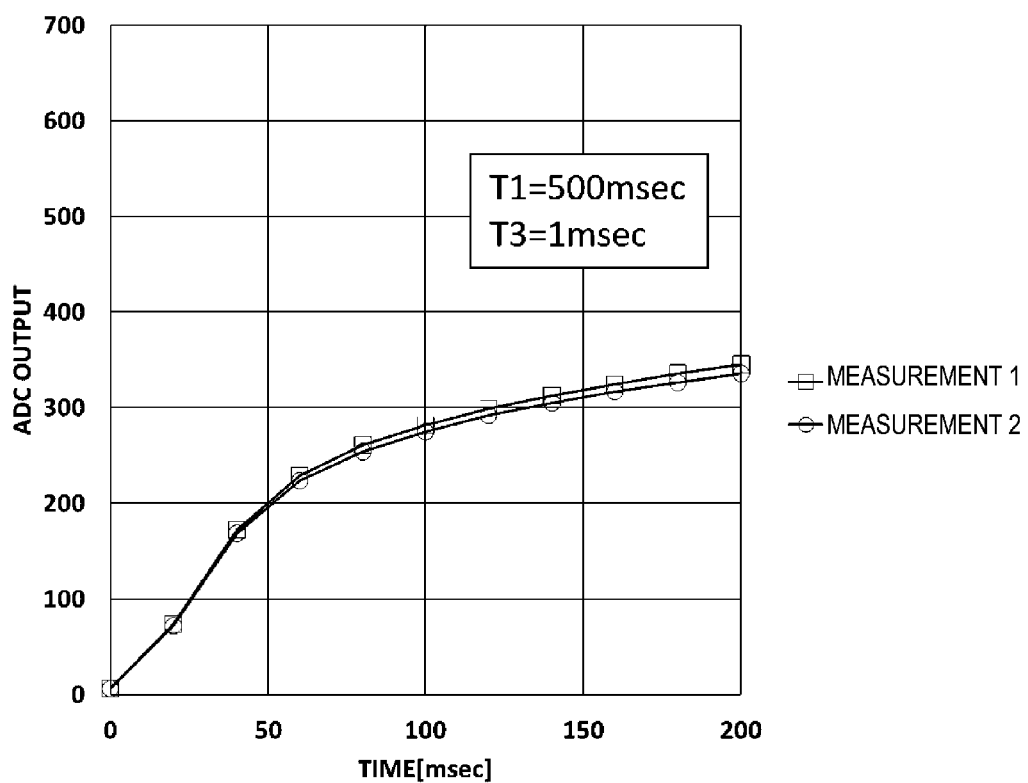
FIG. 15 is a first diagram showing verification results of measurement reproducibility.
Figure 16:
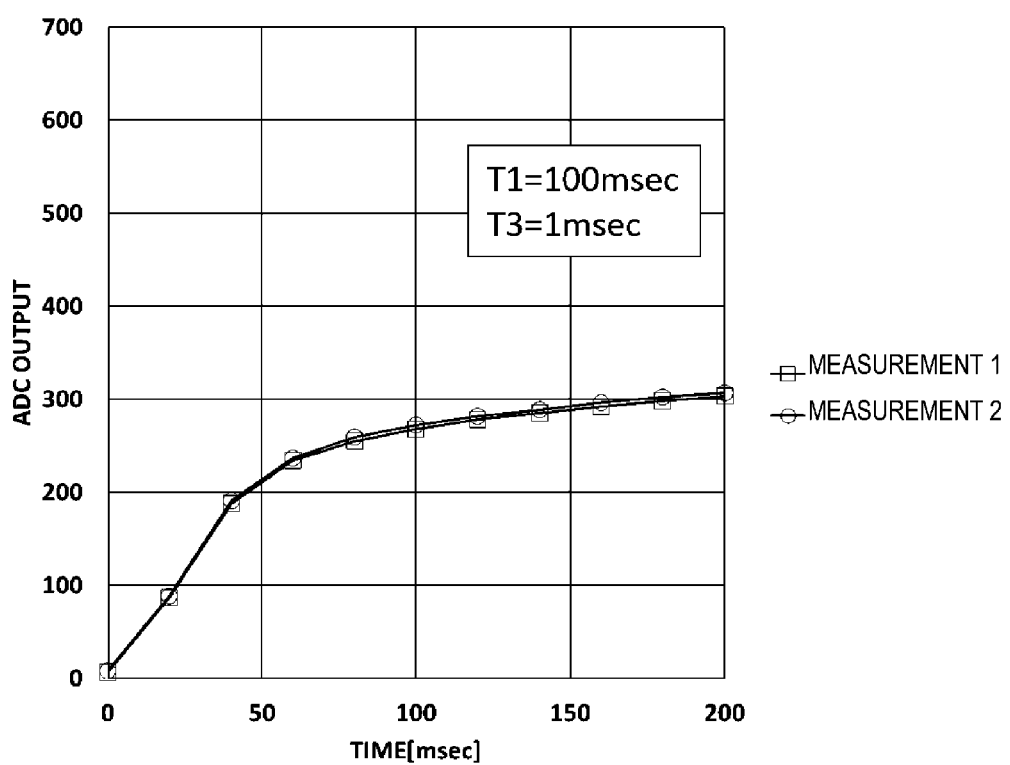
FIG. 16 is a second diagram showing verification results of measurement reproducibility.

FIG. 15 is a first diagram showing verification results of measurement reproducibility. FIG. 16 is a second diagram showing verification results of measurement reproducibility. Specifically, FIG. 15 shows the results obtained after 326 hours of the continuous acceleration test in the experiment shown in FIG. 13. Similarly, FIG. 16 shows the results obtained after 326 hours of the continuous acceleration test in the experiment shown in FIG. 14. FIGS. 15 and 16 show measurement results of the detection electrode potential Vd twice during the first discharging period T4 under each measurement condition. In FIGS. 15 and 16, measurement 1 indicates a first measurement result, and measurement 2 indicates a second measurement result. The second measurement was performed after a predetermined time had passed from the first measurement.

The results shown in FIG. 15 are measurement results of the detection electrode potential Vd during the first discharging period T4 under the condition that the first reverse sweep period T1 is set to 500 ms and the first charging period T3 is set to 1 ms. The results shown in FIG. 16 are measurement results of the detection electrode potential Vd during the first discharging period T4 under the condition that the first reverse sweep period T1 is set to 100 ms and the first charging period T3 is set to 5 ms.

In FIGS. 15 and 16, the horizontal axis represents time from the start of discharging during the first discharging period T4, and the vertical axis represents the measured value of the detection electrode potential Vd during the first discharging period T4. The first discharging period T4 is 200 ms. Also, in FIGS. 15 and 16, the vertical axis represents the measured value of the detection electrode potential Vd as a digital value output from the A/D converter 44. In this measurement, a 10-bit A/D specification converter is used for the A/D converter 52, and the measured value 1023 corresponds to about 2.5 V.

As shown in FIGS. 15 and 16, according to this embodiment, it can be seen that the measurement can be performed with sufficient reproducibility. When there is no first reverse sweep period T1 and second reverse sweep period T5, there is a possibility that such measurement reproducibility cannot be obtained depending on what was done electrically to the liquid crystal layer 5 of the liquid crystal panel 100 before the measurement. For example, when the measurement configured by charging and discharging of ±1.2 V (the first charging period T3 and the first discharging period T4 performed at −1.2 V, and the second charging period T7 and the second discharging period T8 performed at +1.2 V) in the detection electrode 30 is performed, a phenomenon may occur in which measured values change before and after optical characteristics such as voltage-transmittance of the display region E in FIG. 11 are measured.

Effects of First Embodiment

As described above, the liquid crystal device 1000 according to the first embodiment includes the detection electrode 30, the common electrode 21, the liquid crystal layer 5 disposed between the detection electrode 30 and the common electrode 21, and the measurement circuit 200 that supplies a potential to each of the detection electrode 30 and the common electrode 21 and measures the detection electrode potential Vd which is the potential of the detection electrode 30. The measurement circuit 200 supplies a potential to each of the detection electrode 30 and the common electrode 21 so that the potential difference between the detection electrode 30 and the common electrode 21 becomes the first potential difference Vp1 in the first reverse sweep period T1, supplies a potential to each of the detection electrode 30 and the common electrode 21 so that the potential difference becomes the second potential difference Vp2 having a polarity different from that of the first potential difference Vp1 in the first charging period T3 after the first reverse sweep period T1, and stops supplying the potential to the detection electrode 30 and supplies the same potential as that during the first charging period T3 to the common electrode 21 during the first discharging period T4 after the first charging period T3 to measure the detection electrode potential Vd at least once.

As described above, in this embodiment, the first reverse sweep period T1 is inserted before the first charging period T3 and the first discharging period T4. Thus, in the first reverse sweep period T1, the mobile ions included in the liquid crystal layer 5 can be effectively initially disposed in either the common electrode 21 or the detection electrode 30. For example, positive ions are initially disposed in an electrode to which a negative potential is supplied among the common electrode 21 and the detection electrode 30, and negative ions are initially disposed in an electrode to which a positive potential is supplied among the common electrode 21 and the detection electrode 30. In this way, by adjusting the initial arrangement of the mobile ions before the first charging period T3 starts, it is possible to obtain measurement reproducibility of the measured value of the detection electrode potential Vd obtained during the first discharging period T4. In addition, since the influence of the internal electric field due to the mobile ions is also reflected in the measured value, an increase in the mobile ions is likely to appear as a change in the measured value. As a result, it is possible to track the progress of deterioration of the liquid crystal layer 5 with higher sensitivity from the beginning of usage of the liquid crystal panel 100.

In the liquid crystal device 1000 according to the first embodiment, the first reverse sweep period T1 is longer than one frame period in the display region E during the normal driving, and the absolute value of the first potential difference Vp1 is equal to or greater than the maximum applied voltage of the liquid crystal layer 5 in the display region E during the normal driving.

As described above, by setting the first reverse sweep period T1 to be longer than one frame period, in particular, the mobile ions having low mobility can be effectively initially disposed in either the common electrode 21 or the detection electrode 30.

In addition, by setting the absolute value of the first potential difference Vp1, that is, the voltage applied to the liquid crystal layer 5 during the first reverse sweep period T1, to be equal to or greater than the maximum applied voltage of the liquid crystal layer 5 in the display region E during the normal driving, the mobile ions that move at about the maximum applied voltage can also be effectively initially disposed in either the common electrode 21 or the detection electrode 30.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 according to the first embodiment, the first charging period T3 is shorter than one frame period in the display region E during the normal driving, and the absolute value of the second potential difference Vp2 is greater than 0 V and less than the threshold voltage Vth of the liquid crystal layer 5.

In this way, by setting the first charging period T3 to be shorter than one frame period, the action of the mobile ions having high mobility can be easily captured as a change in the measured value.

In addition, by setting the absolute value of the second potential difference Vp2, that is, the voltage applied to the liquid crystal layer 5 during the first charging period T3 to be greater than 0 V and smaller than the threshold voltage Vth of the liquid crystal layer 5, the detection electrode potential Vd during the first discharging period T4 can be measured while inhibiting the influence of the dielectric anisotropy of the liquid crystal layer 5.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 according to the first embodiment, the measurement circuit 200 supplies a potential to each of the detection electrode 30 and the common electrode 21 so that the potential difference becomes the third potential difference Vp3 having the same polarity as the first potential difference Vp1 and having the absolute value smaller than that of the first potential difference Vp1 during the first relaxation period T2 between the first reverse sweep period T1 and the first charging period T3.

In this way, by inserting the first relaxation period T2 between the first reverse sweep period T1 and the first charging period T3, transition can be made from the first reverse sweep period T1 to the first charging period T3 without moving the mobile ions initially disposed during the first reverse sweep period T1.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 according to the first embodiment, the absolute value of the third potential difference Vp3 is greater than 0 V and less than the threshold voltage Vth of the liquid crystal layer 5.

In this way, by setting the absolute value of the third potential difference Vp3, that is, the voltage applied to the liquid crystal layer 5 during the first relaxation period T2, to be greater than 0 V and smaller than the threshold voltage Vth of the liquid crystal layer 5, the effect of inhibiting the influence of the dielectric anisotropy of the liquid crystal layer 5 is enhanced.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 of the first embodiment, the measurement circuit 200 supplies a potential to each of the detection electrode 30 and the common electrode 21 so that the potential difference becomes the fourth potential difference Vp4 having a polarity different from that of the first potential difference Vp1 and having the same absolute value as the first potential difference Vp1 during the second reverse sweep period T5 after the first discharge period T4, supplies a potential to each of the detection electrode 30 and the common electrode 21 so that the potential difference becomes the fifth potential difference Vp5 having a polarity different from that of the fourth potential difference Vp4 during the second charging period T7 after the second reverse sweep period T5, and stops supplying the potential to the detection electrode 30 and supplies the same potential as that during the second charging period T7 to the common electrode 21 during the second discharging period T8 after the second charging period T7 to measure the detection electrode potential Vd at least once.

As described above, in this embodiment, the second reverse sweep period T5 is inserted before the second charging period T7 and the second discharging period T8. Thus, in the second reverse sweep period T5, the mobile ions included in the liquid crystal layer 5 can be effectively initially disposed in either the common electrode 21 or the detection electrode 30. In this way, by adjusting the initial arrangement of the mobile ions before the second charging period T7 starts, it is possible to obtain measurement reproducibility of the measured value of the detection electrode potential Vd obtained during the second discharging period T8. In addition, since the influence of the internal electric field due to the mobile ions is also reflected in the measured value, an increase in the mobile ions is likely to appear as a change in the measured value. As a result, the progress of deterioration of the liquid crystal layer 5 can be tracked with higher sensitivity from the beginning of use of the liquid crystal panel 100.

Further, according to the above-described embodiment, since the liquid crystal layer 5 is AC-driven, it is possible to inhibit deterioration of the liquid crystal layer 5 caused by application of a DC voltage to the liquid crystal layer 5 at the time of measurement of the detection electrode potential Vd.

In the liquid crystal device 1000 of the first embodiment, the second reverse sweep period T5 is longer than one frame period in the display region E during the normal driving, and the absolute value of the fourth potential difference Vp4 is equal to or greater than the maximum applied voltage of the liquid crystal layer 5 in the display region E during the normal driving.

In this way, by setting the second reverse sweep period T5 to be longer than one frame period, in particular, the mobile ions having low mobility can be effectively initially disposed in either the common electrode 21 or the detection electrode 30.

In addition, by setting the absolute value of the fourth potential difference Vp4, that is, the voltage applied to the liquid crystal layer 5 during the second reverse sweep period T5 to be equal to or greater than the maximum applied voltage of the liquid crystal layer 5 in the display region E during the normal driving, the mobile ions that move at about the maximum applied voltage can also be effectively initially disposed in either the common electrode 21 or the detection electrode 30.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 of the first embodiment, the second charging period T7 is shorter than one frame period in the display region E during the normal driving, and the absolute value of the fifth potential difference Vp5 is greater than 0 V and less than the threshold voltage Vth of the liquid crystal layer 5.

In this way, by setting the second charging period T7 to be shorter than one frame period, the action of the mobile ions having high mobility can be easily captured as a change in the measured value.

In addition, by setting the absolute value of the fifth potential difference Vp5, that is, the voltage applied to the liquid crystal layer 5 during the second charging period T7, to be greater than 0 V and smaller than the threshold voltage Vth of the liquid crystal layer 5, the detection electrode potential Vd during the second discharging period T8 can be measured while inhibiting the influence of the dielectric anisotropy of the liquid crystal layer 5.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 of the first embodiment, the measurement circuit 200 supplies a potential to each of the detection electrodes 30 and the common electrode 21 so that the potential difference becomes the sixth potential difference Vp6 having the same polarity as the fourth potential difference Vp4 and having the absolute value smaller than the absolute value of the fourth potential difference Vp4 during the second relaxation period T6 between the second reverse sweep period T5 and the second charging period T7.

In this way, by inserting the second relaxation period T6 between the second reverse sweep period T5 and the second charging period T7, transition can be made from the second reverse sweep period 15 to the second charging period T7 without moving the mobile ions initially disposed during the second reverse sweep period T5.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 of the first embodiment, the absolute value of the sixth potential difference Vp6 is greater than 0 V and less than the threshold voltage Vth of the liquid crystal layer 5.

In this way, by setting the absolute value of the sixth potential difference Vp6, that is, the voltage applied to the liquid crystal layer 5 during the second relaxation period T6, to be greater than 0 V and smaller than the threshold voltage Vth of the liquid crystal layer 5, the effect of inhibiting the influence of the dielectric anisotropy of the liquid crystal layer 5 is enhanced.

Accordingly, according to the above-described embodiment, the progress of deterioration of the liquid crystal layer 5 can be tracked with higher sensitivity from the initial stage of usage of the liquid crystal panel 100 with higher measurement reproducibility.

In the liquid crystal device 1000 of the first embodiment, the measurement circuit 200 includes the first node N1 electrically coupled to the detection electrode 30, the common electrode line L1 electrically coupled to the common electrode 21, the ground potential line L2 to which the ground potential is applied, the first capacitor C1 electrically coupled to a portion between the first node N1 and the ground potential line L2, the second capacitor C2 electrically coupled to a portion between the common electrode line L1 and the ground potential line L2, the first switch SW1, the second switch SW2, the third switch SW3, the fourth switch SW4, the measurement potential generation circuit 40 that outputs the measurement potential Vs corresponding to the reference voltage Vsref, the central control circuit 45 that outputs the reference voltage Vs to the measurement potential generation circuit 40 and controls the first switch SW1 to the fourth switch SW4, and the potential measurement circuit (the amplifier circuit 43 and the A/D converter 44) that measures the potential of the first node N1 as the detection electrode potential Vd and outputs the measured value of the detection electrode potential Vd to the central control circuit 45.

The first node N1 is electrically coupled to the ground potential line L2 via the first switch SW1. The first node N1 is electrically coupled to the output terminal of the measurement potential generation circuit 40 via the second switch SW2. The common electrode line L1 is electrically coupled to the ground potential line L2 via the third switch SW3. The common electrode line L1 is electrically coupled to the output terminal of the measurement potential generation circuit 40 via the fourth switch SW4.

By using the measurement circuit 200 having the above-described configuration, it is possible to realize the functions required for the measurement circuit 200 with a simple circuit configuration and to reduce noise components included in the measured value of the detection electrode potential Vd.

In the liquid crystal device 1000 of the first embodiment, the first switch SW1 and the second switch SW2 are controlled to be on by the first voltage (5 V), and the third switch SW3 and the fourth switch SW4 are controlled to be on by the second voltage (15 V) higher than the first voltage. In this way, the third switch SW3 and the fourth switch SW4 electrically coupled to the common electrode line L1 are controlled to be on by the relatively high second voltage, so that the on-resistances of the third switches SW3 and the fourth switches SW4 can be reduced, and thus it is possible to improve the responsiveness of the common electrode line L1 and to inhibit a leakage current from the detection electrode 30.

As a result, since the first charging period T3 and the second charging period T7 can be shortened, the action of the mobile ions having high mobility can be captured as a change in the measured value, and the influence of variations in characteristics of each switch component on the measured value can be inhibited. In addition, the first switch SW1 and the second switch SW2 are preferably not integrated with the central control circuit 45. For example, the first switch SW1 and the second switch SW2 are mounted as an IC chip A, and the central control circuit 45 is mounted as an IC chip B. The central control circuit 45 may include a circuit system driven at high speed and may generate heat to reach a higher temperature. Accordingly, if the first switch SW1 and the second switch SW2 are not integrated with the central control circuit 45, increases in temperature of the first switch SW1 and the second switch SW2 are reduced, and the leakage current through each switch is inhibited. As a result, a change in the potential of the detection electrode 30 during the first discharging period T4 or the second discharging period T8 is more dominated by the action of the mobile ions, which is more suitable for measurement.

2. Second Embodiment

A second embodiment of the present disclosure will be described below. In each form exemplified below, the same reference signs as those used in the first embodiment will be assigned to configurations common to the first embodiment, and detailed description thereof will be omitted as appropriate.

2.1. Outline of Configuration of Liquid Crystal Device 2000

Figure 17:
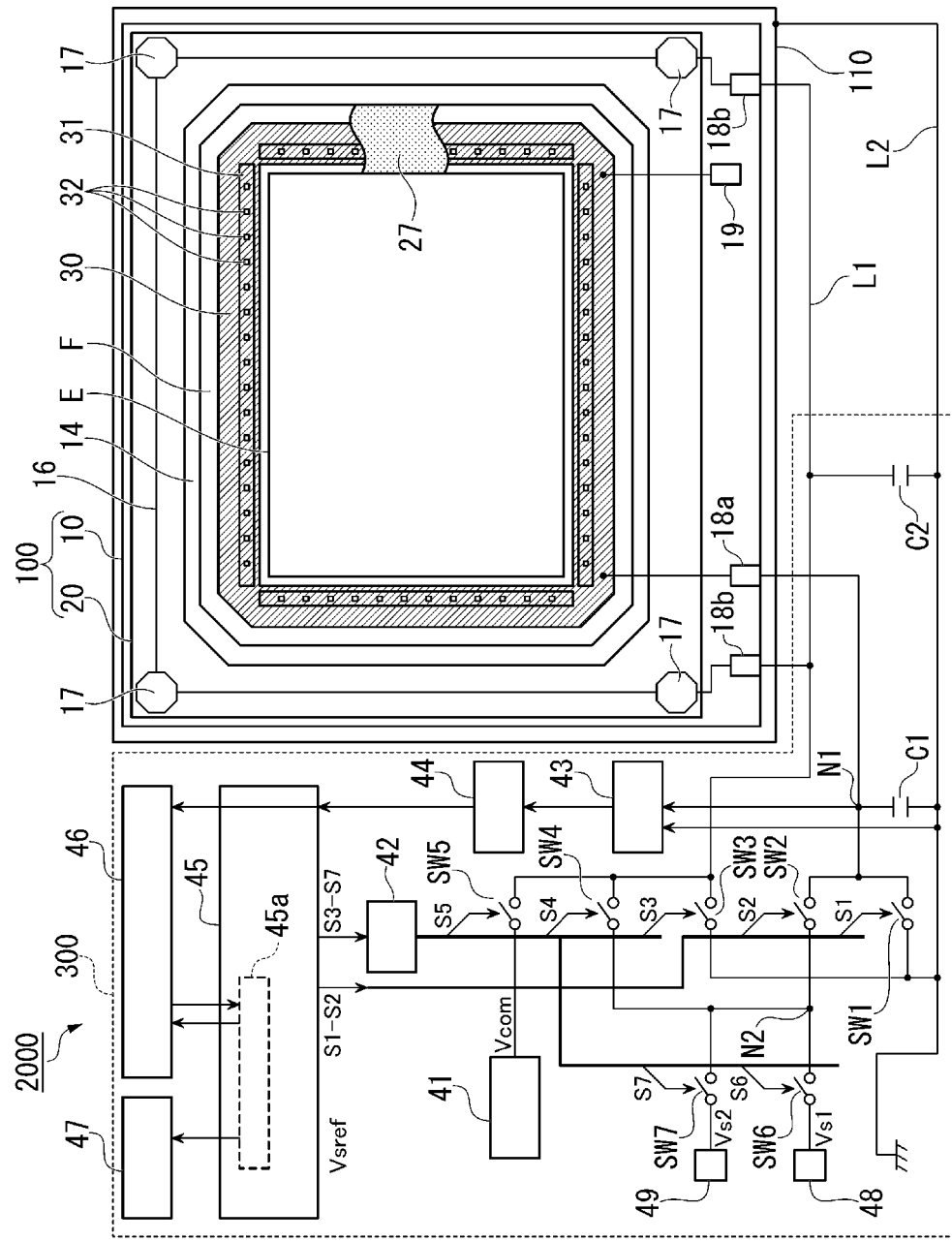
FIG. 17 is an explanatory diagram showing a schematic configuration of a liquid crystal device according to a second embodiment.

FIG. 17 is an explanatory diagram showing a schematic configuration of a liquid crystal device 2000 of the second embodiment. The liquid crystal device 2000 includes the same liquid crystal panel 100 as that of the first embodiment and a measurement circuit 300 different from that of the first embodiment.

The measurement circuit 300 supplies a potential to each of the detection electrode 30 and the common electrode 21 and measures the detection electrode potential Vd which is the potential of the detection electrode 30. The measurement circuit 300 includes the common potential generation circuit 41, the level shifter 42, the amplifier circuit 43, the A/D converter 44, the central control circuit 45, the measured value storage circuit 46, the display information generation circuit 47, a first measurement potential generation circuit 48, a second measurement potential generation circuit 49, the first switch SW1, the second switch SW2, the third switch SW3, the fourth switch SW4, the fifth switch SW5, a sixth switch SW6, a seventh switch SW7, the first capacitor C1, the second capacitor C2, the common electrode line L1, the ground potential line L2, the first node N1, and a second node N2.

The first measurement potential generation circuit 48 outputs a predetermined first measurement potential Vs1. For example, the first measurement potential Vs1 is +5 V. The second measurement potential generation circuit 49 outputs a predetermined second measurement potential Vs2. For example, the second measurement potential Vs2 is +1.2 V. If there is a 5 V power supply used in the measurement circuit 300, the first measurement potential generation circuit 48 can use that voltage. The second measurement potential generation circuit 49 can use, for example, a voltage follower to which an output voltage of a constant voltage circuit using a shunt regulator is input. Alternatively, it can use a voltage follower to which a voltage generated by a resistive voltage dividing circuit is input.

The first node N1 is electrically coupled to the ground potential line L2 via the first switch SW1. The first node N1 is electrically coupled to the second node N2 via the second switch SW2. The second node N2 is electrically coupled to an output terminal of the first measurement potential generation circuit 48 via the sixth switch SW6. The second node N2 is electrically coupled to an output terminal of the second measurement potential generation circuit 49 via the seventh switch SW7. The common electrode line L1 is electrically coupled to the ground potential line L2 via the third switch SW3. The common electrode line L1 is electrically coupled to the second node N2 via the fourth switch SW4. The common electrode line L1 is electrically coupled to the output terminal of the common potential generation circuit 41 via the fifth switch SW5.

The state of the first switch SW1 is controlled by the first control signal S1 output from the central control circuit 45. For example, as the first control signal S1, a logic signal having an amplitude of 5 V is output from the central control circuit 45, and when the logic is "H," the first switch SW1 is turned on. The state of the second switch SW2 is controlled by the second control signal S2 output from the central control circuit 45. For example, as the second control signal S2, a logic signal having an amplitude of 5 V is output from the central control circuit 45, and when the logic is "H," the second switch SW2 is turned on. That is, the first switch SW1 and the second switch SW2 are controlled to be on by the first voltage (5 V).

The state of the third switch SW3 is controlled by the third control signal S3 output from the central control circuit 45 via the level shifter 42. For example, as the third control signal S3, a logic signal having an amplitude of 5 V is output from the central control circuit 45, but this logic signal is converted by the level shifter 42 into a logic signal having an amplitude of 15 V. That is, when the third control signal S3 having an amplitude of 15 V is output from the level shifter 42, and when the logic is "H," the third switch SW3 is turned on.

The state of the fourth switch SW4 is controlled by the fourth control signal S4 output from the central control circuit 45 via the level shifter 42. For example, as the fourth control signal S4, a logic signal having an amplitude of 5 V is output from the central control circuit 45, but this logic signal is converted by the level shifter 42 into a logic signal having an amplitude of 15 V. That is, the fourth control signal S4 having an amplitude of 15 V is output from the level shifter 42, and when the logic is "H," the fourth switch SW4 is turned on.

The state of the fifth switch SW5 is controlled by the fifth control signal S5 output from the central control circuit 45 via the level shifter 42. For example, as the fifth control signal S5, a logic signal having an amplitude of 5 V is output from the central control circuit 45, but this logic signal is converted by the level shifter 42 into a logic signal having an amplitude of 15 V. That is, the fifth control signal S5 having an amplitude of 15 V is output from the level shifter 42, and when the logic is "H," the fifth switch SW5 is turned on.

A state of the sixth switch SW6 is controlled by a sixth control signal S6 output from the central control circuit 45 via the level shifter 42. For example, as the sixth control signal S6, a logic signal having an amplitude of 5 V is output from the central control circuit 45, but this logic signal is converted into a logic signal having an amplitude of 15 V by the level shifter 42. That is, the sixth control signal S6 having an amplitude of 15 V is output from the level shifter 42, and when the logic is "H," the sixth switch SW6 is turned on.

A state of the seventh switch SW7 is controlled by a seventh control signal S7 output from the central control circuit 45 via the level shifter 42. For example, as the seventh control signal S7, a logic signal having an amplitude of 5V is output from the central control circuit 45, but this logic signal is converted into a logic signal having an amplitude of 15 V by the level shifter 42. That is, the seventh control signal S7 having an amplitude of 15 V is output from the level shifter 42, and when the logic is "H," the seventh switch SW7 is turned on.

As described above, the third switch SW3 to the seventh switch SW7 are controlled to be on by the second voltage (15 V) higher than the first voltage (5 V).

The central control circuit 45 controls each circuit included in the measurement circuit 200 at the time of measuring the state of deterioration of the liquid crystal layer 5. Specifically, the central control circuit 45 outputs the first control signal S1 to the first switch SW1 and outputs the second control signal S2 to the second switch SW2. The central control circuit 45 outputs the third control signal S3 to the seventh control signal S7 respectively to the third switch SW3 to the seventh switch SW7 via the level shifter 42. The central control circuit 45 according to the second embodiment does not output the reference voltage Vsref described in the first embodiment. In this way, the central control circuit 45 according to the second embodiment corresponds to a control circuit that controls the first switch SW1 to the fifth switch SW5, the sixth switch SW6, and the seventh switch SW7.

Similarly to the first embodiment, the central control circuit 45 according to the second embodiment stores the measured value of the detection electrode potential Vd output from the A/D converter 44 in the measured value storage circuit 46. The measured value storage circuit 46 stores the measured value of the detection electrode potential Vd under the control of the central control circuit 45. The central control circuit 45 includes the determination circuit 45a. The determination circuit 45a determines the state of deterioration of the liquid crystal layer 5 based on the measured value stored in the measured value storage circuit 46. The display information generation circuit 47 generates display information of the state of deterioration of the liquid crystal layer 5 based on the measured value and the determination results.

Also, among circuits included in the measurement circuit 300, circuits other than the circuits described above are the same as the circuits included in the measurement circuit 200 of the first embodiment.

2.2. Description of First Measurement Processing and Second Measurement Processing According to Second Embodiment Similarly to the first embodiment, the central control circuit 45 according to the second embodiment alternately executes the first measurement processing and the second measurement processing until the count value K becomes equal to the upper limit value Kmax. The contents of the first measurement processing and the second measurement processing according to the second embodiment are different from the contents of the first measurement processing and the second measurement processing according to the first embodiment. This is because the control of the sixth switch SW6 and the seventh switch SW7 is added. Potential control for the detection electrode 30 and the common electrode 21 is the same as that in the first embodiment. The first measurement processing and the second measurement processing according to the second embodiment will be described in detail below with reference to FIGS. 5 and 6.

In the first reverse sweep period T1, the measurement circuit 300 supplies a potential to each of the detection electrode 30 and the common electrode 21 so that the potential difference between the detection electrode 30 and the common electrode 21 becomes the first potential difference Vp1.

Specifically, in the first reverse sweep period T1, the central control circuit 45 controls the second switch SW2 and the third switch SW3 to be turned on and controls the first switch SW1, the fourth switch SW4, and the fifth switch SW5 to be turned off. In addition, in the first reverse sweep period T1, the central control circuit 45 controls the sixth switch SW6 to be turned on and controls the seventh switch SW7 to be turned off.

In the first reverse sweep period T1, the central control circuit 45 controls the first switch SW1 to the seventh switch SW7 as described above, whereby the output terminal of the first measurement potential generation circuit 48 is electrically coupled to the detection electrode 30, and the ground potential line L2 is electrically coupled to the common electrode 21. Thus, in the first reverse sweep period T1, the first measurement potential Vs1 of +5 V is supplied to the detection electrode 30, and the ground potential, that is, 0 V, is supplied to the common electrode 21. As a result, as shown in FIG. 5, in the first reverse sweep period T1, the detection electrode potential Vd becomes +5 V, and the common electrode potential Vc becomes 0 V. Also, as shown in FIG. 6, in the first reverse sweep period T1, the potential difference between the detection electrode 30 and the common electrode 21 becomes the first potential difference Vp1, that is, +5 V.

In this way, in the first reverse sweep period T1, the measurement circuit 300 supplies the first measurement potential Vp1 of +5 V to the detection electrode 30 and supplies the ground potential to the common electrode 21 so that the potential difference between the detection electrode 30 and the common electrode 21 becomes the first potential difference Vp1 of +5 V.

In the first relaxation period T2 between the first reverse sweep period T1 and the first charging period T3, the measurement circuit 300 supplies a potential to each of the detection electrode 30 and the common electrode 21 so that the potential difference between the detection electrode 30 and the common electrode 21 becomes the third potential difference Vp3 having the same polarity as the first potential difference Vp1 and having an absolute value smaller than that of the first potential difference Vp1.

Specifically, in the first relaxation period T2, the central control circuit 45 controls the second switch SW2 and the third switch SW3 to be turned on and controls the first switch SW1, the fourth switch SW4, and the fifth switch SW5 to be turned off. In addition, in the first relaxation period T2, the central control circuit 45 controls the sixth switch SW6 to be turned off and controls the seventh switch SW7 to be turned on.

In the first relaxation period T2, the central control circuit 45 controls the first switch SW1 to the seventh switch SW7 as described above, whereby the output terminal of the second measurement potential generation circuit 49 is electrically coupled to the detection electrode 30, and the ground potential line L2 is electrically coupled to the common electrode 21. Thus, in the first relaxation period T2, the second measurement potential Vs2 of +1.2 V is supplied to the detection electrode 30, and the ground potential is supplied to the common electrode 21. As a result, as shown in FIG. 5, in the first relaxation period T2, the detection electrode potential Vd becomes +1.2 V, and the common electrode potential Vc becomes 0 V. Also, as shown in FIG. 6, in the first relaxation period T2, the potential difference between the detection electrode 30 and the common electrode 21 becomes the third potential difference Vp3, that is, +1.2 V.

In this way, in the first relaxation period T2, the measurement circuit 300 supplies the second measurement potential Vp2 of +1.2 V to the detection electrode 30 and supplies the ground potential to the common electrode 21 so that the potential difference between the detection electrode 30 and the common electrode 21 becomes the third potential difference Vp3 (+1.2 V) having the same polarity as the first potential difference Vp1 and having the absolute value smaller than the absolute value of the first potential difference Vp1.

In the first charging period T3 after the first reverse sweep period T1 and after the first relaxation period T2, the measurement circuit 300 supplies a potential to each of the detection electrode 30 and the common electrode 21 so that the potential difference between the detection electrode 30 and the common electrode 21 becomes the second potential difference Vp2 having a polarity different from that of the first potential difference Vp1.

Specifically, in the first charging period T3, the central control circuit 45 controls the first switch SW1 and the fourth switch SW4 to be turned on and controls the second switch SW2, the third switch SW3, and the fifth switch SW5 to be turned off. In addition, in the first charging period T3, the central control circuit 45 controls the sixth switch SW6 to be turned off and controls the seventh switch SW7 to be turned on.

In the first charging period T3, the central control circuit 45 controls the first switch SW1 to the seventh switch SW7 as described above, whereby the output terminal of the second measurement potential generation circuit 49 is electrically coupled to the common electrode 21, and the ground potential line L2 is electrically coupled to the detection electrode 30. Thus, in the first charging period T3, the ground potential is supplied to the detection electrode 30, and the second measurement potential Vs2 of +1.2 V is supplied to the common electrode 21. As a result, as shown in FIG. 5, in the first charging period T3, the detection electrode potential Vd becomes +0 V, and the common electrode potential Vc becomes +1.2 V. Also, as shown in FIG. 6, in the first charging period T3, the potential difference between the detection electrode 30 and the common electrode 21 becomes the second potential difference Vp2, that is, −1.2 V.

In this way, in the first charging period T3, the measurement circuit 300 supplies the second measurement potential Vp2 of +1.2 V to the common electrode 21 and supplies the ground potential to the detection electrode 30 so that the potential difference between the detection electrode 30 and the common electrode 21 becomes the second potential difference Vp2 (−1.2 V) having a polarity different from that of the first potential difference Vp1.

In the first discharging period T4 after the first charging period T3, the measurement circuit 300 stops supplying the potential to the detection electrode 30 and supplies the same potential as that during the first charging period T3 to the common electrode 21 to measure the detection electrode potential Vd at least once, for example, at the end of the first discharging period T4.

Specifically, in the first discharging period T4, the central control circuit 45 controls the fourth switch SW4 to be turned on and controls the first switch SW1, the second switch SW2, the third switch SW3, and the fifth switch SW5 to be turned off. In addition, in the first discharging period T4, the central control circuit 45 controls the sixth switch SW6 to be turned off and controls the seventh switch SW7 to be turned on.

In the first discharging period T4, the central control circuit 45 controls the first switch SW1 to the seventh switch SW7 as described above, whereby the output terminal of the second measurement potential generation circuit 49 is electrically coupled to the common electrode 21, and the ground potential line L2 is electrically decoupled from the detection electrode 30. Thus, in the first discharging period T4, the second measurement potential Vs2 of +1.2 V continues to be supplied to the common electrode 21, but supply of the potential to the detection electrode 30 is stopped, and thus the liquid crystal layer 5 discharges electric charges charged during the first charging period T3. As a result, as shown in FIG. 5, in the first discharging period T4, the detection electrode potential Vd gradually changes from the ground potential 0 V to the potential (1.2 V) applied to the common electrode 21.

For example, the central control circuit 45 measures the detection electrode potential Vd1 at time t5 when the first circuit 45 acquires a digital value output from the A/D converter 44 at time t5 as the measured value of the detection electrode potential Vd1. The central control circuit 45 causes the measured value storage circuit 46 to store the measured value of the detection electrode potential Vd1 obtained at time t5.

In this way, in the first discharging period T4, the measurement circuit 300 stops supplying the potential to the detection electrode 30 and supplies the second measurement potential Vs2 of +1.2 V, which is the same as that during the first charging period T3, to the common electrode 21 to measure the detection electrode potential Vd1 at least once, for example, at time t5 when the first discharging period T4 ends. The first measurement processing has been described above.

In the second reverse sweep period T5 after the first discharging period T4, the measurement circuit 300 supplies a potential to each of the detection electrode 30 and the common electrode 21 so that the potential difference between the detection electrode 30 and the common electrode 21 becomes the fourth potential difference Vp4 having a polarity different from that of the first potential difference Vp1 and having the same absolute value as that of the first potential difference Vp1.

Specifically, in the second reverse sweep period T5, the central control circuit 45 controls the first switch SW1 and the fourth switch SW4 to be turned on and controls the second switch SW2, the third switch SW3, and the fifth switch SW5 to be turned off. In addition, in the second reverse sweep period T2, the central control circuit 45 controls the sixth switch SW6 to be turned on and controls the seventh switch SW7 to be turned off.

In the second reverse sweep period T5, the central control circuit 45 controls the first switch SW1 to the seventh switch SW7 as described above, whereby the output terminal of the first measurement potential generation circuit 48 is electrically coupled to the common electrode 21, and the ground potential line L2 is electrically coupled to the detection electrode 30. Thus, in the second reverse sweep period T5, the first measurement potential Vs1 of +5 V is supplied to the common electrode 21, and the ground potential is supplied to the detection electrode 30. As a result, as shown in FIG. 5, in the second reverse sweep period T5, the detection electrode potential Vd becomes 0 V, and the common electrode potential Vc becomes +5 V. Also, as shown in FIG. 6, in the second reverse sweep period T5, the potential difference between the detection electrode 30 and the common electrode 21 becomes the fourth potential difference Vp4, that is, −5 V.

In this way, in the second reverse sweep period T5, the measurement circuit 300 supplies the first measurement potential Vs1 of +5 V to the common electrode 21 and supplies the ground potential to the detection electrode 30 so that the potential difference between the detection electrode 30 and the common electrode 21 becomes the fourth potential difference Vp4 (−5 V) having a polarity different from that of the first potential difference Vp1 and having the same absolute value as that of the first potential difference Vp1.

In the second relaxation period T6 between the second reverse sweep period T5 and the second charging period T7, the measurement circuit 300 supplies a potential to each of the detection electrode 30 and the common electrode 21 so that the potential difference between the detection electrode 30 and the common electrode 21 becomes the sixth potential difference Vp6 having the same polarity as the fourth potential difference Vp4 and having an absolute value smaller than that of the fourth potential difference Vp4.

Specifically, in the second relaxation period T6, the central control circuit 45 controls the first switch SW1 and the fourth switch SW4 to be turned on and controls the second switch SW2, the third switch SW3, and the fifth switch SW5 to be turned off. In addition, in the second relaxation period T6, the central control circuit 45 controls the sixth switch SW6 to be turned off and controls the seventh switch SW7 to be turned on.

In the second relaxation period T6, the central control circuit 45 controls the first switch SW1 to the seventh switch SW7 as described above, whereby the output terminal of the second measurement potential generation circuit 49 is electrically coupled to the common electrode 21, and the ground potential line L2 is electrically coupled to the detection electrode 30. Thus, in the second relaxation period T6, the second measurement potential Vs2 of +1.2 V is supplied to the common electrode 21, and the ground potential is supplied to the detection electrode 30. As a result, as shown in FIG. 5, in the second relaxation period T6, the detection electrode potential Vd becomes 0 V, and the common electrode potential Vc becomes +1.2 V. Also, as shown in FIG. 6, in the second relaxation period T6, the potential difference between the detection electrode 30 and the common electrode 21 becomes the sixth potential difference Vp6, that is, −1.2 V.

In this way, in the second relaxation period T6, the measurement circuit 300 supplies the second measurement potential Vs2 of +1.2 V to the common electrode 21 and supplies the ground potential to the detection electrode 30 so that the potential difference between the detection electrode 30 and the common electrode 21 becomes the sixth potential difference Vp6 (−1.2 V) having the same polarity as the fourth potential difference Vp4 and having the absolute value smaller than the fourth potential difference Vp4.

In the second charging period T7 after the second reverse sweep period T5 and after the second relaxation period T6, the measurement circuit 300 supplies a potential to each of the detection electrode 30 and the common electrode 21 so that the potential difference between the detection electrode 30 and the common electrode 21 becomes the fifth potential difference Vp5 having a polarity different from that of the fourth potential difference Vp4.

Specifically, in the second charging period T7, the central control circuit 45 controls the second switch SW2 and the third switch SW3 to be turned on and controls the first switch SW1, the fourth switch SW4, and the fifth switch SW5 to be turned off. In addition, in the second charging period T7, the central control circuit 45 controls the sixth switch SW6 to be turned off and controls the seventh switch SW7 to be turned on.

In the second charging period T7, the central control circuit 45 controls the first switch SW1 to the seventh switch SW7 as described above, whereby the output terminal of the second measurement potential generation circuit 49 is electrically coupled to the detection electrode 30, and the ground potential line L2 is electrically coupled to the common electrode 21. Thus, in the second charging period T7, the ground potential is supplied to the common electrode 21, and the second measurement potential Vs2 of +1.2 V is supplied to the detection electrode 30. As a result, as shown in FIG. 5, in the second charging period T7, the detection electrode potential Vd becomes +1.2 V, and the common electrode potential Vc becomes 0 V. Also, as shown in FIG. 6, in the second charging period T7, the potential difference between the detection electrode 30 and the common electrode 21 becomes the fifth potential difference Vp5, that is, +1.2 V.

As described above, in the second charging period T7, the measurement circuit 300 supplies the second measurement potential Vs2 of +1.2 V to the detection electrode 30 and supplies the ground potential to the common electrode 21 so that the potential difference between the detection electrode 30 and the common electrode 21 becomes the fifth potential difference Vp5 (+1.2 V) having a polarity different from that of the fourth potential difference Vp4.

In the second discharging period T8 after the second charging period T7, the measurement circuit 300 stops supplying the potential to the detection electrode 30 and supplies the same potential as that during the second charging period T7 to the common electrode 21 to measure the detection electrode potential Vd at least once, for example, at the end of the second discharging period T8.

Specifically, in the second discharging period T8, the central control circuit 45 controls the third switch SW3 to be turned on and controls the first switch SW1, the second switch SW2, the fourth switch SW4, and the fifth switch SW5 to be turned off. In addition, in the second discharging period T8, the central control circuit 45 controls the sixth switch SW6 to be turned off and controls the seventh switch SW7 to be turned on.

In the second discharging period T8, the central control circuit 45 controls the first switch SW1 to the seventh switch SW7 as described above, whereby the output terminal of the second measurement potential generation circuit 49 is electrically decoupled from the detection electrode 30, and the ground potential line L2 is electrically coupled to the common electrode 21. Thus, in the second discharging period T8, the ground potential continues to be supplied to the common electrode 21, but supply of the potential to the detection electrode 30 is stopped, and thus the liquid crystal layer 5 discharges electric charges charged in the second charging period T7. As a result, as shown in FIG. 5, in the second discharging period T8, the detection electrode potential Vd gradually changes from +1.2 V toward the potential (0 V) applied to the common electrode 21 and reaches the potential Vd2 at time t9.

For example, the central control circuit 45 measures the detection electrode potential Vd2 at time t9 when the second discharging period T8 ends. Specifically, the central control circuit 45 acquires a digital value output from the A/D converter 44 at time t9 as the measured value of the detection electrode potential Vd2. The central control circuit 45 causes the measured value storage circuit 46 to store the measured value of the detection electrode potential Vd2 obtained at time t9.

In this way, in the second discharging period T8, the measurement circuit 300 stops supplying the potential to the detection electrode 30 and supplies the same ground potential as that during the second charging period T7 to the common electrode 21 to measure the detection electrode potential Vd2 at least once, for example, at the end time t9 of the second discharging period T8. The second measurement processing has been described above. In addition, in the description, the detection electrode potential Vd (Vd1 or Vd2) is measured in each of the first measurement processing and the second measurement process, but the measurement may be performed in at least one of them. When all the measurement processes are completed, for example, the central control circuit 45 controls the fifth switch SW5 to be turned on and controls the third switch SW3 and the fourth switch SW4 to be turned off. As a result, the common potential Vcom is applied to the common electrode 21. Furthermore, the second switch SW2 is controlled to be on, and the first switch SW1 is controlled to be turned off. In addition, the seventh switch SW7 is controlled to be on, and the sixth switch SW6 is controlled to be turned off. As a result, the output Vs1=5 V=Vcom of the first measurement potential generation circuit 48 is applied to the first node N1, that is, the detection electrode 30.

Effects of Second Embodiment

In the liquid crystal device 2000 of the second embodiment, the measurement circuit 300 includes the first node N1 electrically coupled to the detection electrode 30, the second node N2, the common electrode line L1 electrically coupled to the common electrode 21, the ground potential line L2 to which the ground potential is applied, the first capacitor C1 electrically coupled to a portion between the first node N1 and the ground potential line L2, the second capacitor C2 electrically coupled to a portion between the common electrode line L1 and the ground potential line L2, the first switch SW1, the second switch SW2, the third switch SW3, the fourth switch SW4, the sixth switch SW6, the seventh switch SW7, the first measurement potential generation circuit 48 that outputs the first measurement potential Vs1, the second measurement potential generation circuit 49 that outputs the second measurement potential Vs2, the central control circuit 45 that controls the first switch SW1 to the fourth switch SW4, the sixth switch SW6, and the seventh switch SW7, and the potential measurement circuit (the amplifier circuit 43 and the A/D converter 44) that measures the potential of the first node N1 as the detection electrode potential Vd and outputs the measured value of the detection electrode potential Vd to the central control circuit 45.

The first node N1 is electrically coupled to the ground potential line L2 via the first switch SW1. The first node N1 is electrically coupled to the second node N2 via the second switch SW2. The second node N2 is electrically coupled to the output terminal of the first measurement potential generation circuit 48 via the sixth switch SW6. The second node N2 is electrically coupled to the output terminal of the second measurement potential generation circuit 49 via the seventh switch SW7. The common electrode line L1 is electrically coupled to the ground potential line L2 via the third switch SW3. The common electrode line L1 is electrically coupled to the second node N2 via the fourth switch SW4.

By using the measurement circuit 300 having the above-described configuration, it is possible to realize the functions required for the measurement circuit 300 with a simple circuit configuration, and to reduce noise components included in the measured value of the detection electrode potential Vd.

In the liquid crystal device 2000 of the second embodiment, the first switch SW1 and the second switch SW2 are controlled to be on by the first voltage (5 V), and the third switch SW3, the fourth switch SW4, the sixth switch SW6, and the seventh switch SW7 are controlled to be on by the second voltage (15 V) higher than the first voltage.

In this way, since the third switch SW3, the fourth switch SW4, the sixth switch SW6, and the seventh switch SW7 electrically coupled to the common electrode line L1 are controlled to be on by the relatively high second voltage, on-resistances of each of these switches can be reduced, and thus the responsiveness of the common electrode line L1 can be improved.

As a result, since the first charging period T3 and the second charging period T7 can be shortened, the action of the mobile ions having high mobility can be captured as a change in the measured value, and the influence of variations in characteristics of each switch component on the measured value can be inhibited.

3. Third Embodiment

A third embodiment of the present disclosure will be described below. In each form illustrated below, the same reference numerals as those used in the first embodiment will be assigned to configurations common to the first embodiment, and detailed description thereof will be omitted as appropriate.

3.1. Outline of Configuration of Liquid Crystal Device 3000

Figure 18:
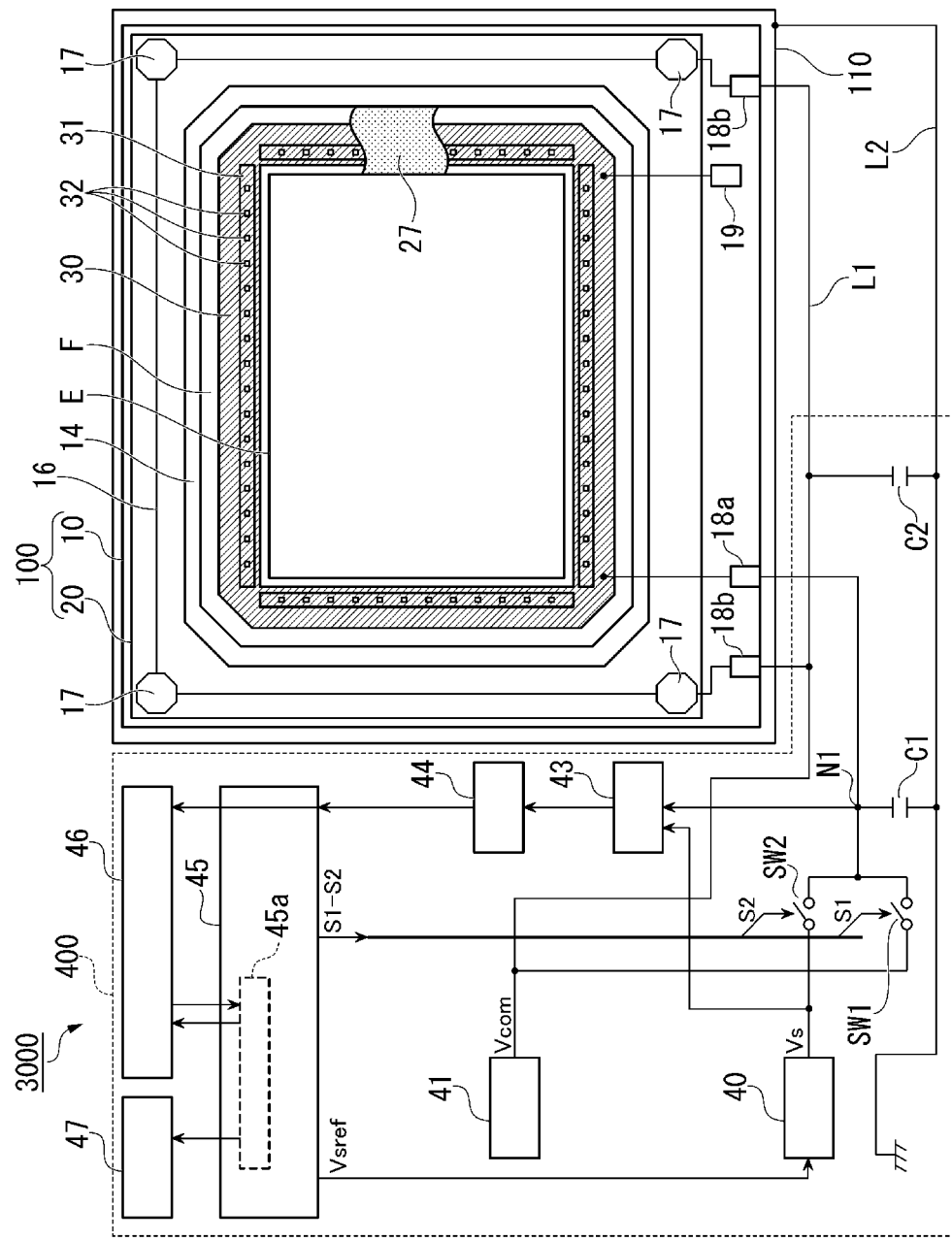
FIG. 18 is an explanatory diagram showing a schematic configuration of a liquid crystal device according to a third embodiment.

FIG. 18 is an explanatory diagram showing a schematic configuration of a liquid crystal device 3000 according to the third embodiment. The liquid crystal device 3000 includes the same liquid crystal panel 100 as that of the first embodiment and a measurement circuit 400 different from that of the first embodiment.

The measurement circuit 400 supplies a potential to each of the detection electrode 30 and the common electrode 21 and measures the detection electrode potential Vd which is the potential of the detection electrode 30. The measurement circuit 400 includes the measurement potential generation circuit 40, the common potential generation circuit 41, the amplifier circuit 43, the A/D converter 44, the central control circuit 45, the measured value storage circuit 46, the display information generation circuit 47, the first switch SW1, the second switch SW2, the first capacitor C1, the second capacitor C2, the common electrode line L1, the ground potential line L2, and the first node N1.

The first node N1 is electrically coupled to the output terminal of the common potential generation circuit 41 via the first switch SW1. The first node N1 is electrically coupled to the output terminal of the measurement potential generation circuit 40 via the second switch SW2. The common electrode line L1 is electrically coupled to the output terminal of the common potential generation circuit 41.

The state of the first switch SW1 is controlled by the first control signal S1 output from the central control circuit 45. For example, as the first control signal S1, a logic signal having an amplitude of 10 V is output from the central control circuit 45, and when the logic is "H," the first switch SW1 is turned on. The state of the second switch SW2 is controlled by the second control signal S2 output from the central control circuit 45. For example, as the second control signal S2, a logic signal having an amplitude of 10 V is output from the central control circuit 45, and when the logic is "H," the second switch SW2 is turned on. That is, the first switch SW1 and the second switch SW2 are controlled to be on by the third voltage (10 V). Although the logic signal having the amplitude of 10 V is directly output from the central control circuit 45 in this embodiment, the level shifter may be used as in the first embodiment.

Unlike the first embodiment, the amplifier circuit 43 according to the third embodiment is a differential amplifier circuit in which the first node N1 electrically coupled to the detection electrode 30 and the output terminal of the measurement potential generation circuit 40 are electrically coupled to each other and amplifies and outputs a potential difference between the potential of the first node N1 and the measurement potential Vs.

The central control circuit 45 controls each circuit included in the measurement circuit 400 at the time of measuring the state of deterioration of the liquid crystal layer 5. Specifically, similarly to the first embodiment, the central control circuit 45 outputs the reference voltage Vsref to the measurement potential generation circuit 40. Also, the central control circuit 45 outputs the first control signal S1 to the first switch SW1 and outputs the second control signal S2 to the second switch SW2. In this way, the central control circuit 45 according to the third embodiment corresponds to a control circuit that outputs the reference voltage Vsref to the measurement potential generation circuit 40 and controls the first switch SW1 and the second switch SW2.

Similarly to the first embodiment, the central control circuit 45 according to the third embodiment stores the measured value of the detection electrode potential Vd output from the A/D converter 44 in the measured value storage circuit 46. The measured value storage circuit 46 stores the measured value of the detection electrode potential Vd under the control of the central control circuit 45. The central control circuit 45 includes the determination circuit 45a. The determination circuit 45a determines the state of deterioration of the liquid crystal layer 5 based on the measured value stored in the measured value storage circuit 46. The display information generation circuit 47 generates display information indicating the state of deterioration of the liquid crystal layer 5 based on the measured value and the determination results.

Also, during the normal driving of the liquid crystal panel 100, the central control circuit 45 of the measurement circuit 400 controls the first switch SW1 to be turned on and controls the second switch SW2 to be turned off. Thus, during the normal driving of the liquid crystal panel 100, the common potential Vcom output from the common potential generation circuit 41 is supplied to each of the common electrode 21 and the detection electrode 30 of the liquid crystal panel 100. Thus, it is possible to inhibit deterioration of the liquid crystal layer 5 disposed between the common electrode 21 and the detection electrode 30 during the normal driving of the liquid crystal panel 100.

3.2. Description of First Measurement Processing and Second Measurement Processing According to Third Embodiment Similarly to the first embodiment, the central control circuit 45 according to the third embodiment alternately executes the first measurement processing and the second measurement processing until the count value K becomes equal to the upper limit value Kmax. The contents of the first measurement processing and the second measurement processing according to the third embodiment are different from the contents of the first measurement processing and the second measurement processing according to the first embodiment. This is because a switch group is configured only by control of the first switch SW1 and the second switch SW2, and the potential control for the detection electrode 30 and the common electrode 21 is different from that in the first embodiment and the second embodiment. The first measurement processing and the second measurement processing according to the third embodiment will be described in detail below with reference to FIG. 19.

Figure 19:
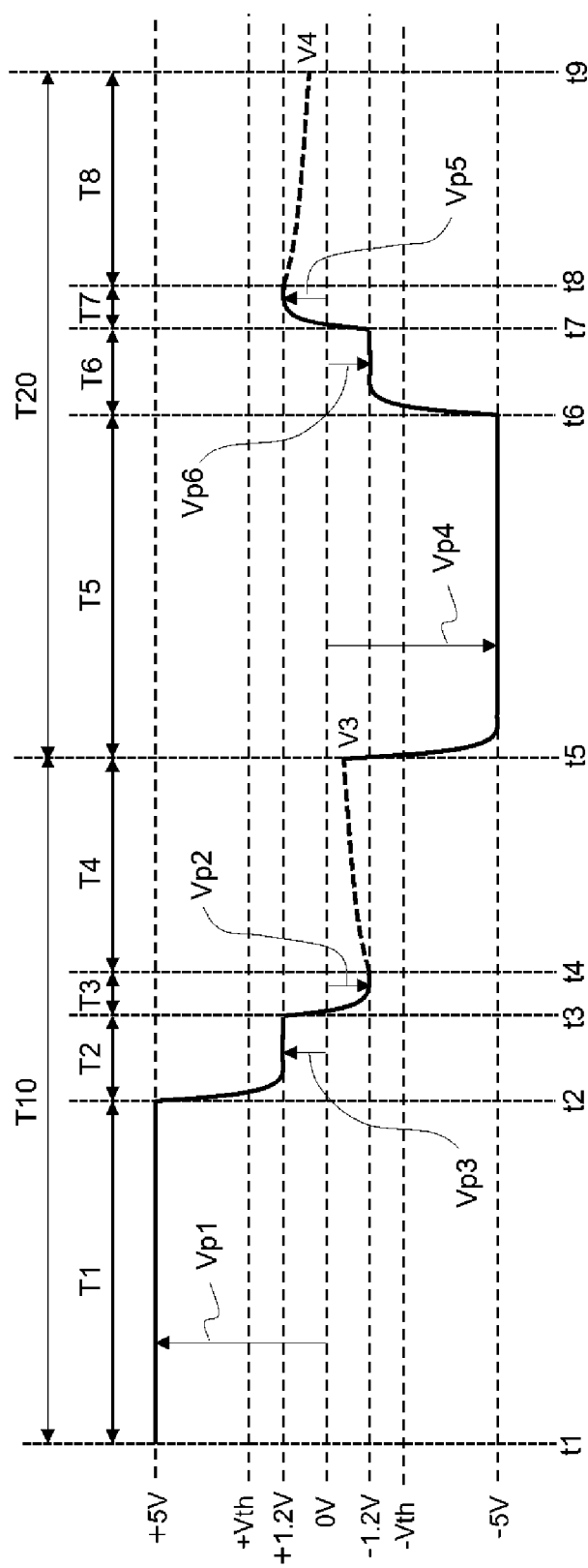
FIG. 19 is a diagram showing a change over time in potential difference between a detection electrode and a common electrode according to the third embodiment.

FIG. 19 is a diagram illustrating a change over time in the potential difference between the detection electrode 30 and the common electrode 21 at the time of executing the first measurement processing and the second measurement processing. In FIG. 19, the horizontal axis represents time, and the vertical axis represents a voltage of the detection electrode 30 with the common electrode 21 as a reference. In other words, it is a voltage applied to the liquid crystal layer 5 in the detection electrode 30. In FIG. 19, a polarity of the potential difference when the detection electrode potential Vd is higher than the common electrode potential Vc is defined as a positive polarity.

In FIG. 19, the first measurement processing is executed in the period T10 from time t1 to time t5. In the following description, the period T10 during which the first measurement processing is executed may be referred to as the first measurement period T10. The first measurement period T10 includes the first reverse sweep period T1, the first relaxation period T2, the first charging period T3, and the first discharging period T4. The first reverse sweep period T1 is the period from time t1 to time t2. The first relaxation period T2 is the period from time t2 to time t3. The first charging period T3 is the period from time t3 to the time t4. The first discharging period T4 is the period from time t4 to the time t5.

In addition, in the third embodiment, the common potential Vcom output from the common potential generation circuit 41 is supplied to the common electrode 21 over the entire period of the first measurement period T10 and the second measurement period T20.

In the first reverse sweep period T1, the measurement circuit 400 supplies a potential to each of the detection electrode 30 and the common electrode 21 so that the potential difference between the detection electrode 30 and the common electrode 21 becomes the first potential difference Vp1.

Specifically, in the first reverse sweep period T1, the central control circuit 45 outputs, for example, the reference voltage Vsref of Vcom+5 V to the measurement potential generation circuit 40. A value of Vcom is the same as a value of the common potential Vcom output from the common potential generation circuit 41. Thus, the measurement potential Vs of Vcom+5 V is output from the measurement potential generation circuit 40. In addition, in the first reverse sweep period T1, the central control circuit 45 controls the first switch SW1 to be turned off and controls the second switch SW2 to be turned on.

In the first reverse sweep period T1, the central control circuit 45 controls the first switch SW1 and the second switch SW2 as described above, whereby the output terminal of the measurement potential generation circuit 40 is electrically coupled to the detection electrode 30. Thus, in the first reverse sweep period T1, the measurement potential Vs of Vcom+5 V is supplied to the detection electrode 30, and the common potential Vcom is supplied to the common electrode 21. As a result, in the first reverse sweep period T1, the detection electrode potential Vd becomes Vcom+5 V, and the common electrode potential Vc becomes the common potential Vcom. Also, as shown in FIG. 19, in the first reverse sweep period T1, the potential difference between the detection electrode 30 and the common electrode 21 becomes the first potential difference Vp1, that is, +5 V.

In this way, in the first reverse sweep period T1, the measurement circuit 400 supplies the measurement potential Vs of Vcom+5 V to the detection electrode 30 and supplies the common potential Vcom to the common electrode 21 so that the potential difference between the detection electrode 30 and the common electrode 21 becomes the first potential difference Vp1 of +5 V.

In the first relaxation period T2 between the first reverse sweep period T1 and the first charging period T3, the measurement circuit 400 supplies a potential to each of the detection electrode 30 and the common electrode 21 so that the potential difference between the detection electrode 30 and the common electrode 21 becomes the third potential difference Vp3 having the same polarity as the first potential difference Vp1 and having an absolute value smaller than that of the first potential difference Vp1.

Specifically, in the first relaxation period T2, the central control circuit 45 outputs, for example, the reference voltage Vsref of Vcom+1.2 V to the measurement potential generation circuit 40. Thus, the measurement potential generation circuit 40 outputs the measurement potential Vs of Vcom+1.2 V. In addition, in the first relaxation period T2, the central control circuit 45 controls the first switch SW1 to be turned off and controls the second switch SW2 to be turned on.

In the first relaxation period T2, the central control circuit 45 controls the first switch SW1 and the second switch SW2 as described above, whereby the output terminal of the measurement potential generation circuit 40 is electrically coupled to the detection electrode 30. Thus, in the first relaxation period T2, the measurement potential Vs of Vcom+1.2 V is supplied to the detection electrode 30, and the common potential Vcom is supplied to the common electrode 21. As a result, in the first relaxation period T2, the detection electrode potential Vd becomes Vcom+1.2 V, and the common electrode potential Vc becomes the common potential Vcom. Also, as shown in FIG. 19, in the first relaxation period T2, the potential difference between the detection electrode 30 and the common electrode 21 becomes the third potential difference Vp3, that is, +1.2 V.

In this way, in the first relaxation period T2, the measurement circuit 400 supplies the measurement potential Vs of Vcom+1.2 V to the detection electrode 30 and supplies the common potential Vcom to the common electrode 21 so that the potential difference between the detection electrode 30 and the common electrode 21 becomes the third potential difference Vp3 (+1.2 V) having the same polarity as the first potential difference Vp1 and having the absolute value smaller than the absolute value of the first potential difference Vp1.

In the first charging period T3 after the first reverse sweep period T1 and after the first relaxation period T2, the measurement circuit 400 supplies a potential to each of the detection electrode 30 and the common electrode 21 so that the potential difference between the detection electrode 30 and the common electrode 21 becomes the second potential difference Vp2 having a polarity different from that of the first potential difference Vp1.

Specifically, in the first charging period T3, the central control circuit 45 outputs, for example, the reference voltage Vsref of Vcom−1.2 V to the measurement potential generation circuit 40. Thus, the measurement potential generation circuit 40 outputs the measurement potential Vs of Vcom−1.2 V. In addition, in the first charging period T3, the central control circuit 45 controls the first switch SW1 to be turned off and controls the second switch SW2 to be turned on.

In the first charging period T3, the central control circuit 45 controls the first switch SW1 and the second switch SW2 as described above, whereby the output terminal of the measurement potential generation circuit 40 is electrically coupled to the detection electrode 30. Thus, in the first charging period T3, the measurement potential Vs of Vcom−1.2 V is supplied to the detection electrode 30, and the common potential Vcom is supplied to the common electrode 21. As a result, in the first charging period T3, the detection electrode potential Vd becomes Vcom−1.2 V, and the common electrode potential Vc becomes the common potential Vcom. Also, as shown in FIG. 19, in the first charging period T3, the potential difference between the detection electrode 30 and the common electrode 21 becomes the second potential difference Vp2, that is, −1.2 V.

In this way, in the first charging period T3, the measurement circuit 400 supplies the measurement potential Vs of Vcom−1.2 V to the detection electrode 30 and supplies the common potential Vcom to the common electrode 21 so that the potential difference between the detection electrode 30 and the common electrode 21 becomes the second potential difference Vp2 (−1.2 V) having a polarity different from that of the first potential difference Vp1.

In the first discharging period T4 after the first charging period T3, the measurement circuit 400 stops supplying the potential to the detection electrode 30 and supplies the same potential as that during the first charging period T3 to the common electrode 21 to measure the detection electrode potential Vd at least once, for example, at the end of the first discharging period T4.

Specifically, in the first discharging period T4, the central control circuit 45 controls each of the first switch SW1 and the second switch SW2 to be turned off.

In the first discharging period T4, the central control circuit 45 controls the first switch SW1 and the second switch SW2 as described above, whereby the output terminal of the measurement potential generation circuit 40 is electrically decoupled from the detection electrode 30. Thus, in the first discharging period T4, the common potential Vcom continues to be supplied to the common electrode 21, but supply of the potential to the detection electrode 30 is stopped, and thus the liquid crystal layer 5 discharges electric charges charged in the first charging period T3. The detection electrode potential Vd1 at the end of the first discharging period T4 in the first embodiment and the second embodiment corresponds to a potential V3 in FIG. 19 in this embodiment. Then, a potential difference between the potential V3 and the measurement potential Vs (=Vcom−1.2 V) is amplified by the amplifier circuit 43 and input to the A/D converter 44. In the simplest configuration example of a differential amplifier circuit, the detection electrode potential Vd is input to a non-inverting input (+) side of an operational amplifier, and the measurement potential Vs (=Vcom−1.2 V) is input to an inverting input (−) side of the operational amplifier.

For example, the central control circuit 45 measures the detection electrode potential Vd1 at time t5 when the first circuit 45 acquires a digital value output from the A/D converter 44 at time t5 as the measured value of the detection electrode potential Vd1. The central control circuit 45 causes the measured value storage circuit 46 to store the measured value of the detection electrode potential Vd1 obtained at time t5.

In this way, in the first discharging period T4, the measurement circuit 400 stops supplying the potential to the detection electrode 30 and supplies the common potential Vcom, which is the same as that during the first charging period T3, to the common electrode 21 to measure the detection electrode potential Vd1 at least once, for example, at the end of the first discharging period T4. The first measurement processing has been described above.

In the second reverse sweep period T5 after the first discharging period T4, the measurement circuit 400 supplies a potential to each of the detection electrode 30 and the common electrode 21 so that the potential difference between the detection electrode 30 and the common electrode 21 becomes the fourth potential difference Vp4 having a polarity different from that of the first potential difference Vp1 and having the same absolute value as the absolute value of the first potential difference Vp1.

Specifically, in the second reverse sweep period T5, the central control circuit 45 outputs, for example, the reference voltage Vsref of Vcom−5 V to the measurement potential generation circuit 40. Thus, the measurement potential Vs of Vcom−5 V is output from the measurement potential generation circuit 40. In addition, in the second reverse sweep period T5, the central control circuit 45 controls the first switch SW1 to be turned off and controls the second switch SW2 to be turned on.

In the second reverse sweep period T5, the central control circuit 45 controls the first switch SW1 and the second switch SW2 as described above, whereby the output terminal of the measurement potential generation circuit 40 is electrically coupled to the detection electrode 30. Thus, in the second reverse sweep period T2, the measurement potential Vs of Vcom−5 V is supplied to the detection electrode 30, and the common potential Vcom is supplied to the common electrode 21. As a result, in the second reverse sweep period T5, the detection electrode potential Vd becomes Vcom−5 V, and the common electrode potential Vc becomes the common potential Vcom. Also, as shown in FIG. 19, in the second reverse sweep period T5, the potential difference between the detection electrode 30 and the common electrode 21 becomes the fourth potential difference Vp4, that is, −5 V.

In this way, in the second reverse sweep period T5, the measurement circuit 400 supplies the measurement potential Vs of Vcom−5 V to the detection electrode 30 and supplies the common potential Vcom to the common electrode 21 so that the potential difference between the detection electrode 30 and the common electrode 21 becomes the fourth potential difference Vp4 (−5 V) having a polarity different from that of the first potential difference Vp1 and having the same absolute value as that of the first potential difference Vp1.

In the second relaxation period T6 between the second reverse sweep period T5 and the second charging period T7, the measurement circuit 400 supplies a potential to each of the detection electrode 30 and the common electrode 21 so that the potential difference between the detection electrode 30 and the common electrode 21 becomes the sixth potential difference Vp6 having the same polarity as the fourth potential difference Vp4 and having an absolute value smaller than the absolute value of the fourth potential difference Vp4.

Specifically, in the second relaxation period T6, the central control circuit 45 outputs, for example, the reference voltage Vsref of Vcom−1.2 V to the measurement potential generation circuit 40. Thus, the measurement potential generation circuit 40 outputs the measurement potential Vs of Vcom−1.2 V. In addition, in the second relaxation period T6, the central control circuit 45 controls the first switch SW1 to be turned off and controls the second switch SW2 to be turned on.

In the second relaxation period T6, the central control circuit 45 controls the first switch SW1 and the second switch SW2 as described above, whereby the output terminal of the measurement potential generation circuit 40 is electrically coupled to the detection electrode 30. Thus, in the second relaxation period T6, the measurement potential Vs of Vcom−1.2 V is supplied to the detection electrode 30, and the common potential Vcom is supplied to the common electrode 21. As a result, in the second relaxation period T6, the detection electrode potential Vd becomes Vcom−1.2 V, and the common electrode potential Vc becomes the common potential Vcom. Also, as shown in FIG. 19, in the second relaxation period T6, the potential difference between the detection electrode 30 and the common electrode 21 becomes the sixth potential difference Vp6, that is, −1.2 V.

In this way, in the second relaxation period T6, the measurement circuit 400 supplies the measurement potential Vs of Vcom−1.2 V to the detection electrode 30 and supplies the common potential Vcom to the common electrode 21 so that the potential difference between the detection electrode 30 and the common electrode 21 becomes the sixth potential difference Vp6 (−1.2 V) having the same polarity as the fourth potential difference Vp4 and having the absolute value smaller than the absolute value of the fourth potential difference Vp4.

In the second charging period T7 after the second reverse sweep period T5 and after the second relaxation period T6, the measurement circuit 400 supplies a potential to each of the detection electrode 30 and the common electrode 21 so that the potential difference between the detection electrode 30 and the common electrode 21 becomes the fifth potential difference Vp5 having a polarity different from that of the fourth potential difference Vp4.

Specifically, in the second charging period T7, the central control circuit 45 outputs, for example, the reference voltage Vsref of Vcom+1.2 V to the measurement potential generation circuit 40. Thus, the measurement potential Vs of Vcom+1.2 V is output from the measurement potential generation circuit 40. In addition, in the second charging period T7, the central control circuit 45 controls the first switch SW1 to be turned off and controls the second switch SW2 to be turned on.

In the second charging period T7, the central control circuit 45 controls the first switch SW1 and the second switch SW2 as described above, whereby the output terminal of the measurement potential generation circuit 40 is electrically coupled to the detection electrode 30. Thus, in the second charging period T7, the measurement potential Vs of Vcom+1.2 V is supplied to the detection electrode 30, and the common potential Vcom is supplied to the common electrode 21. As a result, in the second charging period T7, the detection electrode potential Vd becomes Vcom+1.2 V, and the common electrode potential Vc becomes the common potential Vcom. Also, as shown in FIG. 19, in the second charging period T7, the potential difference between the detection electrode 30 and the common electrode 21 becomes the fifth potential difference Vp5, that is, +1.2 V.

In this way, in the second charging period T7, the measurement circuit 400 supplies the measurement potential Vs of Vcom+1.2 V to the detection electrode 30 and supplies the common potential Vcom to the common electrode 21 so that the potential difference between the detection electrode 30 and the common electrode 21 becomes the fifth potential difference Vp5 (+1.2 V) having a polarity different from that of the fourth potential difference Vp4.

In the second discharging period T8 after the second charging period T7, the measurement circuit 400 stops supplying the potential to the detection electrode 30 and supplies the same potential as that during the second charging period T7 to the common electrode 21 to measure the detection electrode potential Vd at least once, for example, at the end of the second discharging period T8.

Specifically, in the second discharging period T8, the central control circuit 45 controls each of the first switch SW1 and the second switch SW2 to be turned off.

In the second discharging period T8, the central control circuit 45 controls the first switch SW1 and the second switch SW2 as described above, whereby the output terminal of the measurement potential generation circuit 40 is electrically decoupled from the detection electrode 30. Thus, in the second discharging period T8, the common potential Vcom continues to be supplied to the common electrode 21, but supply of the potential to the detection electrode 30 is stopped, and thus the liquid crystal layer 5 discharges electric charges charged in the second charging period T7. The detection electrode potential Vd2 at the end of the second discharging period T8 in the first embodiment and the second embodiment corresponds to a potential V4 in FIG. 19 in this embodiment. Then, the potential difference between the measurement potential Vs (=Vcom+1.2 V) and the potential V4 is amplified by the amplifier circuit 43 and input to the A/D converter 44. In the simplest configuration example of the differential amplifier circuit, the measurement potential Vs (=Vcom+1.2 V) is input to the non-inverting input (+) side of the operational amplifier, and the detection electrode potential Vd is input to the inverting input (−) side of the operational amplifier. Here, since an electrical coupling relationship between the non-inverting input (+) side and the inverting input (−) side of the operational amplifier is different from the coupling relationship in the first discharging period T4, the measured value is obtained from either the first measurement processing or the second measurement processing. Alternatively, although illustration is omitted, another set of a differential amplifier circuit and an A/D converter may be prepared to obtain measured values from both the first measurement processing and the second measurement processing.

For example, the central control circuit 45 measures the detection electrode potential Vd2 at time t9 when the second discharging period T8 ends. Specifically, the central control circuit 45 acquires a digital value output from the A/D converter 44 at time t9 as the measured value of the detection electrode potential Vd2. The central control circuit 45 causes the measured value storage circuit 46 to store the measured value of the detection electrode potential Vd2 obtained at time t9.

In this way, in the second discharging period T8, the measurement circuit 400 stops supplying the potential to the detection electrode 30 and supplies the same common potential Vcom as that during the second charging period T7 to the common electrode 21 to measure the detection electrode potential Vd2 at least once, for example, at the end of the second discharging period T8. The second measurement processing has been described above. When all the measurement processes are completed, for example, the central control circuit 45 controls the first switch SW1 to be turned on and controls the second switch SW2 to be turned off. As a result, the common potential Vcom is applied to the first node N1, that is, the detection electrode 30.

In this embodiment, a configuration of using the first switch SW1 has been adopted, but the first switch SW1 may be eliminated and the common potential Vcom may be output from the reference voltage Vsref. Then, during the normal driving, the central control circuit 45 can output the common potential Vcom as the reference voltage Vsref, control the second switch SW2 to be turned on, and apply the common potential Vcom to the detection electrode 30.

Effects of Third Embodiment

In the liquid crystal device 3000 of the third embodiment, the measurement circuit 400 includes the first node N1 electrically coupled to the detection electrode 30, the common electrode line L1 electrically coupled to the common electrode 21, the ground potential line L2 to which the ground potential is applied, the first capacitor C1 electrically coupled to a portion between the first node N1 and the ground potential line L2, the second capacitor C2 electrically coupled to a portion between the common electrode line L1 and the ground potential line L2, the first switch SW1, the second switch SW2, the measurement potential generation circuit 40 that outputs the measurement potential Vs corresponding to the reference voltage Vsref, the central control circuit 45 that outputs the reference voltage Vs to the measurement potential generation circuit 40 and controls the first switch SW1 and the second switch SW2, and the potential measurement circuit (the amplifier circuit 43 and the A/D converter 44) that measures the potential of the first node N1 as the detection electrode potential Vd and outputs the measured value of the detection electrode potential Vd to the central control circuit 45.

The first node N1 is electrically coupled to the output terminal of the common potential generation circuit 40 via the first switch SW1. The first node N1 is electrically coupled to the output terminal of the measurement potential generation circuit 40 via the second switch SW2. The common electrode line L1 is electrically coupled to the output terminal of the common potential generation circuit 40.

By using the measurement circuit 400 having the above-described configuration, its response to potential is faster than in the first embodiment and the second embodiment since the common electrode 21 has no switch serving as a large resistance component on a path from the output terminal of the common potential generation circuit 41. In addition, since the potential is constant during measurement, the first charging period T3 and the second charging period T7 can be shortened. Accordingly, the configuration is suitable for capturing mobile ions having high mobility.

In the first embodiment, the second embodiment, and the third embodiment, when the measured value is obtained from only one of the first measurement processing and the second measurement processing, the potential during the discharging period (the first discharging period T4 or the second discharging period T8) may be continuously supplied to the detection electrode 30 during the charging period (the first charging period T3 or the second charging period T7) excluded from measurement targets.

4. Outline of Electronic Device

Figure 20:
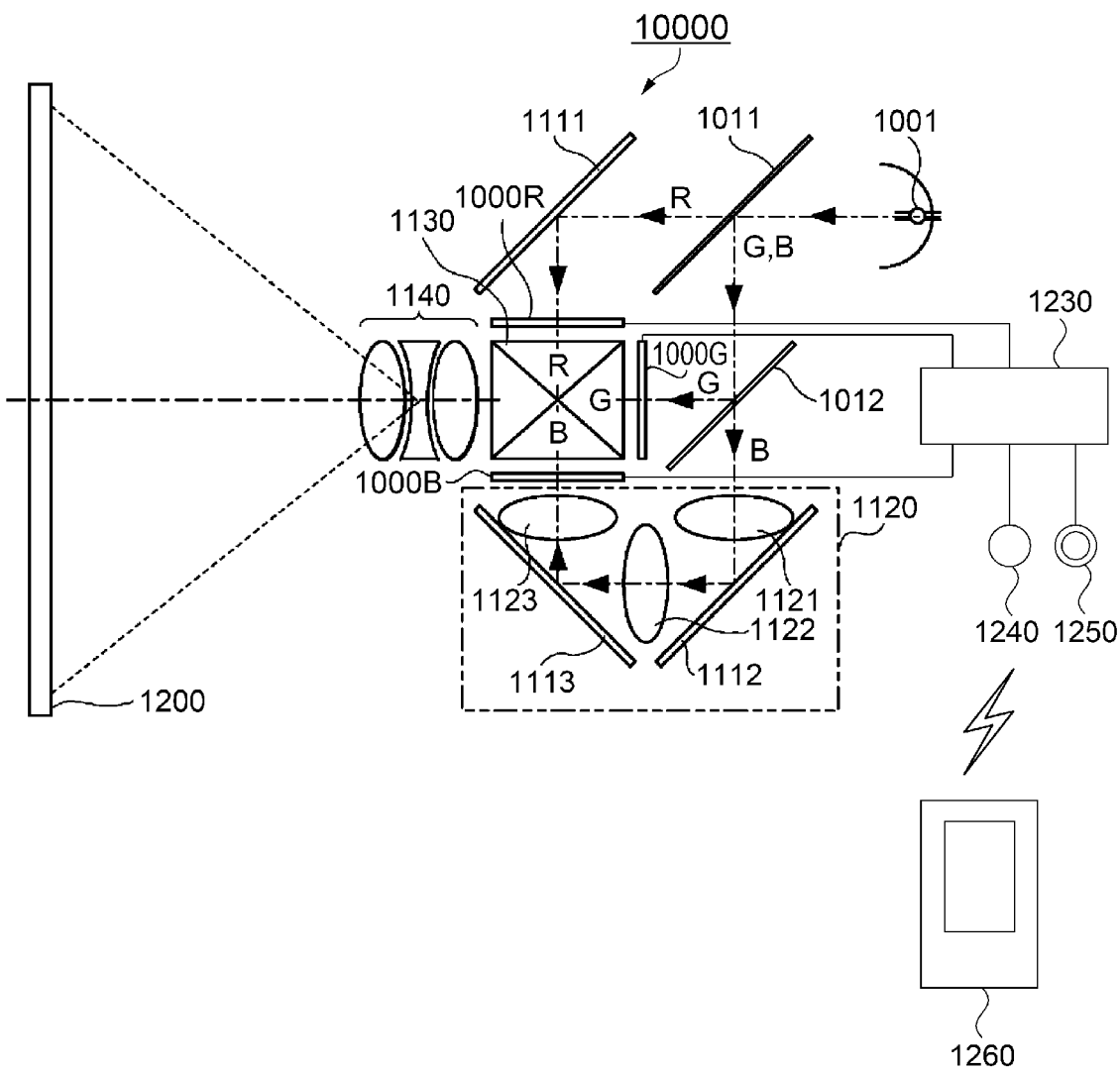
FIG. 20 is an explanatory diagram showing a schematic configuration of a projection display device as an electronic device.

FIG. 20 is a schematic configuration diagram showing a configuration of a projection display device serving as an electronic device according to this embodiment. A projection display device 10000 will be described below as an example of an electronic device including the liquid crystal device 1000 of the first embodiment.

The projection display device 10000 is a three-panel projection display device and includes a lamp unit 1001 serving as a light source, dichroic mirrors 1011 and 1012 serving as a color separation optical system, a liquid crystal device 1000B corresponding to blue light B, a liquid crystal device 1000G corresponding to green light G, a liquid crystal device 1000R corresponding to red light R, three reflection mirrors 1111, 1112, and 1113, three relay lenses 1121, 1122, and 1123, a dichroic prism 1130 serving as a color synthesis optical system, and a projection lens 1140 serving as a projection optical system. An image is projected onto a screen 1200 by the projection optical system. Also, the relay lenses 1121, 1122, and 1123 and the reflection mirrors 1112 and 1113 form a relay lens system 1120.

In addition, the projection display device 10000 includes a panel control circuit 1230 that receives measurement data about the state of deterioration of the liquid crystal layer 5 transmitted from the liquid crystal devices 1000B, 1000G, and 1000R and performs predetermined control based on the received measurement data.

When the panel control circuit 1230 receives the data about the state of deterioration of each liquid crystal layer 5 from the liquid crystal devices 1000B, 1000G, and 1000R, it creates and displays display information regarding the state of deterioration of the liquid crystal layer 5 for each of the liquid crystal devices 1000B, 1000G, and 1000R.

Also, the panel control circuit 1230 can notify that the liquid crystal panel 100 is nearing the end of its life by lighting a pilot lamp 1240 based on the measurement data of the state of deterioration of the liquid crystal layer 5. For example, when the liquid crystal panel 100 of the liquid crystal device 1000B corresponding to blue is nearing the end of its life, a blue pilot lamp 1240 is turned on. Further, the panel control circuit 1230 may notify a state of the liquid crystal panel 100 by voice using a speaker 1250. In addition, the panel control circuit 1230 may notify the state of the liquid crystal panel 100 on a remote controller 1260 or a screen of a mobile terminal (not shown). In addition to the display on the liquid crystal devices 1000B, 1000G, and 1000R as described above, a means for notifying the state of the liquid crystal panel 100 may be provided.

Also, when the panel control circuit 1230 detects from the received measurement data that the liquid crystal panel 100 is nearing the end of its life, it changes control values for controlling the liquid crystal devices 1000B, 1000G, and 1000R in order to delay deterioration of the liquid crystal layer 5. For example, by correcting the control value and lowering a brightness of the lamp unit 1001 that irradiates the liquid crystal devices 1000B, 1000G, and 1000R, by changing gradation voltages of the liquid crystal devices 1000B, 1000G, and 1000R to voltage values corresponding to a decrease in brightness of the lamp unit 1001, or the like, it is possible to extend a usable time of the liquid crystal panel 100.

5. Outline of Display Screen Example of Measurement Results

Figure 21:
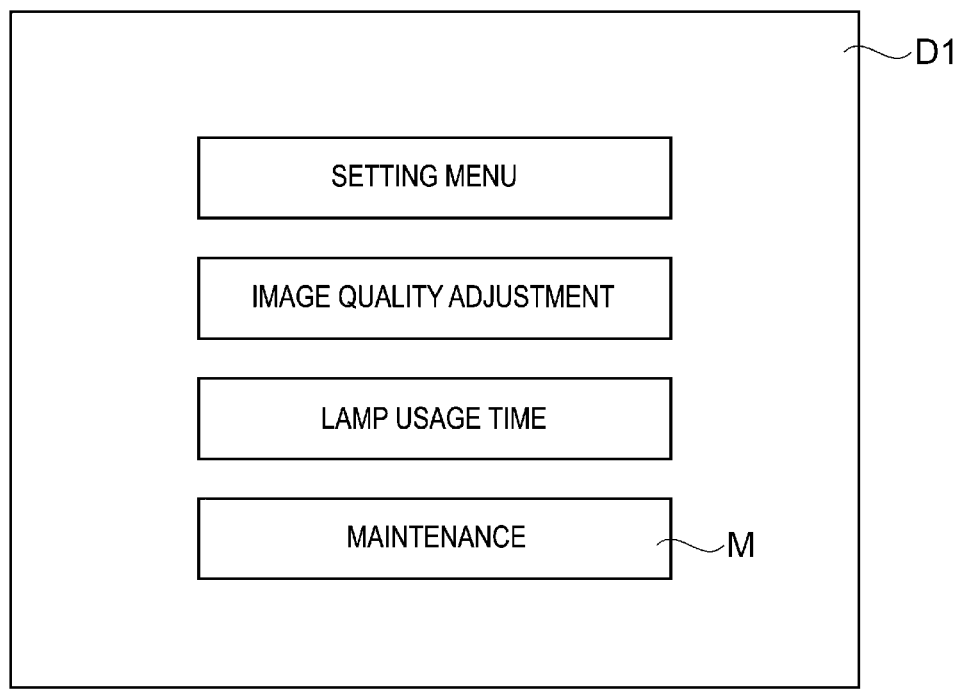
FIG. 21 is an explanatory diagram showing an example of a setting menu screen of the projection display device.
Figure 22:
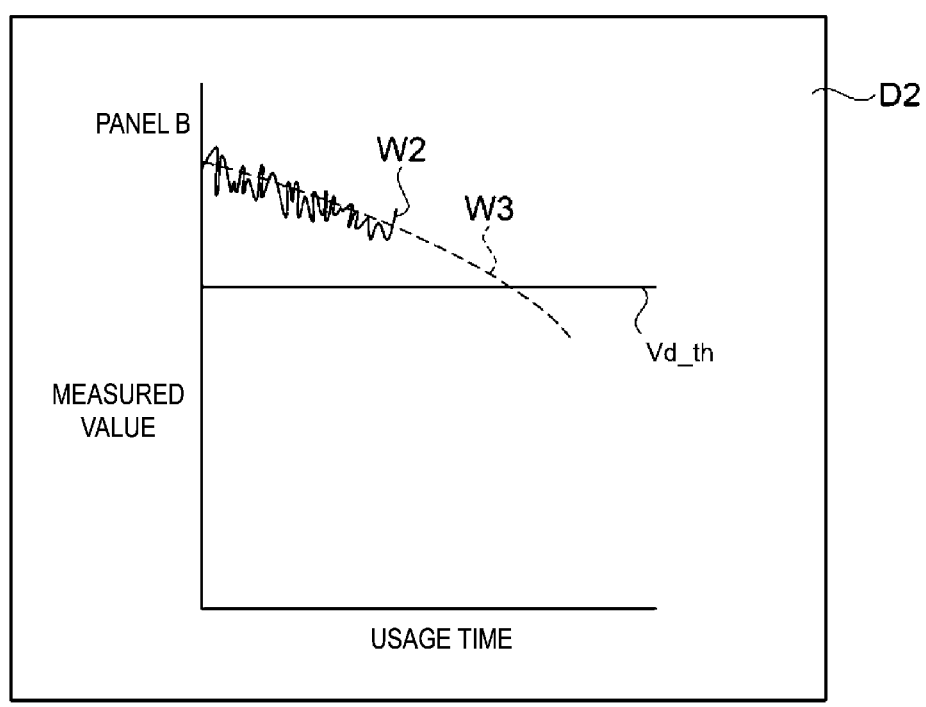
FIG. 22 is an explanatory diagram showing an example of a display screen for displaying a state of deterioration of a liquid crystal layer.

FIG. 21 is an explanatory diagram showing an example of a setting menu screen of the projection display device 10000, and FIG. 22 is an explanatory diagram showing an example of a display screen for displaying the state of deterioration of the liquid crystal layer 5.

In FIG. 21, when maintenance M is selected from s setting menu screen D1 projected and displayed on the screen 1200, a maintenance menu is displayed, and when display of the state of the liquid crystal panel 100 is selected therefrom, the panel control circuit 1230 transmits a transmission request for the measurement data about the state of deterioration of the liquid crystal layer 5 to the liquid crystal devices 1000B, 1000G, and 1000R and displays a display screen D2 as shown in FIG. 22 based on the received measurement data of the state of deterioration of the liquid crystal layer 5 of the liquid crystal devices 1000B, 1000G, and 1000R.

The display screen D2 of FIG. 22 is a screen showing the state of deterioration of the liquid crystal layer 5 of the liquid crystal device 1000B. Also, the screens indicating the state of deterioration of the liquid crystal layers 5 of the liquid crystal devices 1000G and 1000R may be individually displayed by screen switching.

On the display screen D2, a transition line W2 indicating a history of the measured value from the start of usage of the liquid crystal device 1000B to the present, an expected transition line W3 under standard usage conditions, and a line of the threshold Vd_th indicating that the liquid crystal panel 100 is nearing the end of its like are displayed. Also, information on the liquid crystal devices 1000G and 1000R may also be displayed together on the display screen D2. By comparing the transition line W2 with the expected transition line W3, it is possible to determine whether or not the usage condition are severer than expected, and thus preventive maintenance such as limiting the brightness of the lamp unit 1001 that irradiates the liquid crystal devices 1000B, 1000G, and 1000R can be performed. Then, when the transition line W2 is improved to the expected transition line W3, limitation on the brightness of the lamp unit 1001 may be released.

With respect to the transition line W2 indicating the history of the measured value, a smooth line obtained by averaging a plurality of measured values may be displayed in order to make it easier to determine a changing trend thereof. Also, in addition to displaying the transition line W2 indicating the history of the measured value, the measured value may be simply displayed as numerical values. In this case, the display color of the measured value may be changed in comparison with the threshold value Vd_th. For example, it may be green when the value is greater than the threshold Vd_th, yellow when the value approaches the threshold Vd_th, and red when the value is equal to or less than the threshold Vd_th.

Further, the measured value may be displayed as an index value normalized by an arbitrary value. In this case, for example, when the index value is calculated from the measured value obtained during the second discharging period T8, the index value displayed shortly after the start of usage is, for example, a value close to "1". This value decreases as the deterioration of the liquid crystal layer 5 progresses. Typically, it tends to decrease as the usage time of the projection display device 10000 increases.

Alternatively, if it is expressed in percentage, it is a value close to "100," for example. This value decreases as the liquid crystal layer 5 deteriorates. Typically, it tends to decrease as the usage time of the projection display device 10000 increases. Alternatively, when the index value is calculated from the measured value obtained during the first discharging period T4, the index value displayed shortly after the start of usage is, for example, a value close to "0". This value increases with the deterioration of the liquid crystal layer 5. Typically, it tends to increase as the usage time of the projection display device 10000 increases. Using such an index value, the state of deterioration of the liquid crystal panel 100 may be displayed using, for example, a bar graph or a pie graph.

When power of the projection display device 10000 is turned on, when the power is turned off, and when measurement of the state of deterioration of the liquid crystal layer 5 is instructed from the maintenance menu, the panel control circuit 1230 transmits a measurement instruction command for the state of deterioration of the liquid crystal layer 5 to the liquid crystal devices 1000B, 1000G, and 1000R. As described in step S10 of the flowchart of FIG. 4, when the liquid crystal devices 1000B, 1000G, and 1000R receive the measurement instruction command of the state of deterioration of the liquid crystal layer 5 from the panel control circuit 1230, the measurement is started.

In general, preventive maintenance means that performing planned maintenance in order to operate equipment stably. In this case, there are two methods for determining a guideline for replacement of components and the like, a method for dividing based on usage times of the components, and a method of evaluating degrees of deterioration of the components. When the liquid crystal panel 100 according to the present disclosure is used, it is possible to obtain, as the measured value, an increase state of mobile ions serving as a deterioration index of the liquid crystal layer 5 of the liquid crystal panel 100. Since a change in the measured value can be observed with higher sensitivity before display abnormality of the liquid crystal panel 100 appears, and thus the preventive maintenance can be performed. In addition, it is also possible to perform predictive maintenance by detecting a behavior of the measured value in which stains, unevenness, or the like is likely to occur through analysis using machine learning in comparison with a tendency of transition of the measured value in many individuals.

Although the embodiments of the present disclosure have been described above, the technical scope of the present disclosure is not limited to the above embodiments, and various modifications can be made without departing from the gist of the present disclosure.

In the first embodiment, the liquid crystal device 1000 including the liquid crystal panel 100 and the measurement circuit 200 provided outside the liquid crystal panel 100 has been exemplified, but a configuration in which the measurement circuit 200 is provided inside the liquid crystal panel 100 may be adopted. That is, the measurement circuit 200 may be disposed on the element substrate 10 together with the data line driving circuit 23, the scanning line driving circuit 24, and the like. The same applies to the second embodiment and the third embodiment.

In this embodiment, the projection display device 10000 has been exemplified as the electronic device, but the electronic device to which the liquid crystal device 1000 is applied is not limited thereto. For example, the present disclosure may be applied to an electronic device such as a 3D printer that cures a resin liquid using light emitted from the liquid crystal panel 100, a head-up display (HUD), a head mounted display (HMD), a personal computer, a digital camera, or a liquid crystal television. For example, some 3D printers using the liquid crystal panel 100 use UV light, and the deterioration of the liquid crystal panel 100 is a problem. When modeling is started without noticing that the liquid crystal panel 100 is nearing the end of its life, insufficient curing of a resin liquid may occur during the modeling and may not be noticed until the modeling is completed. Here, if the liquid crystal panel 100 according to the present disclosure is used, the state of deterioration of the liquid crystal panel 100 can be known. Accordingly, by anticipating in advance that the resin liquid will not cure well before starting the modeling, the liquid crystal panel 100 can be replaced at an appropriate time as the preventive maintenance.

In the above-described embodiment, a transmissive liquid crystal device has been exemplified as the liquid crystal device 1000, but a reflective liquid crystal device or a liquid crystal on silicon (LCOS) liquid crystal device may be used as the liquid crystal device 1000.

In the first embodiment, the liquid crystal device 1000 including the liquid crystal panel 100 and the measurement circuit 200 provided outside the liquid crystal panel 100 has been exemplified, but a diagnostic system including the liquid crystal panel 100 and a diagnostic device which is a device different from the liquid crystal panel 100 may be configured. In the diagnostic system, the diagnostic device includes the measurement circuit 200. The same applies to the second embodiment and the third embodiment.

Summary of Present Disclosure

A summary of the present disclosure will be appended below.

APPENDIX 1

A liquid crystal device comprising: a first electrode; a second electrode; a liquid crystal layer disposed between the first electrode and the second electrode; and a measurement circuit configured to supply a potential to each of the first electrode and the second electrode and measure a first electrode potential, which is a potential of the first electrode, wherein the measurement circuit supplies a potential to each of the first electrode and the second electrode so that a potential difference between the first electrode and the second electrode becomes a first potential difference during a first period, supplies a potential to each of the first electrode and the second electrode so that the potential difference becomes a second potential difference having a polarity different from that of the first potential difference during a second period after the first period, and stops supplying the potential to the first electrode and supplies the same potential to the second electrode as during the second period during a third period after the second period.

As described above, the first period is inserted before the second period and the third period. Thus, during the first period, mobile ions included in the liquid crystal layer can be effectively initially disposed in one of the first electrode and the second electrode. In this way, by adjusting the initial arrangement of the mobile ions before the second period starts, measurement reproducibility for the measured value of the detection electrode potential obtained in the third period can be obtained. In addition, since the influence of the internal electric field due to the mobile ions is also reflected in the measured value, an increase in the mobile ions is likely to appear as a change in the measured value. As a result, the progress of deterioration of the liquid crystal layer can be tracked with higher sensitivity from an initial stage of usage of the liquid crystal panel including the first electrode, the second electrode, and the liquid crystal layer.

APPENDIX 2

The liquid crystal device according to appendix 1, further comprising a pixel electrode provided in a display region, wherein the first electrode is provided outside the display region.

APPENDIX 3

The liquid crystal device according to appendix 2, wherein the first period is longer than one frame period in the display region, and an absolute value of the first potential difference is equal to or greater than a maximum applied voltage of the liquid crystal layer in the display region.

As described above, by setting the first period longer than one frame period in the display region, mobile ions having particularly low mobility can be initially disposed in one of the first electrode and the second electrode effectively.

In addition, by setting the absolute value of the first potential difference, that is, the voltage applied to the liquid crystal layer during the first period to be equal to or higher than the maximum applied voltage of the liquid crystal layer in the display region, mobile ions that move at about the maximum applied voltage can also be effectively initially disposed in one of the first electrode and the second electrode. Accordingly, according to the liquid crystal device described in appendix 3, it is possible to track the progress of deterioration of the liquid crystal layer with higher sensitivity from the beginning of usage of the liquid crystal panel with higher measurement reproducibility.

APPENDIX 4

The liquid crystal device according to appendix 2 or 3, wherein the second period is shorter than one frame period in the display region, and an absolute value of the second potential difference is greater than 0 V and less than a threshold voltage of the liquid crystal layer.

In this way, by setting the second period shorter than one frame period in the display region, the action of mobile ions having a high mobility can be easily captured as a change in the measured value.

Further, by setting the absolute value of the second potential difference, i.e., the voltage applied to the liquid crystal layer in the second period to be greater than 0 V and smaller than the threshold voltage of the liquid crystal layer, it is possible to measure the detection electrode potential in the third period while inhibiting the influence of dielectric anisotropy of the liquid crystal layer.

Accordingly, according to the liquid crystal device described in Appendix 4, it is possible to track the progress of deterioration of the liquid crystal layer with higher sensitivity from the beginning of usage of the liquid crystal panel with higher measurement reproducibility.

APPENDIX 5

The liquid crystal device according to any one of appendixes 1 to 4, wherein the measurement circuit supplies a potential to each of the first electrode and the second electrode so that the potential difference becomes a third potential difference having the same polarity as the first potential difference and an absolute value smaller than the absolute value of the first potential difference in a fourth period between the first period and the second period.

In this way, by inserting the fourth period between the first period and the second period, it is possible to shift from the first period to the second period without moving the mobile ions initially disposed during the first period.

Accordingly, according to the liquid crystal device described in appendix 5, the progress of deterioration of the liquid crystal layer can be tracked with higher sensitivity from the initial stage of usage of the liquid crystal panel with higher measurement reproducibility.

APPENDIX 6

The liquid crystal device according to appendix 5, wherein the absolute value of the third potential difference is greater than 0 V and less than a threshold voltage of the liquid crystal layer.

As described above, by setting the absolute values of the third potential differences, i.e., the voltages applied to the liquid crystal layer in the fourth period to be greater than the 0 V and smaller than the threshold voltage of the liquid crystal layer, the effect of inhibiting the influence of the dielectric anisotropy of the liquid crystal layer is enhanced.

Accordingly, according to the liquid crystal device described in appendix 6, it is possible to track the progress of deterioration of the liquid crystal layer with higher sensitivity from the beginning of usage of the liquid crystal panel with higher measurement reproducibility.

APPENDIX 7

The liquid crystal device according to any one of appendixes 2 to 6, wherein the measurement circuit supplies a potential to each of the first electrode and the second electrode so that the potential difference becomes a fourth potential difference having a polarity different from that of the first potential difference and having the same absolute value as that of the first potential difference In a fifth period after the third period, supplies a potential to each of the first electrode and the second electrode so that the potential difference becomes a fifth potential difference having a polarity different from the fourth potential difference in a sixth period after the fifth period, and stops supplying the potential to the first electrode and supplies the same potential as that during the sixth period to the second electrode during a seventh period after the sixth period.

As described above, the fifth period is inserted before the sixth period and the seventh period. Thus, in the fifth period, the mobile ions included in the liquid crystal layer can be effectively initially disposed in one of the first electrode and the second electrode. In this way, by adjusting the initial arrangement of the mobile ions before the sixth period starts, measurement reproducibility for the measured value of the detection electrode potential obtained in the seventh period can be obtained. In addition, since the influence of the internal electric field due to the mobile ions is also reflected in the measured value, an increase in the mobile ions is likely to appear as a change in the measured value. As a result, the progress of deterioration of the liquid crystal layer can be tracked with higher sensitivity from the initial stage of usage of the liquid crystal panel.

Further, according to the liquid crystal device described in appendix 7, since the liquid crystal layer is AC-driven, it is possible to inhibit deterioration of the liquid crystal layer caused by application of a DC voltage to the liquid crystal layer at the time of measurement of the detection electrode potential.

APPENDIX 8

The liquid crystal device according to appendix 7, wherein the fifth period is longer than one frame period in the display region, and the absolute value of the fourth potential difference is equal to or greater than a maximum applied voltage of the liquid crystal layer in the display region.

As described above, by setting the fifth period to be longer than one frame period in the display region, mobile ions having particularly low mobility can be initially disposed in one of the first electrode and the second electrode effectively.

In addition, by setting the absolute value of the fourth potential difference, that is, the voltage applied to the liquid crystal layer during the fifth period to be equal to or higher than the maximum applied voltage of the liquid crystal layer in the display region, mobile ions moving at about the maximum applied voltage can also be effectively initially disposed in one of the first electrode and the second electrode. Accordingly, according to the liquid crystal device described in appendix 8, it is possible to track the progress of deterioration of the liquid crystal layer with higher sensitivity from the beginning of usage of the liquid crystal panel with higher measurement reproducibility.

APPENDIX 9

The liquid crystal device according to appendix 7 or 8, wherein the sixth period is shorter than one frame period in the display region, and an absolute value of the fifth potential difference is greater than 0 V and less than a threshold voltage of the liquid crystal layer.

Thus, by setting the sixth period to be shorter than one frame period in the display region, the action of mobile ions having a high mobility can be easily captured as a change in the measured value.

Further, by setting the absolute value of the fifth potential difference, i.e., the voltage applied to the liquid crystal layer in the sixth period to be greater than 0 V and smaller than the threshold voltage of the liquid crystal layer, it is possible to measure the detection electrode potential in the seventh period while inhibiting the influence of the dielectric anisotropy of the liquid crystal layer.

Accordingly, according to the liquid crystal device described in appendix 9, it is possible to track the progress of deterioration of the liquid crystal layer with higher sensitivity from the beginning of usage of the liquid crystal panel with higher measurement reproducibility.

APPENDIX 10

The liquid crystal device according to any one of appendixes 7 to 9, wherein the measurement circuit supplies a potential to each of the first electrode and the second electrode so that the potential difference becomes a sixth potential difference having the same polarity as the fourth potential difference and an absolute value smaller than the absolute value of the fourth potential difference in an eighth period between the fifth period and the sixth period.

In this way, by inserting the eighth period between the fifth period and the sixth period, it is possible to shift from the fifth period to the sixth period without moving the mobile ions initially disposed in the fifth period.

Accordingly, according to the liquid crystal device described in appendix 10, it is possible to track the progress of deterioration of the liquid crystal layer with higher sensitivity from the beginning of usage of the liquid crystal panel with higher measurement reproducibility.

APPENDIX 11

The liquid crystal device according to appendix 10, wherein the absolute value of the sixth potential difference is greater than 0 V and less than a threshold voltage of the liquid crystal layer.

In this way, by setting the absolute values of the sixth potential differences, i.e., the voltages applied to the liquid crystal layer in the eighth period, to be greater than 0 V and smaller than the threshold voltage of the liquid crystal layer, the effect of inhibiting the influence of the dielectric anisotropy of the liquid crystal layer is enhanced.

Accordingly, according to the liquid crystal device described in appendix 11, it is possible to track the progress of deterioration of the liquid crystal layer with higher sensitivity from the beginning of usage of the liquid crystal panel with higher measurement reproducibility.

APPENDIX 12

The liquid crystal device according to any one of appendixes 1 to 11, wherein the measurement circuit includes: a first node electrically coupled to the first electrode; a second electrode line electrically coupled to the second electrode; a ground potential line to which a ground potential is applied; a first capacitor electrically coupled to a portion between the first node and the ground potential line; a second capacitor electrically coupled to a portion between the second electrode line and the ground potential line; a first switch; a second switch; a third switch;
   a fourth switch; a measurement potential generation circuit configured to output a measurement potential corresponding to a reference voltage; a control circuit configured to output the reference voltage to the measurement potential generation circuit and control the first switch to the fourth switch; and a potential measurement circuit configured to measure a potential of the first node as the first electrode potential and output a measured value of the first electrode potential to the control circuit, the first node is electrically coupled to the ground potential line via the first switch, the first node is electrically coupled to an output terminal of the measurement potential generation circuit via the second switch, the second electrode line is electrically coupled to the ground potential line via the third switch, and the second electrode line is electrically coupled to the output terminal of the measurement potential generation circuit via the fourth switch.

By using the measurement circuit having the above configuration, it is possible to realize the function required for the measurement circuit with a simple circuit configuration and to reduce the noise component included in the measured value of the detection electrode potential.

APPENDIX 13

The liquid crystal device according to appendix 12, wherein the first switch and the second switch are controlled to be on by a first voltage, and
   the third switch and the fourth switch are controlled to be on by a second voltage higher than the first voltage.

As described above, since the third switch and the fourth switch electrically coupled to the second electrode line are controlled to be on by the relatively high second voltage, the ON resistance of the third switch and the fourth switch can be reduced. Therefore, the responsiveness of the second electrode line can be improved, and the leakage current from the first electrode can be inhibited.

As a result, since the second period and the sixth period can be shortened, the action of the mobile ions having high mobility can be captured as a change in the measured value, and the influence of variations in characteristics of each switch component on the measured value can be inhibited.

APPENDIX 14

The liquid crystal device according to any one of appendixes 1 to 11, wherein the measurement circuit includes: a first node electrically coupled to the first electrode; a second node; a second electrode line electrically coupled to the second electrode; a ground potential line to which a ground potential is applied; a first capacitor electrically coupled to a portion between the first node and the ground potential line; a second capacitor electrically coupled to a portion between the second electrode line and the ground potential line; a first switch; a second switch; a third switch; a fourth switch; a sixth switch; a seventh switch; a first measurement potential generation circuit configured to output a first measurement potential; a second measurement potential generation circuit configured to output a second measurement potential; a control circuit configured to control the first switch to the fourth switch, the sixth switch, and the seventh switch; and a potential measurement circuit configured to measure a potential of the first node as the first electrode potential and output a measured value of the first electrode potential to the control circuit, the first node is electrically coupled to the ground potential line via the first switch, the first node is electrically coupled to the second node via the second switch, the second node is electrically coupled to an output terminal of the first measurement potential generation circuit via the sixth switch, the second node is electrically coupled to an output terminal of the second measurement potential generation circuit via the seventh switch, the second electrode line is electrically coupled to the ground potential line via the third switch, and the second electrode line is electrically coupled to the second node via the fourth switch.

By using the measurement circuit having the above configuration, it is possible to realize the function required for the measurement circuit with a simple circuit configuration and to reduce the noise component included in the measured value of the detection electrode potential.

APPENDIX 15

The liquid crystal device according to appendix 14, wherein the first switch and the second switch are controlled to be in an ON state by a first voltage, and the third switch, the fourth switch, the sixth switch, and the seventh switch are controlled to be in an ON state by a second voltage higher than the first voltage.

As described above, since the third switch, the fourth switch, the sixth switch, and the seventh switch electrically coupled to the second electrode line are controlled to be on by the relatively high second voltage, the ON resistance of each of these switches can be reduced. Therefore, the responsiveness of the second electrode line can be improved, and the leakage current from the first electrode can be inhibited.

As a result, since the second period and the sixth period can be shortened, the action of the mobile ions having high mobility can be captured as a change in the measured value, and the influence of variations in characteristics of each switch component on the measured value can be inhibited.

APPENDIX 16

The liquid crystal device according to any one of appendixes 1 to 11, wherein the measurement circuit includes a first node electrically coupled to the first electrode, a second electrode line electrically coupled to the second electrode, a ground potential line to which a ground potential is applied, a first capacitor electrically coupled to a portion between the first node and the ground potential line, and a potential measurement circuit configured to output a measurement potential corresponding to a reference voltage to the measurement potential generation circuit, and a control circuit configured to output the reference voltage to the measurement potential generation circuit and to control the first switch and the second switch, and the potential measurement circuit configured to measure the potential of the first node as the first electrode potential and to output a measured value of the first electrode potential to the control circuit, and wherein the first node is electrically coupled to an output terminal of the common potential generation circuit via the first switch, the first node is electrically coupled to an output terminal of the measurement potential generation circuit via the second switch, and the second electrode line is electrically coupled to the output terminal of the common potential generation circuit.

By using the measurement circuit having the above-described configuration, it is possible to realize the function required for the measurement circuit with a simpler circuit configuration and to reduce the noise component included in the measured value of the detection electrode potential as compared with the liquid crystal device according to appendix 12 and the liquid crystal device according to appendix 14.

APPENDIX 17

An electronic device comprising the liquid crystal device according to any one of appendixes 1 to 16.

APPENDIX 18

A diagnostic system comprising: a liquid crystal panel including a first electrode, a second electrode, and a liquid crystal layer disposed between the first electrode and the second electrode; and a diagnostic device including a measurement circuit configured to supply a potential to each of the first electrode and the second electrode and measure a first electrode potential, which is a potential of the first electrode, wherein the measurement circuit supplies a potential to each of the first electrode and the second electrode so that a potential difference between the first electrode and the second electrode becomes a first potential difference during a first period, supplies a potential to each of the first electrode and the second electrode so that the potential difference becomes a second potential difference having a polarity different from that of the first potential difference during a second period after the first period, and stops supplying the potential to the first electrode and supplies the same potential as that during the second period to the second electrode during a third period after the second period.

What is claimed is:
1. A liquid crystal device comprising:
a first electrode;
a second electrode;
a liquid crystal layer disposed between the first electrode and the second electrode; and
a measurement circuit, including a control circuit and a measurement potential generation circuit, and coupled to the first electrode and the second electrode, and configured to generate and supply a potential to each of the first electrode and the second electrode and measure a first electrode potential, that is a potential of the first electrode, wherein
the control circuit is configured to control the measurement potential generation circuit to:
generate and supply a potential to each of the first electrode and the second electrode so that a potential difference between the first electrode and the second electrode becomes a first potential difference during a first period,
generate and supply a potential to each of the first electrode and the second electrode so that the potential difference becomes a second potential difference having a polarity different from that of the first potential difference during a second period after the first period, and
stop generating and supplying the potential to the first electrode and supply the same potential to the second electrode as during the second period, during a third period after the second period,
wherein the first period is longer than one frame period in the display region wherein the first potential difference within the entire first period has a polarity different from the second potential difference within the entire second period.
2. The liquid crystal device according to claim 1 further comprising a pixel electrode provided in a display region, wherein
the first electrode is provided outside the display region.
3. The liquid crystal device according to claim 2, wherein an absolute value of the first potential difference is equal to or greater than a maximum applied voltage of the liquid crystal layer in the display region.
4. The liquid crystal device according to claim 2, wherein the second period is shorter than one frame period in the display region, and
an absolute value of the second potential difference is greater than 0 V and less than a threshold voltage of the liquid crystal layer.
5. The liquid crystal device according to claim 1, wherein the measurement circuit is configured to supply a potential to each of the first electrode and the second electrode so that the potential difference becomes a third potential difference having the same polarity as the first potential difference and an absolute value smaller than the absolute value of the first potential difference in a fourth period between the first period and the second period.

6. The liquid crystal device according to claim 5, wherein the absolute value of the third potential difference is greater than 0 V and less than a threshold voltage of the liquid crystal layer.

7. The liquid crystal device according to claim 2, wherein the control circuit of the measurement circuit is further configured to control the measurement potential generation circuit to generate and supply a potential to each of the first electrode and the second electrode so that the potential difference becomes a fourth potential difference having a polarity different from that of the first potential difference and having the same absolute value as that of the first potential difference during a fifth period after the third period, generate and supply a potential to each of the first electrode and the second electrode so that the potential difference becomes a fifth potential difference having a polarity different from the fourth potential difference during a sixth period after the fifth period, and stop supplying the potential to the first electrode and supply the same potential as during the sixth period to the second electrode during a seventh period after the sixth period.

8. The liquid crystal device according to claim 7, wherein the fifth period is longer than one frame period in the display region, and the absolute value of the fourth potential difference is equal to or greater than a maximum applied voltage of the liquid crystal layer in the display region.

9. The liquid crystal device according to claim 7, wherein the sixth period is shorter than one frame period in the display region, and an absolute value of the fifth potential difference is greater than 0 V and less than a threshold voltage of the liquid crystal layer.

10. The liquid crystal device according to claim 7, wherein the measurement circuit is further configured to supply a potential to each of the first electrode and the second electrode so that the potential difference becomes a sixth potential difference having the same polarity as the fourth potential difference and an absolute value smaller than the absolute value of the fourth potential difference in an eighth period between the fifth period and the sixth period.

11. The liquid crystal device according to claim 10, wherein the absolute value of the sixth potential difference is greater than 0 V and less than a threshold voltage of the liquid crystal layer.

12. The liquid crystal device according to claim 1, wherein the measurement circuit includes:
a first node electrically coupled to the first electrode;
a second electrode line electrically coupled to the second electrode;
a ground potential line to which a ground potential is applied;
a first capacitor electrically coupled to a portion between the first node and the ground potential line;
a second capacitor electrically coupled to a portion between the second electrode line and the ground potential line;
a first switch;
a second switch;
a third switch;
a fourth switch;
a measurement potential generation circuit configured to output a measurement potential corresponding to a reference voltage;
a control circuit configured to output the reference voltage to the measurement potential generation circuit and control the first switch to the fourth switch; and
a potential measurement circuit configured to measure a potential of the first node as the first electrode potential and output a measured value of the first electrode potential to the control circuit,
the first node is electrically coupled to the ground potential line via the first switch,
the first node is electrically coupled to an output terminal of the measurement potential generation circuit via the second switch,
the second electrode line is electrically coupled to the ground potential line via the third switch, and
the second electrode line is electrically coupled to the output terminal of the measurement potential generation circuit via the fourth switch.

13. The liquid crystal device according to claim 12, wherein the first switch and the second switch are controlled to be on by a first voltage, and
the third switch and the fourth switch are controlled to be on by a second voltage higher than the first voltage.

14. The liquid crystal device according to claim 1, wherein the measurement circuit includes:
a first node electrically coupled to the first electrode;
a second node;
a second electrode line electrically coupled to the second electrode;
a ground potential line to which a ground potential is applied;
a first capacitor electrically coupled to a portion between the first node and the ground potential line;
a second capacitor electrically coupled to a portion between the second electrode line and the ground potential line;
a first switch;
a second switch;
a third switch;
a fourth switch;
a sixth switch;
a seventh switch;
a first measurement potential generation circuit configured to output a first measurement potential;
a second measurement potential generation circuit configured to output a second measurement potential;
a control circuit configured to control the first switch to the fourth switch, the sixth switch, and the seventh switch; and
a potential measurement circuit configured to measure a potential of the first node as the first electrode potential and output a measured value of the first electrode potential to the control circuit,
the first node is electrically coupled to the ground potential line via the first switch,
the first node is electrically coupled to the second node via the second switch, the second node is electrically coupled to an output terminal of the first measurement potential generation circuit via the sixth switch, the second node is electrically coupled to an output terminal of the second measurement potential generation circuit via the seventh switch, the second electrode line is electrically coupled to the ground potential line via the third switch, and the second electrode line is electrically coupled to the second node via the fourth switch.

15. The liquid crystal device according to claim 14, wherein the first switch and the second switch are controlled to be on by a first voltage, and the third switch, the fourth switch, the sixth switch, and the seventh switch are controlled to be on by a second voltage higher than the first voltage.

16. The liquid crystal device according to claim 1, wherein the measurement circuit further includes:

a first node electrically coupled to the first electrode;

a second electrode line electrically coupled to the second electrode;

a ground potential line to which a ground potential is applied;

a first capacitor electrically coupled to a portion between the first node and the ground potential line;

a second capacitor electrically coupled to a portion between the second electrode line and the ground potential line;

a first switch;

a second switch;

the measurement potential generation circuit configured to generate and output a measurement potential corresponding to a reference voltage;

a common potential generation circuit configured to generate and output a predetermined common potential;

the control circuit configured to output the reference voltage to the measurement potential generation circuit and control the first switch and the second switch; and a potential measurement circuit configured to measure a potential of the first node as the first electrode potential and output a measured value of the first electrode potential to the control circuit, the first node is electrically coupled to an output terminal of the common potential generation circuit via the first switch, the first node is electrically coupled to an output terminal of the measurement potential generation circuit via the second switch, and the second electrode line is electrically coupled to the output terminal of the common potential generation circuit.

17. An electronic device comprising the liquid crystal device according to claim 1.

18. A diagnostic system comprising: a liquid crystal panel including a first electrode, a second electrode, and a liquid crystal layer disposed between the first electrode and the second electrode; and a diagnostic device including a measurement circuit, wherein the measurement circuit, including a control circuit and a measurement potential generation circuit, and coupled to the first electrode and the second electrode, and configured to generate and supply a potential to each of the first electrode and the second electrode and measure a first electrode potential, that is a potential of the first electrode, wherein the control circuit is configured to control the measurement potential generation circuit to:

generate and supply a potential to each of the first electrode and the second electrode so that a potential difference between the first electrode and the second electrode becomes a first potential difference during a first period, generate and supply a potential to each of the first electrode and the second electrode so that the potential difference becomes a second potential difference having a polarity different from that of the first potential difference during a second period after the first period, and stop generating and supplying the potential to the first electrode and supply the same potential as during the second period to the second electrode, during a third period after the second period, wherein the first period is longer than one frame period in the display region wherein the first potential difference within the entire first period has a polarity different from the second potential difference within the entire second period.

* * * * *